United States Patent
Hsu et al.

(10) Patent No.: US 11,988,945 B2
(45) Date of Patent: May 21, 2024

(54) OPTICAL IMAGING LENS ASSEMBLY, IMAGE CAPTURING UNIT AND ELECTRONIC DEVICE

(71) Applicant: LARGAN PRECISION CO., LTD., Taichung (TW)

(72) Inventors: Po-Lun Hsu, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 239 days.

(21) Appl. No.: 17/827,580

(22) Filed: May 27, 2022

(65) Prior Publication Data

US 2022/0390815 A1    Dec. 8, 2022

(30) Foreign Application Priority Data

Jun. 2, 2021  (TW) ................................ 110120062
Apr. 27, 2022 (TW) ................................ 111116065

(51) Int. Cl.
*G02B 13/00*    (2006.01)
*G02B 15/15*    (2006.01)
(Continued)

(52) U.S. Cl.
CPC ......... *G03B 17/17* (2013.01); *G02B 13/0025* (2013.01); *G02B 15/15* (2013.01); *G03B 5/02* (2013.01); *G03B 2205/0046* (2013.01)

(58) Field of Classification Search
CPC .. G02B 15/15; G02B 13/0065; G02B 13/007; G02B 13/009
See application file for complete search history.

(56) References Cited

U.S. PATENT DOCUMENTS

2012/0147479 A1* 6/2012 Hayakawa ........... G02B 13/009
                                                          359/689
2015/0338617 A1   11/2015 Nie
(Continued)

FOREIGN PATENT DOCUMENTS

CN   208110149 U   11/2018
CN   111856711 A   10/2020
(Continued)

OTHER PUBLICATIONS

Taiwan Office Action dated Feb. 3, 2023 as received in application No. 111116065.

*Primary Examiner* — Joseph P Martinez
(74) *Attorney, Agent, or Firm* — Maschoff Brennan

(57) ABSTRACT

An optical imaging lens assembly having a zooming function includes, in order from an object side to an image side along an optical path: a reflection group and a lens group. The reflection group includes a prism having an object-side surface being convex. The prism includes a reflection surface configured to reflect an imaging light passing through the object-side surface of the prism and send the imaging light to an image-side surface of the prism. The lens group includes at least three lens elements arranged along the optical path, and each of the at least three lens elements has an object-side surface facing toward the object side and an image-side surface facing toward the image side. The lens group includes a movable group, and the movable group moves along a direction parallel to an optical axis in a zooming process.

29 Claims, 25 Drawing Sheets

(51) Int. Cl.
　　　*G03B 5/02*　　　(2021.01)
　　　*G03B 17/17*　　(2021.01)

(56)　　　　　　References Cited

U.S. PATENT DOCUMENTS

| | | |
|---|---|---|
| 2016/0327773 A1 | 11/2016 | Choi |
| 2017/0139184 A1 | 5/2017 | Bae |
| 2017/0276912 A1 | 9/2017 | Yao |
| 2017/0276913 A1 | 9/2017 | Yao |
| 2017/0276914 A1 | 9/2017 | Yao |
| 2019/0196148 A1 | 6/2019 | Yao |
| 2021/0048628 A1 | 2/2021 | Shabtay |

FOREIGN PATENT DOCUMENTS

| | | |
|---|---|---|
| CN | 112444946 A | 3/2021 |
| CN | 202110221352.X C5 | 8/2021 |
| CN | 215297800 U | 12/2021 |
| WO | 2022179632 A | 9/2022 |
| WO | 2022222085 A | 10/2022 |

* cited by examiner

OPTICAL IMAGING LENS ASSEMBLY, IMAGE CAPTURING UNIT AND ELECTRONIC DEVICE

RELATED APPLICATIONS

This application claims priority to Taiwan Application 110120062, filed on Jun. 2, 2021 and Taiwan Application 111116065, filed on Apr. 27, 2022, which are incorporated by reference herein in its entirety.

BACKGROUND

Technical Field

The present disclosure relates to an optical imaging lens assembly, an image capturing unit and an electronic device, more particularly to an optical imaging lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an optical imaging lens assembly having a zooming function includes, in order from an object side to an image side along an optical path, a reflection group and a lens group.

The reflection group includes a prism. The prism with positive refractive power has an object-side surface being convex. The prism includes a reflection surface configured to reflect an imaging light passing through the object-side surface of the prism and send the imaging light to an image-side surface of the prism.

The lens group includes at least three lens elements arranged along the optical path, and each of the at least three lens elements has an object-side surface facing toward the object side and an image-side surface facing toward the image side. The lens group includes a movable group, and the movable group moves along a direction parallel to an optical axis in a zooming process.

When an axial distance between the object-side surface of the prism and an image surface as the optical imaging lens assembly focuses to a far distance is TLi, an axial distance between the object-side surface of the prism and the image surface as the optical imaging lens assembly focuses to a near distance is TLm, a focal length of the movable group as the optical imaging lens assembly focuses to the far distance is fGM, a focal length of the reflection group as the optical imaging lens assembly focuses to the far distance is fGR, an axial distance between a most object-side surface of the reflection group and a most image-side surface of the reflection group as the optical imaging lens assembly focuses to the far distance is DGR, and a result of subtracting an axial distance from the image surface to the movable group as the optical imaging lens assembly focuses to the far distance from an axial distance from the image surface to the movable group as the optical imaging lens assembly focuses to the near distance is dTGM, the following conditions are satisfied:

$|TLi-TLm|/TLi<3.0E-3$; and $1.0<fGM\times DGR/(fGR\times dTGM)<30$.

According to another aspect of the present disclosure, an optical imaging lens assembly having a zooming function includes, in order from an object side to an image side along an optical path, a reflection group and a lens group.

The reflection group includes a prism. The prism with positive refractive power has an object-side surface being convex. The prism includes a reflection surface configured to reflect an imaging light passing through the object-side surface of the prism and send the imaging light to an image-side surface of the prism.

The lens group includes at least three lens elements arranged along the optical path, and each of the at least three lens elements has an object-side surface facing toward the object side and an image-side surface facing toward the image side. The lens group includes a movable group, and the movable group moves along a direction parallel to an optical axis in a zooming process. In addition, there is no additional lens element disposed between the movable group and an image surface of the optical imaging lens assembly.

When an axial distance between the object-side surface of the prism and the image surface as the optical imaging lens assembly focuses to a far distance is TLi, an axial distance between the object-side surface of the prism and the image surface as the optical imaging lens assembly focuses to a near distance is TLm, a focal length of the reflection group as the optical imaging lens assembly focuses to the far distance is fGR, and an axial distance between a most object-side surface of the reflection group and a most image-side surface of the reflection group as the optical imaging lens assembly focuses to the far distance is DGR, the following conditions are satisfied:

$|TLi-TLm|/TLi<3.0E-3$; and $0<fGR/DGR<65.0$.

According to another aspect of the present disclosure, an optical imaging lens assembly having a zooming function includes, in order from an object side to an image side along an optical path, a reflection group and a lens group.

The reflection group includes a prism. The prism has an object-side surface being convex, and an optically effective area of the prism is made of a single material. The prism includes a reflection surface configured to reflect an imaging light passing through the object-side surface of the prism and send the imaging light to an image-side surface of the prism.

The lens group includes at least three lens elements arranged along the optical path, and each of the at least three lens elements has an object-side surface facing toward the object side and an image-side surface facing toward the image side. The lens group includes a movable group, and the movable group moves along a direction parallel to an optical axis in a zooming process.

When an axial distance between the object-side surface of the prism and an image surface as the optical imaging lens assembly focuses to a far distance is TLi, an axial distance between the object-side surface of the prism and the image surface as the optical imaging lens assembly focuses to a near distance is TLm, a focal length of the movable group as the optical imaging lens assembly focuses to the far distance is fGM, and a result of subtracting an axial distance from the image surface to the movable group as the optical imaging lens assembly focuses to the far distance from an axial distance from the image surface to the movable group as the optical imaging lens assembly focuses to the near distance is dTGM, the following conditions are satisfied:

$|TLi-TLm|/TLi<3.0E-3$; and $1.00<fGM/dTGM$.

According to another aspect of the present disclosure, an image capturing unit includes one of the aforementioned optical imaging lens assemblies and an image sensor, wherein the image sensor is disposed on the image surface of the optical imaging lens assembly.

According to another aspect of the present disclosure, an electronic device includes at least two image capturing units located on the same side of the electronic device. The at least two image capturing units include a first image capturing unit and a second image capturing unit. The first image capturing unit includes one of the aforementioned optical imaging lens assemblies and an image sensor disposed on the image surface of the optical imaging lens assembly. The second image capturing unit includes an optical lens assembly and an image sensor disposed on an image surface of the optical lens assembly. In addition, half of a maximum field of view of the second image capturing unit ranges between 30 degrees and 60 degrees.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
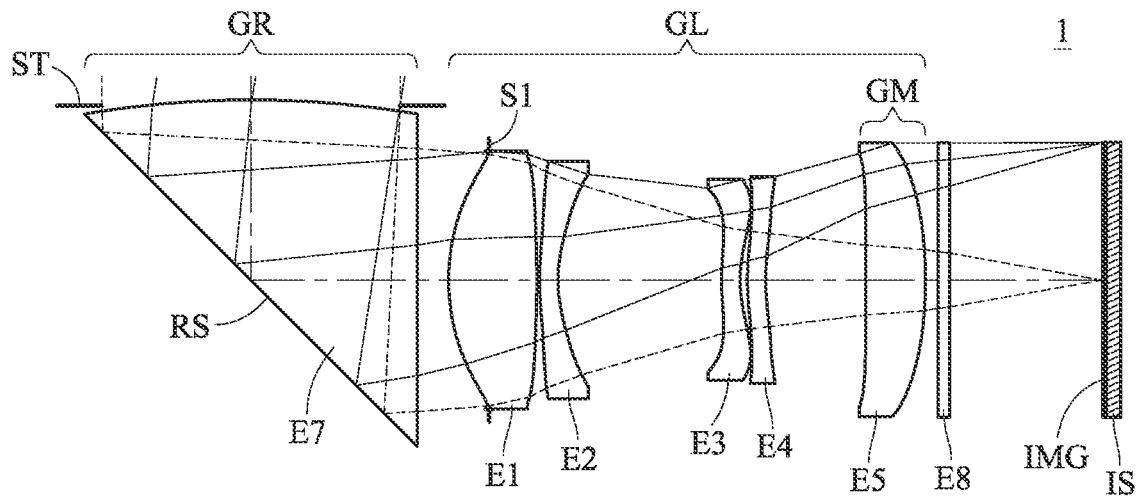
FIG. 1 is a schematic view of an image capturing unit focusing to a far distance according to the 1st embodiment of the present disclosure.

An optical imaging lens assembly includes, in order from an object side to an image side along an optical path, a reflection group and a lens group. Therefore, the space arrangement is favorable for minimizing mechanical design restrictions so as to improve the image quality.

The reflection group includes a prism, and the prism includes a reflection surface configured to reflect an imaging light passing through an object-side surface of the prism and send the imaging light to an image-side surface of the prism. Therefore, the prism working as a reflection element is favorable for reducing the assembly difficulty of the optical imaging lens assembly. The object-side surface of the prism is convex. Therefore, the light travelling direction into the optical imaging lens assembly can be adjusted so as to enlarge the aperture stop and improve the image quality. The prism can have positive refractive power. Therefore, it is favorable for the size reduction of the optical imaging lens assembly and the improvement of the image quality. An optically effective area of the prism can be made of a single material. Therefore, it is favorable for the manufacturing process to be simplified so as to increase manufacturing efficiency. The prism can be made of plastic material. Therefore, the manufacturing efficiency can be increased and the manufacturing difficulty of the prism having curved surface can be reduced. Moreover, when an Abbe number of the prism is Vp, and a refractive index of the prism is Np, the following condition can be satisfied: $30.0<Vp/Np<40.0$. Therefore, the material of the prism is properly selected so as to increase manufacturing yield rate. Moreover, the following condition can also be satisfied: $35.0<Vp/Np<38.0$.

The lens group includes at least three lens elements arranged along the optical path, and each of the at least three lens elements has an object-side surface facing toward the object side and an image-side surface facing toward the image side. Therefore, sufficient number of lens elements is favorable for the lens elements to have more shape variation flexibility so as to improve the image quality. Moreover, the lens group can include at least four lens elements arranged along the optical path. The lens group includes a movable group, and the movable group can move along a direction parallel to an optical axis in a zooming process. Therefore, it is favorable for the size of the mechanism to be reduced. There can be no additional lens element disposed between the movable group and an image surface of the optical imaging lens assembly. Therefore, it is favorable for the complexity of the mechanism to be simplified. There can be no relative motion between lens elements of the movable group in the zooming process. Therefore, it is favorable for the complexity of the mechanism to be simplified. At least one lens element of the lens group can be made of plastic material. Therefore, it is favorable for the mass production to be increased and the weight of the lens group can be reduced. Moreover, at least two lens elements of the lens group can be made of plastic material. Moreover, at least three lens elements of the lens group can be made of plastic material. At least one of the object-side surface and the image-side surface of at least one lens element of the lens group can have at least one inflection point. Therefore, it is favorable for the shape variation of lens surfaces to be increased so as to reduce the size of the optical imaging lens assembly and improve the image quality. Moreover, at least one of the object-side surface and the image-side surface of each of at least two lens elements of the lens group can have at least one inflection point. Moreover, at least one of the object-side surface and the image-side surface of each of at least three lens elements of the lens group can have at least one inflection point. The lens group can include other lens element(s) except that of the movable group. Therefore, it is favorable for the movable group to have a sufficient movement range and the size of the prism to be reduced. The movable group can have a total of one lens element. Therefore, the refractive power and the movement of the movable group are more flexible so as to improve the image quality. The movable group can have positive refractive power. Therefore, it is favorable for the size of the mechanism to be reduced. Please refer to FIG. 28, which shows a schematic view of the inflection points P of the lens elements according to the 1st embodiment of the present disclosure.

According to the present disclosure, the optical imaging lens assembly has a zooming function; that is, a focal length of the optical imaging lens assembly is adjustable, and the optical imaging lens assembly can focus to various object distances by adjusting its focal length, so that the optical imaging lens assembly is applicable to wider applications. Please refer to FIG. 1, FIG. 2 and FIG. 3, which show schematic views of an optical imaging lens assembly of an image capturing unit focusing to a far distance, a distance of 1 m and a distance of 0.5 m according to the 1st embodiment of the present disclosure, respectively. In the following description, said "far distance" can refer to a distance of infinity, and said "near distance" can refer to a distance of 1 m, but the present disclosure is not limited thereto. Moreover, when an object distance is much larger than the focal length of the optical imaging lens assembly and light rays coming from a single field of view are substantially parallel to each other, this object distance can be considered a distance of infinity.

According to the present disclosure, the optical imaging lens assembly can provide optical image stabilization, and some components thereof can be driven by a driving device so as to instantly compensate for image tilt, so that the optical imaging lens assembly can be applicable to wider applications. Moreover, the movable group can be driven by the driving device to be tilted or to move in a direction perpendicular to the optical axis, so that the number of movable components can be reduced, thereby increasing manufacturing yield rate. Moreover, an image sensor can also be driven by the driving device to be tilted or to move in a direction perpendicular to the optical axis so as to simplify the movement complexity during the zooming process and compensation, so that the complexity of the mechanism can be simplified and the image quality can be improved. Moreover, the prism can also be driven by the driving device to be tilted, so that the prism is more adjustable, which is favorable for the performance of optical image stabilization. However, the present disclosure is not limited to the above described driving manner.

At least one optical element of the optical imaging lens assembly can have a non-circular optically effective area. Therefore, it is favorable for the size of the optical imaging lens assembly to be reduced for various applications.

A most object-side lens element of the lens group (i.e., a first lens element counting from the object side to the image side in the lens group) can have positive refractive power. Therefore, it is favorable for the refractive power arrangement of the optical imaging lens assembly so as to reduce the size of the optical imaging lens assembly. The object-side surface of the most object-side lens element of the lens group can be convex in a paraxial region thereof. Therefore, the light travelling direction can be adjusted so as to reduce the outer diameter of the lens group. Please refer to FIG. 27, which shows the most object-side lens element Lf1 of the lens group GL and the object-side surface Lf1f thereof according to the 1st embodiment of the present disclosure.

A second lens element counting from the object side to the image side in the lens group can have negative refractive power. Therefore, it is favorable for the second lens element to collaborate with the most object-side lens element so as to correct aberrations such as spherical aberration. Please refer to FIG. 27, which shows the second lens element Lf2 counting from the object side to the image side in the lens group GL according to the 1st embodiment of the present disclosure.

Figure 27:
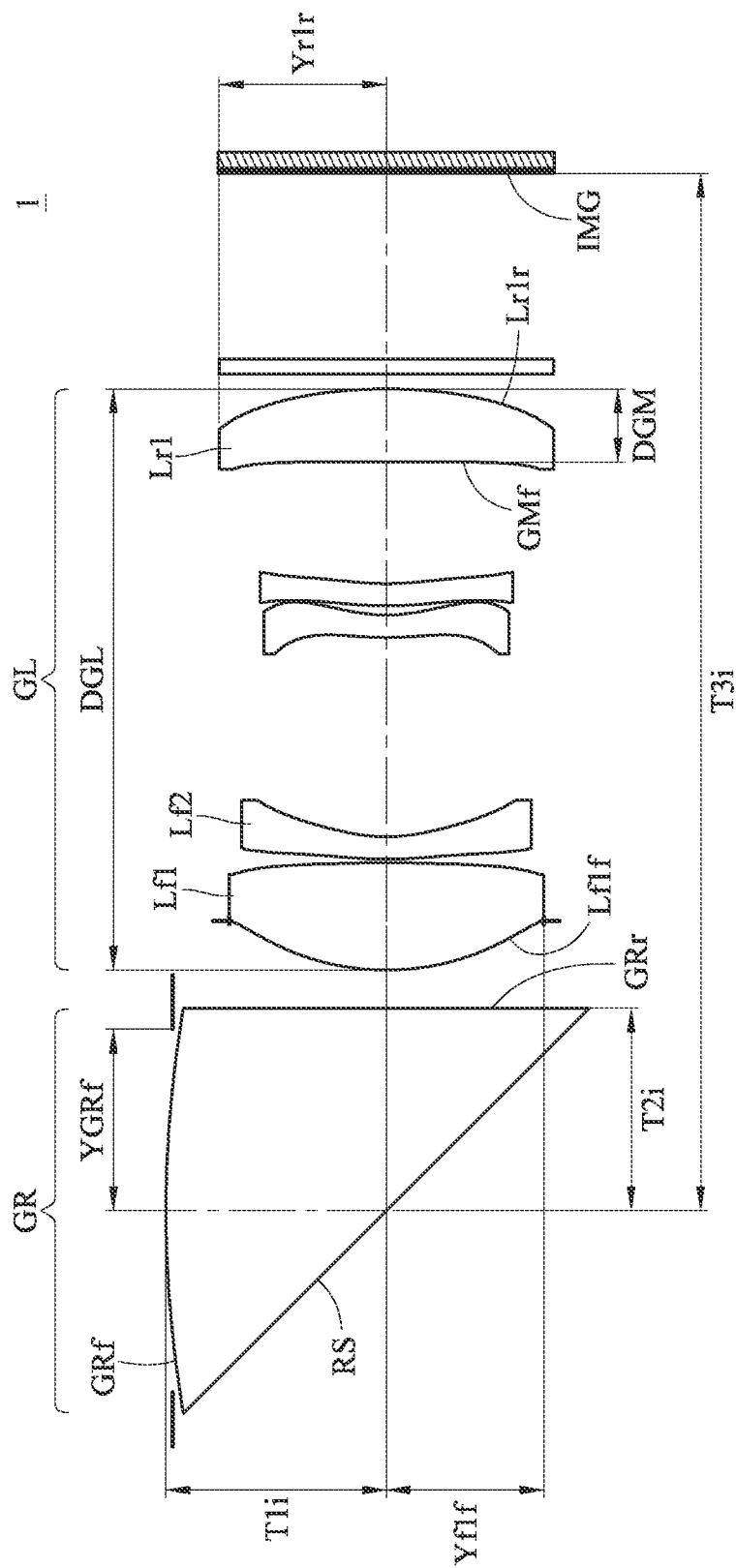
FIG. 27 shows a schematic view of T1$i$, T2$i$, T3$i$, DGL, DGM, Yf1$f$, Yr1$r$ and YGRf and the image capturing unit focusing to the far distance according to the 1st embodiment of the present disclosure.
Figure 28:
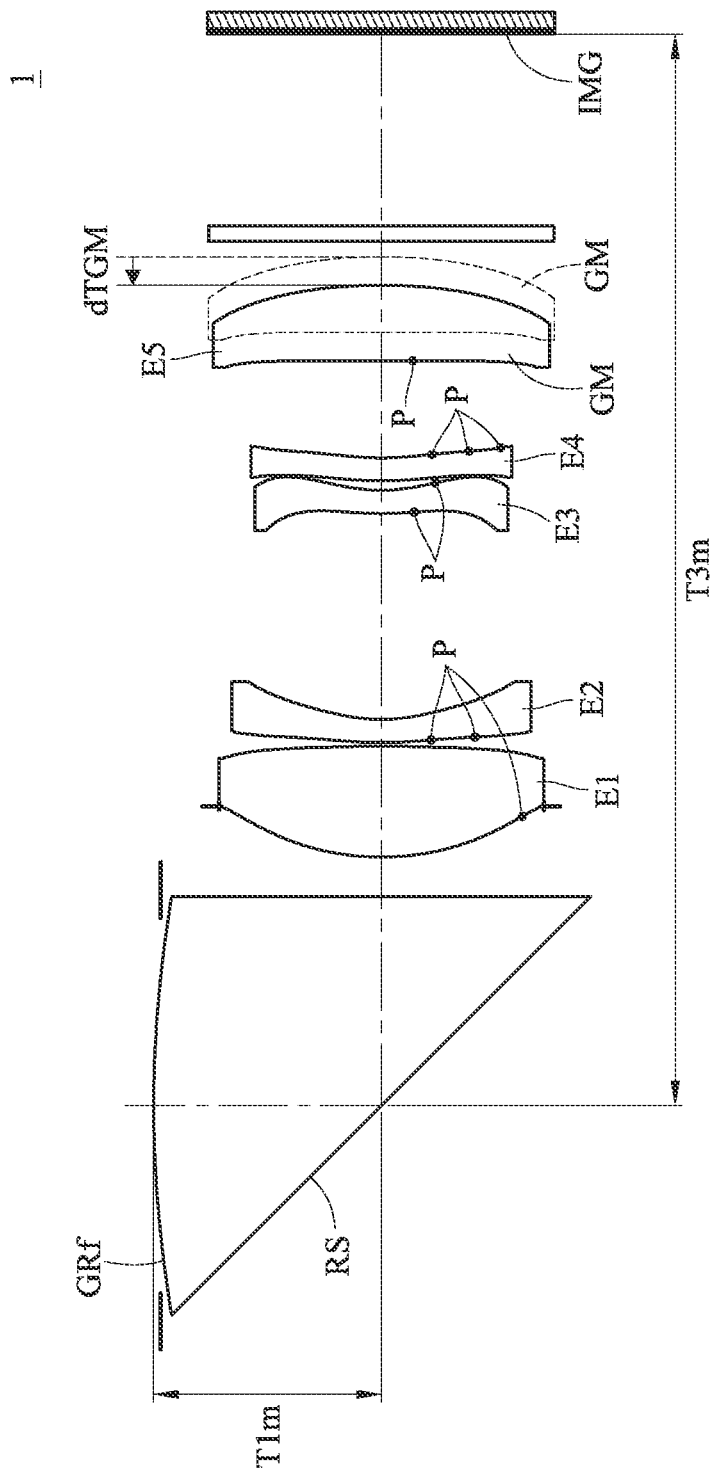
FIG. 28 shows a schematic view of T1$m$, T3$m$, dTGM and inflection points of the lens elements and the image capturing unit focusing to the distance of 1 m according to the 1st embodiment of the present disclosure.

When an axial distance between the object-side surface of the prism and the image surface as the optical imaging lens assembly focuses to a far distance is TLi, and an axial distance between the object-side surface of the prism and the image surface as the optical imaging lens assembly focuses to a near distance is TLm, the following condition is satisfied: $|TLi-TLm|/TLi<3.0E-3$. Therefore, it is favorable for the components arrangement of the optical imaging lens assembly so as to reduce the size of optical imaging lens assembly and improve the image quality. Moreover, the following condition can also be satisfied: $|TLi-TLm|/TLi<1.0E-3$. Moreover, the following condition can also be satisfied: $|TLi-TLm|/TLi<3.0E-4$. Moreover, the following condition can also be satisfied: $|TLi-TLm|/TLi<1.0E-4$. Please refer to FIG. 27 and FIG. 28. FIG. 27 shows a schematic view of T1i, T3i and the image capturing unit focusing to the far distance according to the 1st embodiment of the present disclosure, and FIG. 28 shows a schematic view of T1m, T3m and the image capturing unit focusing to a distance of 1 m according to the 1st embodiment of the present disclosure. As shown in FIG. 27, when the image capturing unit focuses to the far distance, the axial distance between the object-side surface GRf of the prism and the reflection surface RS is T1i, and the axial distance between the reflection surface RS and the image surface IMG is T3i. Furthermore, the aforementioned TLi is the sum of T1i and T3i (i.e., TLi=T1i+T3i). As shown in FIG. 28, when the image capturing unit focuses to a near distance, the axial distance between the object-side surface GRf of the prism and the reflection surface RS is T1m, and the axial distance between the reflection surface RS and the image surface IMG is T3m. Furthermore, the aforementioned TLm is the sum of T1m and T3m (i.e., TLm=T1m+T3m).

When a focal length of the movable group as the optical imaging lens assembly focuses to the far distance is fGM, a focal length of the reflection group as the optical imaging lens assembly focuses to the far distance is fGR, an axial distance between a most object-side surface of the reflection group and a most image-side surface of the reflection group as the optical imaging lens assembly focuses to the far distance is DGR, and a result of subtracting an axial distance from the image surface to the movable group as the optical imaging lens assembly focuses to the far distance from an axial distance from the image surface to the movable group as the optical imaging lens assembly focuses to the near distance is dTGM, the following condition can be satisfied: $1.0<fGM\times DGR/(fGR\times dTGM)<30$. Therefore, it is favorable for the reflection group and the movable group to collaborate with each other so as to provide stable image quality during the zooming process. Moreover, the following condition can also be satisfied: $2.0<fGM\times DGR/(fGR\times dTGM)<27$. Moreover, the following condition can also be satisfied: $4.0<fGM\times DGR/(fGR\times dTGM)<25$. Please refer to FIG. 27 and FIG. 28. FIG. 27 shows a schematic view of T1i, T2i and the image capturing unit focusing to the far distance according to the 1st embodiment of the present disclosure, and FIG. 28 shows a schematic view of dTGM and the image capturing unit focusing to the distance of 1 m according to the 1st embodiment of the present disclosure. As shown in FIG. 27, when the image capturing unit focuses to the far distance, the axial distance between the object-side surface GRf of the prism and the reflection surface RS is T1i, and the axial distance between the reflection surface RS and the image-side surface GRr of the prism is T2i. Furthermore, the aforementioned DGR is the sum of T1i and T2i (i.e., DGR=T1i+T2i). As shown in FIG. 28, when the optical imaging lens assembly is adjusted from focusing to the far distance to focusing to the near distance, the movable group GM moves in a direction parallel to the optical axis towards the object side (e.g., the movable group GM in FIG. 28 moves from the position where the movable group GM in dotted line is located to the position where the movable group GM in solid line is located), the difference between the axial distances between the movable group GM and the image surface IMG is dTGM, and dTGM is positive in FIG. 28. Said focal length of the movable group is a composite focal length of all lens elements in the movable group. The term "most object-side" is used to describe one element that is closest to the imaged object along the optical axis among a group of elements, and the term "most image-side" is used to describe one element that is closest to the image surface along the optical axis among a group of elements.

When the focal length of the reflection group as the optical imaging lens assembly focuses to the far distance is fGR, and the axial distance between the most object-side surface of the reflection group and the most image-side surface of the reflection group as the optical imaging lens assembly focuses to the far distance is DGR, the following condition can be satisfied: $0<fGR/DGR<65.0$. Therefore, the arrangement of the reflection group can be adjusted so that the optical imaging lens assembly can have a long focal length and the size of the optical imaging lens assembly can be reduced. Moreover, the following condition can also be satisfied: $1.00<fGR/DGR<30.0$. Moreover, the following condition can also be satisfied: $1.50<fGR/DGR<18.0$. Moreover, the following condition can also be satisfied: $2.00<fGR/DGR<6.50$.

When the focal length of the movable group as the optical imaging lens assembly focuses to the far distance is fGM, and the result of subtracting the axial distance from the image surface to the movable group as the optical imaging lens assembly focuses to the far distance from the axial distance from the image surface to the movable group as the optical imaging lens assembly focuses to the near distance is dTGM, the following condition can be satisfied: 1.00<fGM/dTGM.

Therefore, it is favorable for the movement manner of the movable group to be adjusted so as to provide stable image quality during the zooming process. Moreover, the following condition can also be satisfied: 5.00<fGM/dTGM<500. Moreover, the following condition can also be satisfied: 10.0<fGM/dTGM<250. Moreover, the following condition can also be satisfied: 15.0<fGM/dTGM<150.

When a focal length of the optical imaging lens assembly focusing to the far distance is fi, and a focal length of the optical imaging lens assembly focusing to the near distance is fm, the following condition can be satisfied: 1.0E-3<(fi−fm)/fi<1.0E-1. Therefore, it is favorable for the balance between the image quality as the optical imaging lens assembly focusing to the far distance and the image quality as the optical imaging lens assembly focusing to the near distance. Moreover, the following condition can also be satisfied: 2.0E-3<(fi−fm)/fi<5.0E-2.

When an axial distance between a most object-side surface of the lens group and a most image-side surface of the lens group as the optical imaging lens assembly focuses to the far distance is DGL, and an axial distance between a most object-side surface of the movable group and a most image-side surface of the movable group as the optical imaging lens assembly focuses to the far distance is DGM, the following condition can be satisfied: 1.0≤DGL/DGM<20. Therefore, it is favorable for the arrangement of the movable group in the lens group so as to obtain a balance between the size and the image quality during the zooming process. Moreover, the following condition can also be satisfied: 2.0<DGL/DGM<10. Please refer to FIG. 27, which shows a schematic view of DGL, DGM and the image capturing unit focusing to the far distance according to the 1st embodiment of the present disclosure, where the axial distance between the most object-side surface Lf1$f$ of the lens group GL and the most image-side surface Lr1$r$ of the lens group GL is DGL, and the axial distance between the most object-side surface GMf of the movable group and the most image-side surface Lr1$r$ of the movable group is DGM.

When the axial distance between the object-side surface of the prism and the image surface as the optical imaging lens assembly focuses to the far distance is TLi, and the focal length of the optical imaging lens assembly focusing to the far distance is fi, the following condition can be satisfied: 0.60<TLi/fi<2.0. Therefore, it is favorable for balance among the depth of field, the field of view and the total track length of the optical imaging lens assembly.

When the axial distance between the object-side surface of the prism and the image surface as the optical imaging lens assembly focuses to the far distance is TLi, and a maximum image height of the optical imaging lens assembly focusing to the far distance (which can be half of a diagonal length of an effective photosensitive area of an image sensor) is ImgHi, the following condition can be satisfied: 4.0<TLi/ImgHi<10. Therefore, it is favorable for the size arrangement of the optical imaging lens assembly so as to adjust the field of view and the size of the image surface.

When a curvature radius of the most object-side surface of the reflection group in a paraxial region thereof is RGRf, and the focal length of the reflection group as the optical imaging lens assembly focuses to the far distance is fGR, the following condition can be satisfied: 0.35<RGRf/fGR<2.0.

Therefore, it is favorable for properly arranging the reflection group so as to correct aberrations.

When the focal length of the reflection group as the optical imaging lens assembly focuses to the far distance is fGR, and a focal length of the most object-side lens element of the lens group is ff1, the following condition can be satisfied: 1.8<fGR/ff1<10. Therefore, it is favorable for the reflection group and the lens group to collaborate with each other so as to reduce the size of the optical imaging lens assembly and correct aberrations. Moreover, the following condition can also be satisfied: 2.2<fGR/ff1<7.5.

When the refractive index of the prism is Np, and a refractive index of the most object-side lens element of the lens group is Nf1, the following condition can be satisfied: |(Np−Nf1)/(Nf1−1.5)|<1.2. Therefore, it is favorable for the material distribution of the optical imaging lens assembly to be adjusted so as to reduce the size of the optical imaging lens assembly and improve the image quality. Moreover, the following condition can also be satisfied: |(Np−Nf1)/(Nf1−1.5)|<0.65.

When the focal length of the movable group as the optical imaging lens assembly focuses to the far distance is fGM, and the axial distance between the most object-side surface of the movable group and the most image-side surface of the movable group as the optical imaging lens assembly focuses to the far distance is DGM, the following condition can be satisfied: 1.5<|fGM/DGM|<30. Therefore, it is favorable for the arrangement of the movable group to be adjusted so as to reduce the required movement range of the movable group during the zooming process. Moreover, the following condition can also be satisfied: 2.0<|fGM/DGM|<20.

When the focal length of the optical imaging lens assembly focusing to the far distance is fi, and the focal length of the reflection group as the optical imaging lens assembly focuses to the far distance is fGR, the following condition can be satisfied: 0.75<fGR/fi<6.5. Therefore, it is favorable for the refractive power of the reflection group to be adjusted so as to reduce the size of the reflection group and reduce aberrations such as spherical aberration. Moreover, the following condition can also be satisfied: 1.0<fGR/fi<3.5.

When the focal length of the optical imaging lens assembly focusing to the far distance is fi, the focal length of the reflection group as the optical imaging lens assembly focuses to the far distance is fGR, and a focal length of the lens group as the optical imaging lens assembly focuses to the far distance is fGL, the following condition can be satisfied: 0.50<fi/fGR+fi/fGL<1.4. Therefore, it is favorable for a proper refractive power distribution so as to reduce sensitivity and provide a long focal length configuration of the optical imaging lens assembly. Said focal length of the lens group is a composite focal length of all lens elements in the lens group.

When a maximum distance between the optical axis and an optically effective area of the object-side surface of the most object-side lens element of the lens group as the optical imaging lens assembly focuses to the far distance is Yf1$f$, and a maximum distance between the optical axis and an optically effective area of the image-side surface of a most image-side lens element of the lens group as the optical imaging lens assembly focuses to the far distance is Yr1$r$, the following condition can be satisfied: 0.50<Yf1$f$/Yr1$r$<2.0. Therefore, the light travelling direction can be adjusted so as to reduce the outer diameter of the optical imaging lens assembly and provide a long focal length configuration. Moreover, the following condition can also be satisfied: 0.60<Yf1$f$/Yr1$r$<1.6. Please refer to FIG. 27, which shows a schematic view of Yf1$f$, Yr1$r$, the most object-side lens element Lf1 and the object-side surface Lf1$f$ thereof, the most image-side lens element Lr1 and the image-side surface Lr1$r$ thereof and the image capturing unit focusing to the far distance according to the 1st embodiment of the present disclosure.

When a maximum distance between the optical axis and an optically effective area of the most object-side surface of the reflection group as the optical imaging lens assembly focuses to the far distance is YGRf, and the maximum distance between the optical axis and the optically effective area of the object-side surface of the most object-side lens element of the lens group as the optical imaging lens assembly focuses to the far distance is Yf1$f$, the following condition can be satisfied: 0.70<YGRf/Yf1$f$<2.0. Therefore, it is favorable for the reflection group and the lens group to collaborate with each other so as to enlarge the aperture stop. Moreover, the following condition can also be satisfied: 0.90<YGRf/Yf1$f$<1.8. Please refer to FIG. 27, which shows a schematic view of YGRf and the image capturing unit focusing to the far distance according to the 1st embodiment of the present disclosure.

When a curvature radius of the object-side surface of the most object-side lens element of the lens group in a paraxial region thereof is Rf1$f$, and the focal length of the most object-side lens element is ff1, the following condition can be satisfied: 0.30<Rf1$f$/ff1<1.2. Therefore, it is favorable for the surface shape and refractive power of the most object-side lens element to be adjusted so as to reduce the size of the optical imaging lens assembly and correct aberrations.

When half of a maximum field of view of the optical imaging lens assembly focusing to the far distance is HFOVi, the following condition can be satisfied: 3.0 degrees<HFOVi<20.0 degrees. Therefore, it is favorable for adjusting the field of view for various applications as the optical imaging lens assembly focuses to the far distance, and providing a telephoto configuration. Moreover, the following condition can also be satisfied: 5.0 degrees<HFOVi<15.0 degrees.

When the focal length of the optical imaging lens assembly focusing to the far distance is fi, and the maximum distance between the optical axis and the optically effective area of the most object-side surface of the reflection group as the optical imaging lens assembly focuses to the far distance is YGRf, the following condition can be satisfied: 3.0<fi/YGRf<8.0. Therefore, it is favorable for the arrangement of the optical imaging lens assembly so as to enlarge the aperture stop. Moreover, the following condition can also be satisfied: 3.5<fi/YGRf<7.0.

When a minimum value among Abbe numbers of all lens elements of the lens group is Vmin, and a maximum value among refractive indices of all lens elements of the lens group is Nmax, the following condition can be satisfied: 5.50<Vmin/Nmax<12.0. Therefore, it is favorable for the material distribution of lens elements of the optical imaging lens assembly to be adjusted so as to reduce the size of the optical imaging lens assembly and correct aberrations.

When the axial distance between the most object-side surface of the reflection group and the most image-side surface of the reflection group as the optical imaging lens assembly focuses to the far distance is DGR, and the axial distance between the most object-side surface of the lens group and the most image-side surface of the lens group as the optical imaging lens assembly focuses to the far distance is DGL, the following condition can be satisfied: 0.30<DGR/DGL<2.0. Therefore, it is favorable for the reflection group and the lens group to collaborate with each other so as to reduce the size of the reflection group and the lens group. Moreover, the following condition can also be satisfied: 0.50<DGR/DGL<1.4.

When the focal length of the optical imaging lens assembly focusing to the far distance is fi, and the focal length of the movable group as the optical imaging lens assembly focuses to the far distance is fGM, the following conditions are satisfied: 0.20<|fi/fGM|<3.5. Therefore, it is favorable for the refractive power of the movable group to be adjusted so as to reduce the required movement range of the movable group and balance the image quality during the zooming process. Moreover, the following condition can also be satisfied: 0.30<|fi/fGM|<2.5.

When the focal length of the reflection group as the optical imaging lens assembly focuses to the far distance is fGR, and the maximum distance between the optical axis and the optically effective area of the most object-side surface of the reflection group as the optical imaging lens assembly focuses to the far distance is YGRf, the following condition can be satisfied: 4.0<fGR/YGRf<30. Therefore, it is favorable for properly arranging the reflection group so as to reduce the size of the optical imaging lens assembly and enlarge the aperture stop. Moreover, the following condition can also be satisfied: 7.0<fGR/YGRf<20.

When the focal length of the most object-side lens element of the lens group is ff1, and a focal length of the second lens element counting from the object side to the image side in the lens group is ff2, the following condition can be satisfied: −10<ff2/ff1<−0.70. Therefore, it is favorable for the refractive power distribution of the lens group to be adjusted so as to correct aberrations. Please refer to FIG. 27, which shows the most object-side lens element Lf1 and the second lens element Lf2 counting from the object side to the image side in the lens group GL according to the 1st embodiment of the present disclosure.

According to the present disclosure, the aforementioned features and conditions can be utilized in numerous combinations so as to achieve corresponding effects.

According to the present disclosure, the lens elements of the optical imaging lens assembly can be made of either glass or plastic material. When the lens elements are made of glass material, the refractive power distribution of the optical imaging lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the optical imaging lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, the parameters of the optical imaging lens assembly, unless otherwise stated, can be the results calculated in the state where the optical imaging lens assembly focuses to the far distance. Said "far distance" can refer to the farthest object distance in the application range. When it is specified that the optical imaging lens assembly focuses to the near distance, the parameters of the optical imaging lens assembly can be the results calculated in the state where the optical imaging lens assembly focuses to a distance of 1 m. In addition, in the following embodiments, said "far distance" refers to a distance of infinity, and said "near distance" refers to a distance of 1 m. However, the present disclosure is not limited to the above-mentioned object distances. In other embodiments, the optical imaging lens assembly can be adjusted to focus on an imaged object located at various distances according to actual requirements.

According to the present disclosure, one or more of the lens elements' material may optionally include an additive which alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa.

According to the present disclosure, the image surface of the optical imaging lens assembly, based on the corresponding image sensor, can be flat or curved, especially a curved surface being concave facing towards the object side of the optical imaging lens assembly.

According to the present disclosure, an image correction unit, such as a field flattener, can be optionally disposed between the lens element closest to the image side of the optical imaging lens assembly along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 29:
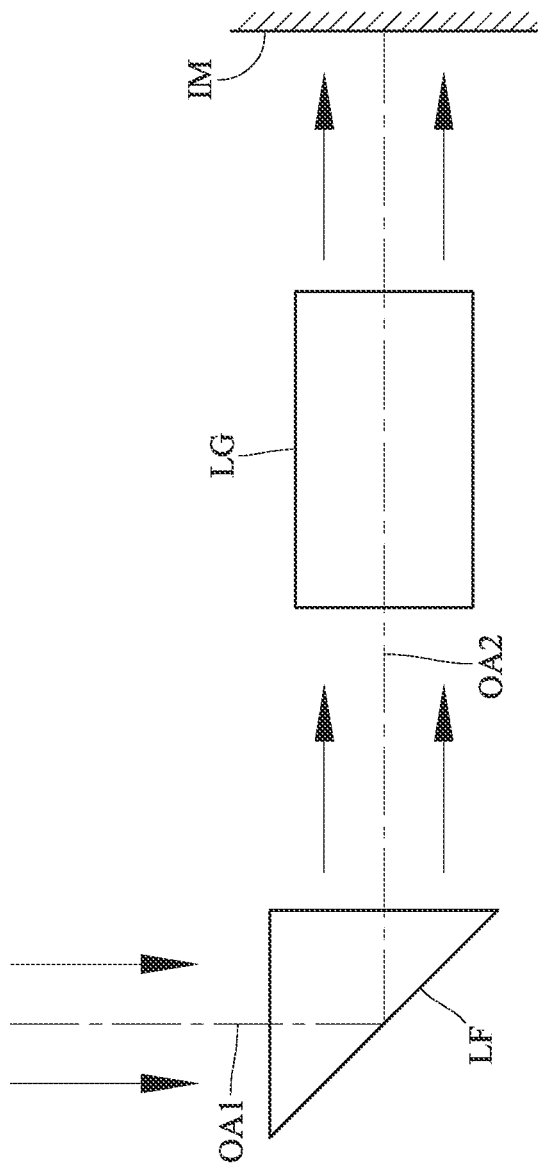
FIG. 29 shows a schematic view of a configuration of a light-folding element in an optical imaging lens assembly according to one embodiment of the present disclosure.
Figure 30:
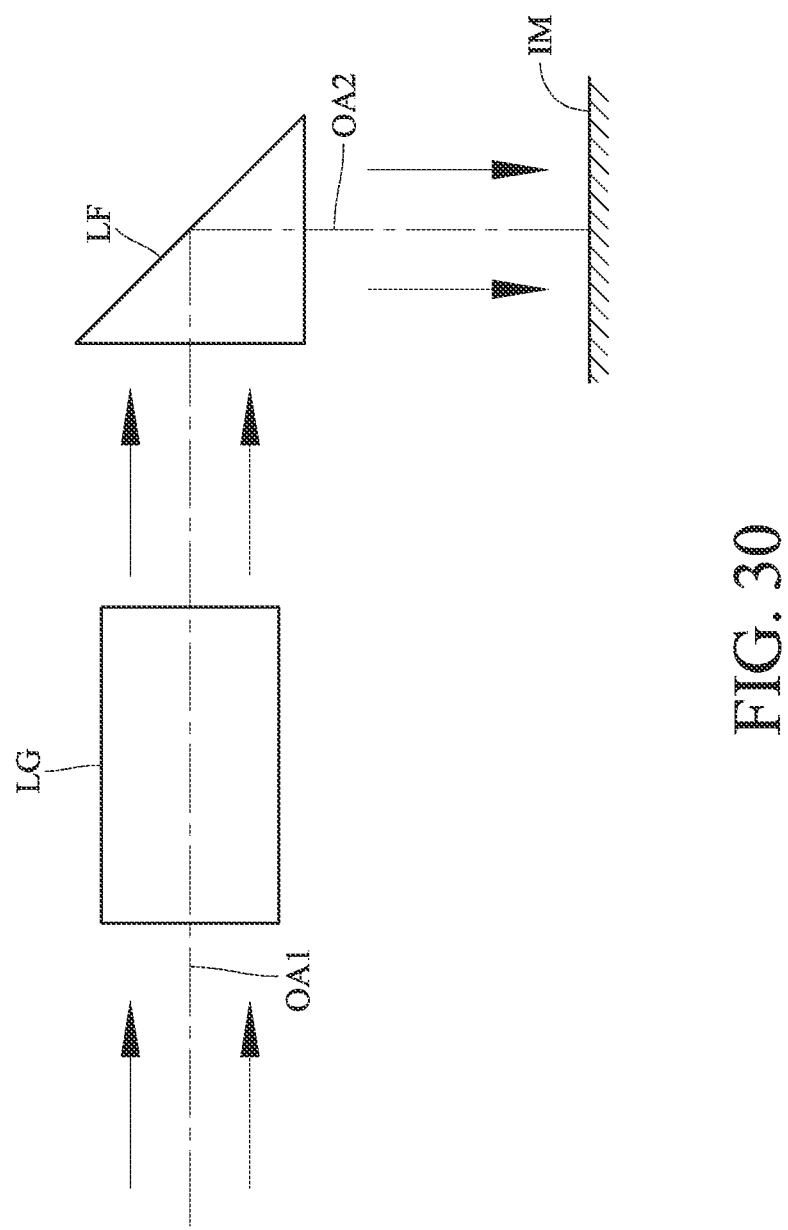
FIG. 30 shows a schematic view of another configuration of a light-folding element in an optical imaging lens assembly according to one embodiment of the present disclosure.
Figure 31:
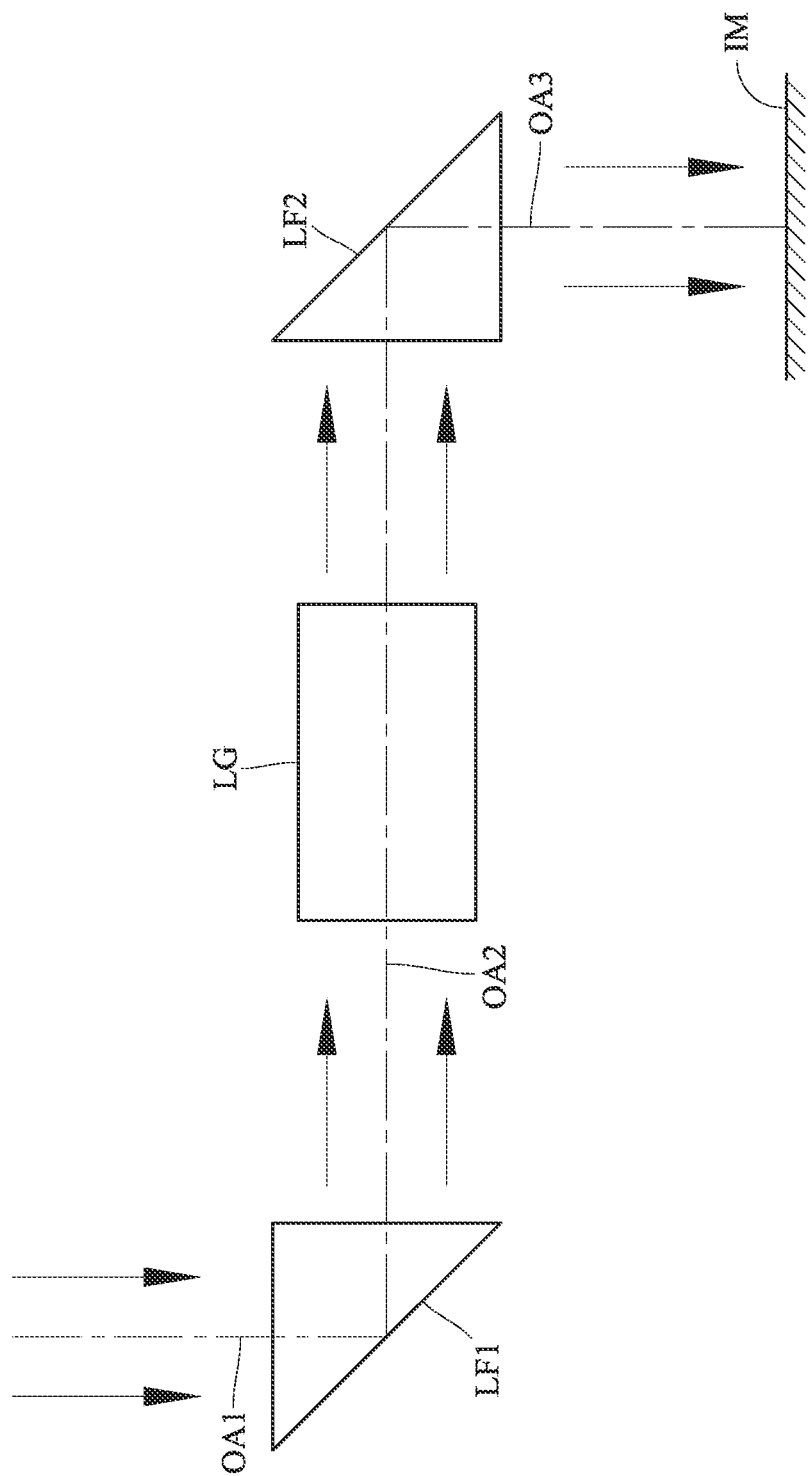
FIG. 31 shows a schematic view of a configuration of two light-folding elements in an optical imaging lens assembly according to one embodiment of the present disclosure.

According to the present disclosure, at least one light-folding element, such as a prism or a mirror, can be optionally disposed between an imaged object and the image surface on the imaging optical path, such that the optical imaging lens assembly can be more flexible in space arrangement, and therefore the dimensions of an electronic device is not restricted by the total track length of the optical imaging lens assembly. Specifically, please refer to FIG. 29 and FIG. 30. FIG. 29 shows a schematic view of a configuration of a light-folding element in an optical imaging lens assembly according to one embodiment of the present disclosure, and FIG. 30 shows a schematic view of another configuration of a light-folding element in an optical imaging lens assembly according to one embodiment of the present disclosure. In FIG. 29 and FIG. 30, the optical imaging lens assembly can have, in order from an imaged object (not shown in the figures) to an image surface IM along an optical path, a first optical axis OA1, a light-folding element LF and a second optical axis OA2. The light-folding element LF can be disposed between the imaged object and a lens group LG of the optical imaging lens assembly as shown in FIG. 29 or disposed between a lens group LG of the optical imaging lens assembly and the image surface IM as shown in FIG. 30. Furthermore, please refer to FIG. 31, which shows a schematic view of a configuration of two light-folding elements in an optical imaging lens assembly according to one embodiment of the present disclosure. In FIG. 31, the optical imaging lens assembly can have, in order from an imaged object (not shown in the figure) to an image surface IM along an optical path, a first optical axis OA1, a first light-folding element LF1, a second optical axis OA2, a second light-folding element LF2 and a third optical axis OA3. The first light-folding element LF1 is disposed between the imaged object and a lens group LG of the optical imaging lens assembly, the second light-folding element LF2 is disposed between the lens group LG of the optical imaging lens assembly and the image surface IM. The optical imaging lens assembly can be optionally provided with three or more light-folding elements, and the present disclosure is not limited to the type, amount and position of the light-folding elements of the embodiments disclosed in the aforementioned figures.

According to the present disclosure, the optical imaging lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical imaging lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the optical imaging lens assembly and thereby provides a wider field of view for the same.

According to the present disclosure, the optical imaging lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the object side and image side are defined in accordance with the direction of the optical axis, and the axial optical data are calculated along the optical axis. Furthermore, if the optical axis is folded by a light-folding element, the axial optical data are also calculated along the folded optical axis. For example, the axial distance between the most object-side surface of the reflection group and the most image-side surface of the reflection group as the optical imaging lens assembly focuses to the far distance (DGR) is the sum of T1$i$ and T2$i$ as shown in FIG. 27 (i.e., DGR=T1$i$–T2$i$), which is calculated along the optical axis. Similar parameters include TL$i$ (i.e., the axial distance between the object-side surface of the prism and the image surface as the optical imaging lens assembly focuses to the far distance) and TL$m$ (i.e., the axial distance between the object-side surface of the prism and the image surface as the optical imaging lens assembly focuses to the near distance).

Figure 32:
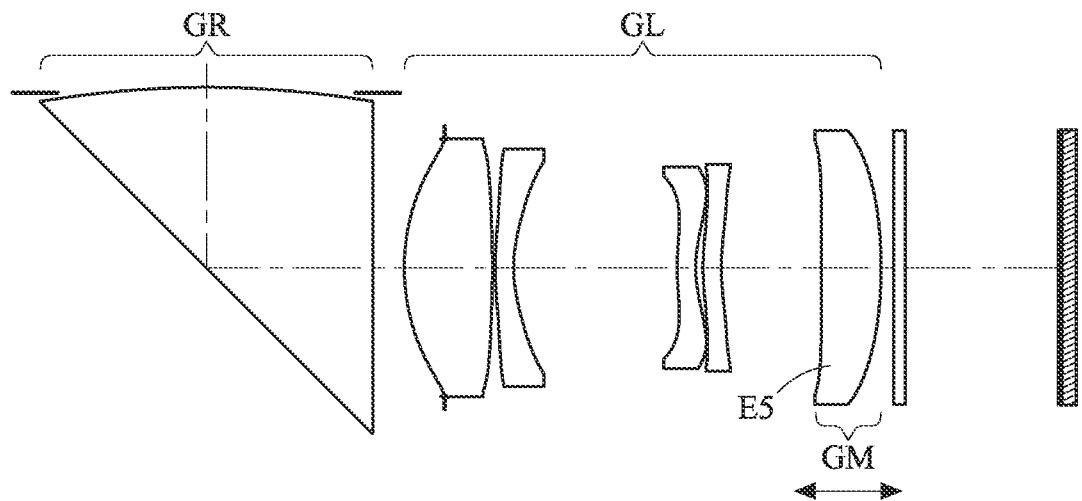
FIG. 32 shows a schematic view of a configuration of a reflection group, a lens group and a movable group in an optical imaging lens assembly according to one embodiment of the present disclosure.
Figure 33:
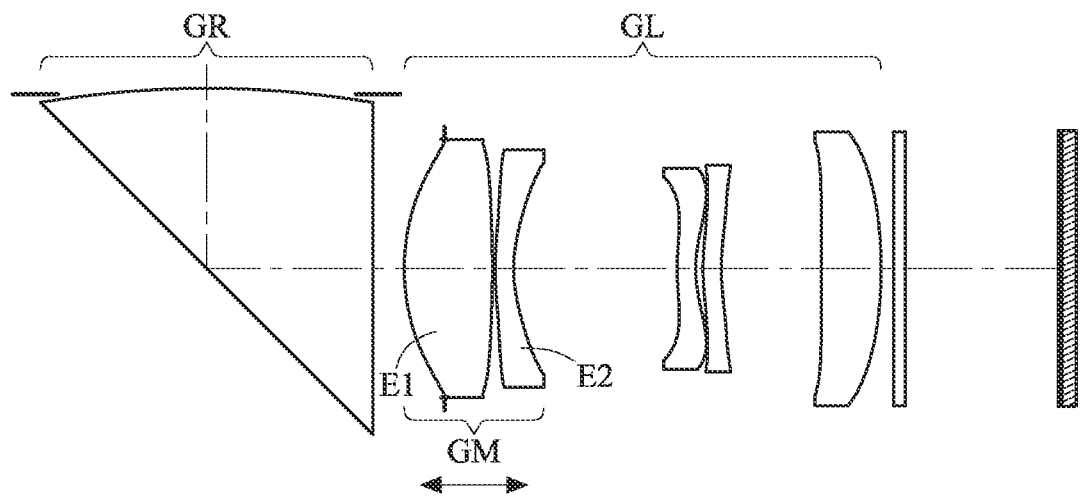
FIG. 33 shows a schematic view of another configuration of a reflection group, a lens group and a movable group in an optical imaging lens assembly according to one embodiment of the present disclosure.
Figure 34:
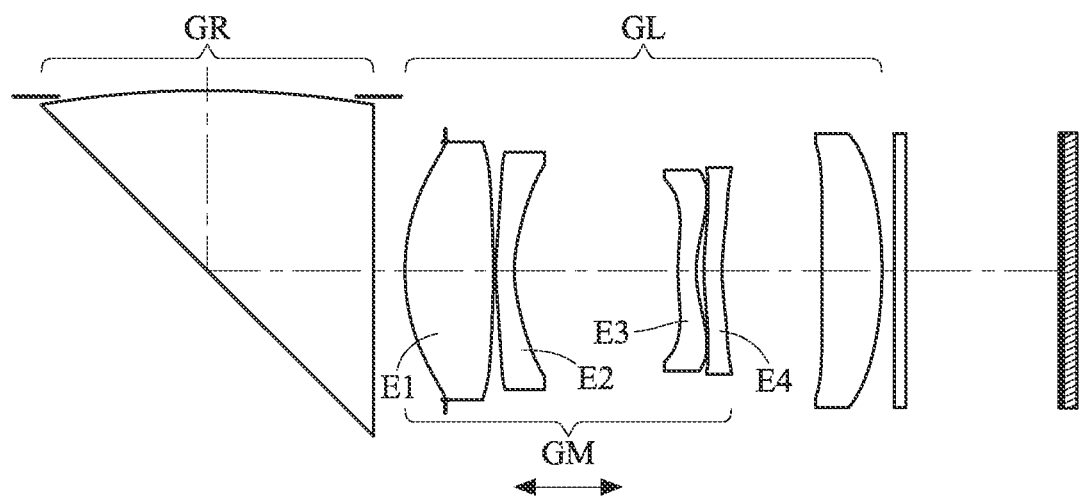
FIG. 34 shows a schematic view of another configuration of a reflection group, a lens group and a movable group in an optical imaging lens assembly according to one embodiment of the present disclosure.

According to the present disclosure, the configuration of the reflection group, the lens group and the movable group can be varied according to actual requirements, and the present disclosure is not limited to the configurations as disclosed in the figures and the specification. For example, please refer to FIG. 32 to FIG. 34, where FIG. 32 shows a schematic view of a configuration of a reflection group, a lens group and a movable group in an optical imaging lens assembly according to one embodiment of the present disclosure, FIG. 33 shows a schematic view of another configuration of a reflection group, a lens group and a movable group in an optical imaging lens assembly according to one embodiment of the present disclosure, and FIG. 34 shows a schematic view of another configuration of a reflection group, a lens group and a movable group in an optical imaging lens assembly according to one embodiment of the present disclosure. As shown in FIG. 32, the optical imaging lens assembly includes a reflection group GR and a lens group GL in order from an object side to an image side along an optical path, and the lens group GL includes a movable group GM. In addition, the movable group GM includes a fifth lens element E5, and the movable group GM moves along a direction parallel to an optical axis in a zooming process. As shown in FIG. 33, the optical imaging lens assembly includes a reflection group GR and a lens group GL in order from an object side to an image side along an optical path, and the lens group GL includes a movable group GM. In addition, the movable group GM includes a first lens element E1 and a second lens element E2, and the movable group GM moves along a direction parallel to an optical axis in a zooming process. As shown in FIG. 34, the optical imaging lens assembly includes a reflection group GR and a lens group GL in order from an object side to an image side along an optical path, and the lens group GL includes a movable group GM. In addition, the movable group GM includes a first lens element E1, a second lens element E2, a third lens element E3 and a fourth lens element E4, and the movable group GM moves along a direction parallel to an optical axis in a zooming process.

According to the above description of the present disclosure, the following specific embodiments are provided for further explanation.

1st Embodiment

Figure 2:
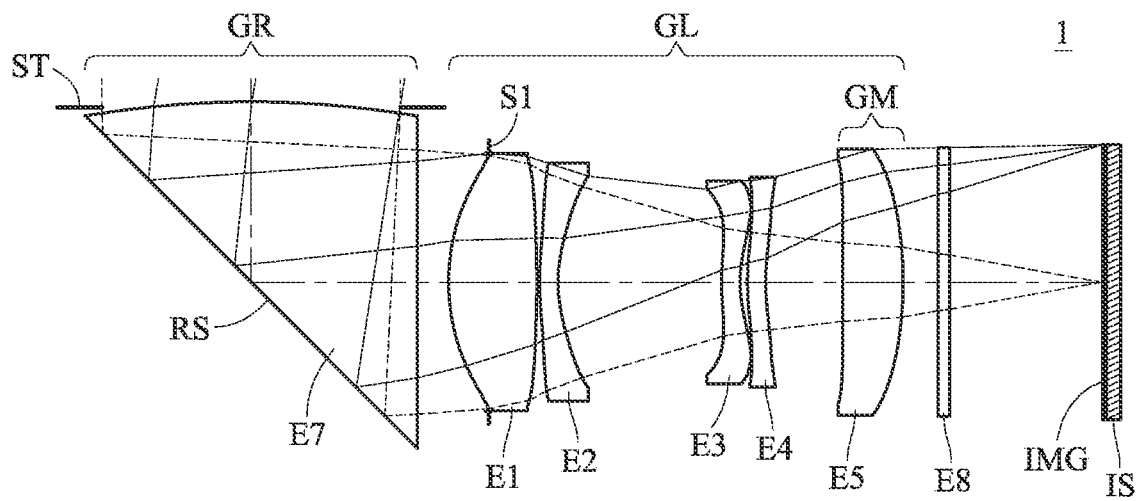
FIG. 2 is a schematic view of the image capturing unit focusing to a distance of 1 m according to the 1st embodiment of the present disclosure.
Figure 3:
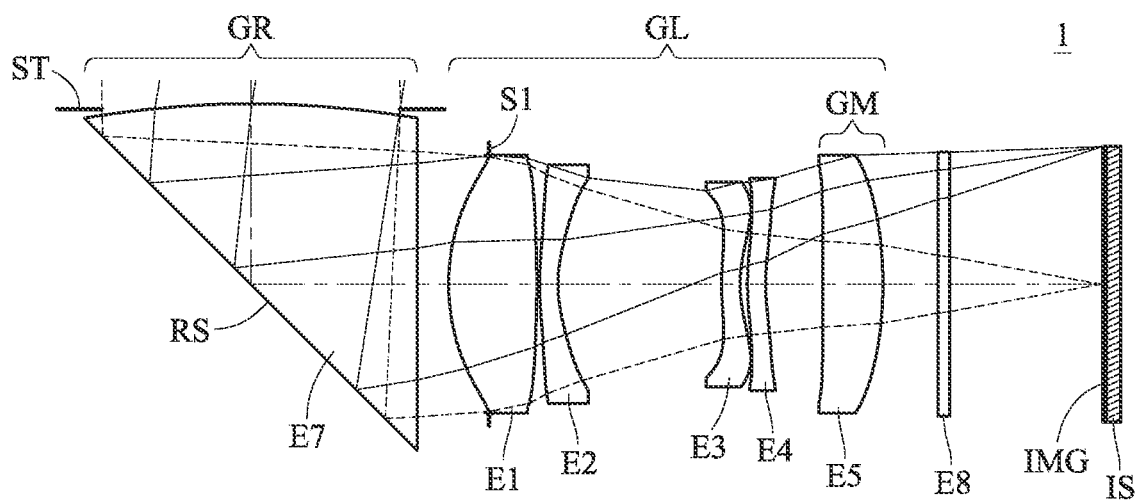
FIG. 3 is a schematic view of the image capturing unit focusing to a distance of 0.5 m according to the 1st embodiment of the present disclosure.
Figure 4:
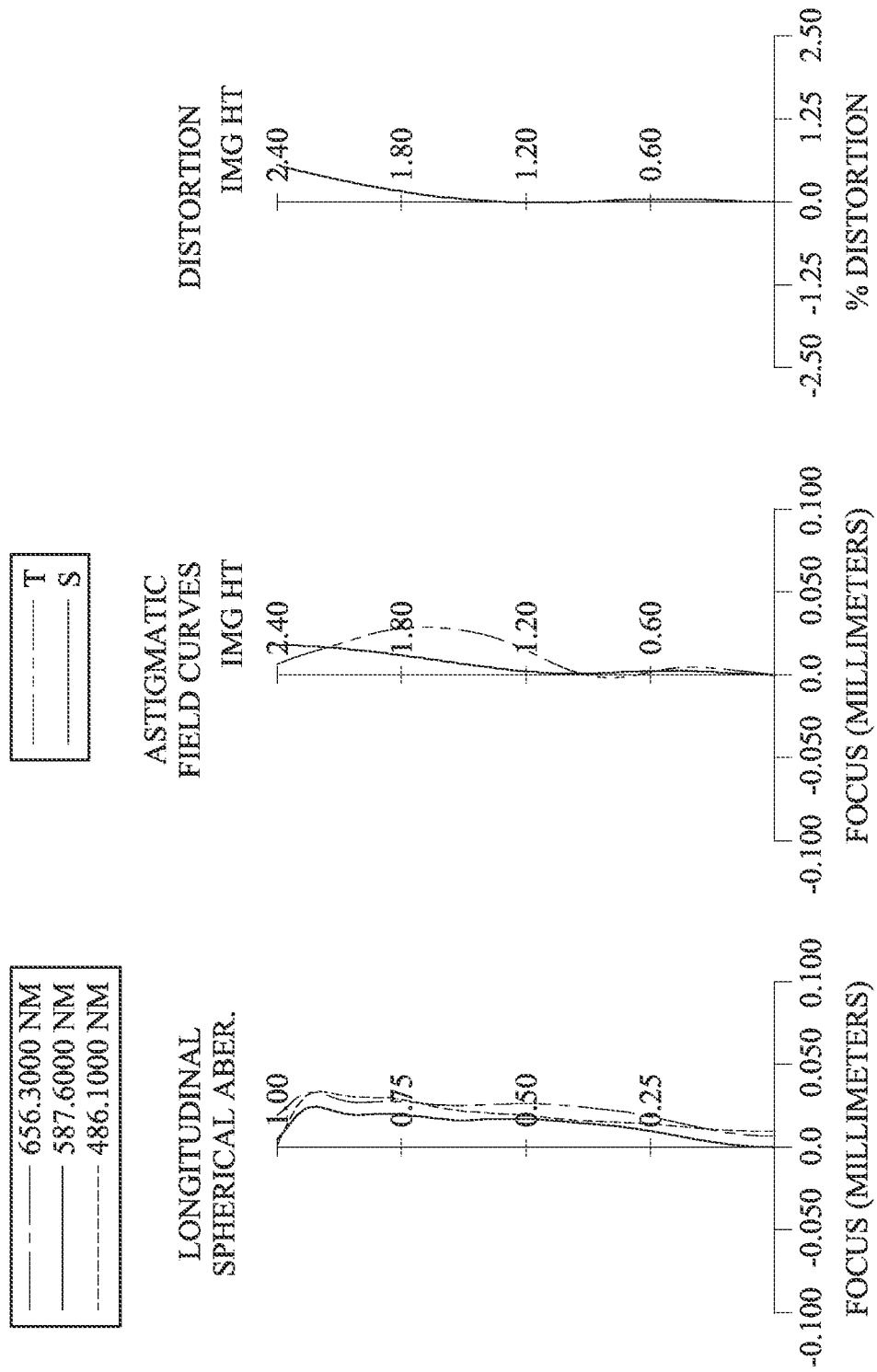
FIG. 4 shows spherical aberration curves, astigmatic field curves and a distortion curve of the image capturing unit focusing to the far distance according to the 1st embodiment.
Figure 5:
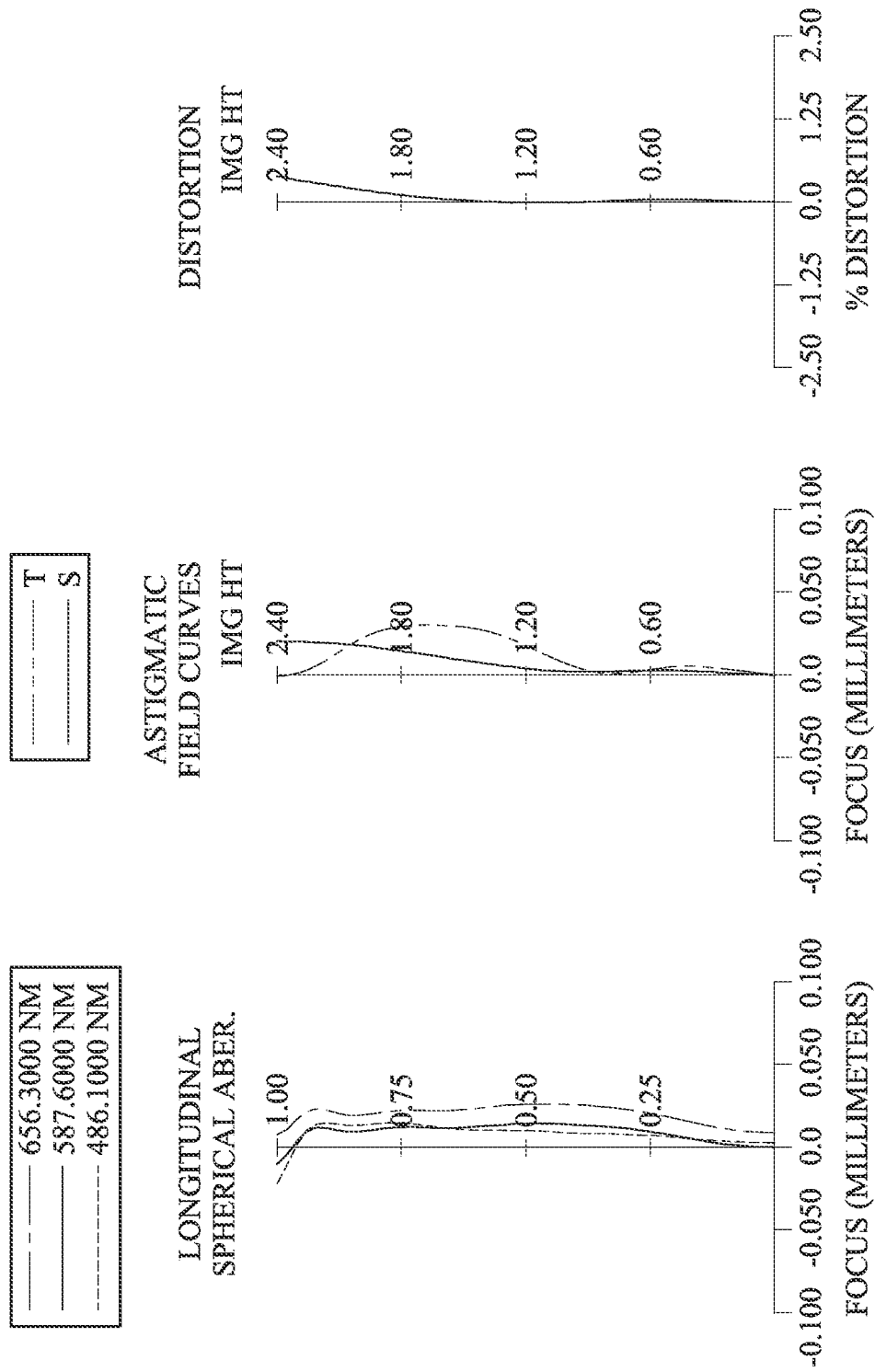
FIG. 5 shows spherical aberration curves, astigmatic field curves and a distortion curve of the image capturing unit focusing to the distance of 1 m according to the 1st embodiment.
Figure 6:
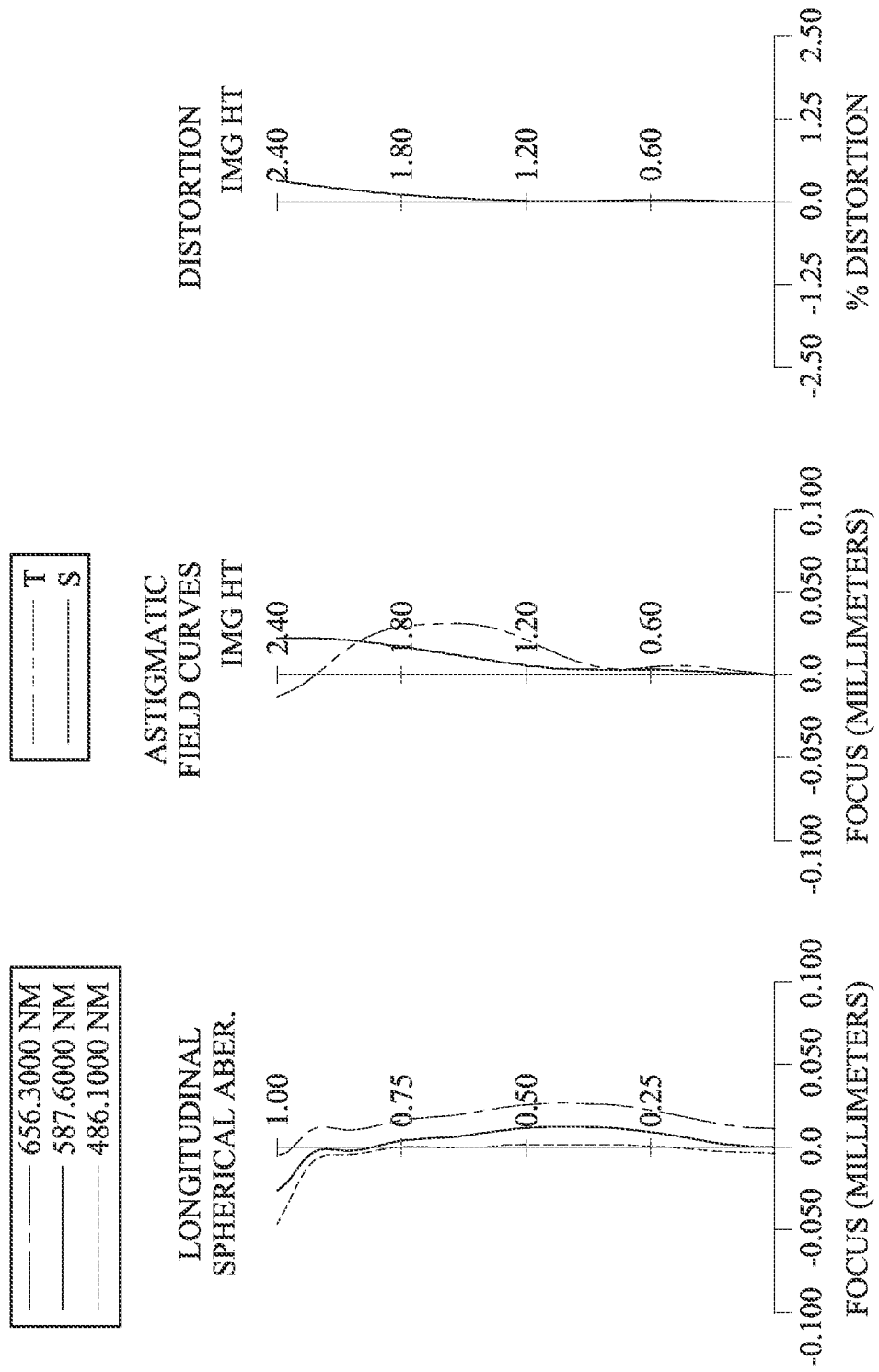
FIG. 6 shows spherical aberration curves, astigmatic field curves and a distortion curve of the image capturing unit focusing to the distance of 0.5 m according to the 1st embodiment.

FIG. 1 is a schematic view of an image capturing unit focusing to a far distance according to the 1st embodiment of the present disclosure. FIG. 2 is a schematic view of the image capturing unit focusing to a distance of 1 m according to the 1st embodiment of the present disclosure. FIG. 3 is a schematic view of the image capturing unit focusing to a distance of 0.5 m according to the 1st embodiment of the present disclosure. FIG. 4 shows, in order from left to right, spherical aberration curves, astigmatic field curves and a distortion curve of the image capturing unit focusing to the far distance according to the 1st embodiment. FIG. 5 shows, in order from left to right, spherical aberration curves, astigmatic field curves and a distortion curve of the image capturing unit focusing to the distance of 1 m according to the 1st embodiment. FIG. 6 shows, in order from left to right, spherical aberration curves, astigmatic field curves and a distortion curve of the image capturing unit focusing to the distance of 0.5 m according to the 1st embodiment. In FIG. 1 to FIG. 3, the image capturing unit 1 includes the optical imaging lens assembly (its reference numeral is omitted) of the present disclosure and an image sensor IS. The optical imaging lens assembly includes, in order from an object side to an image side along an optical path, an aperture stop ST, a prism E7, a stop S1, a first lens element E1, a second lens element E2, a third lens element E3, a fourth lens element E4, the fifth lens element E5, a filter E8 and an image surface IMG. The optical imaging lens assembly includes a reflection group GR and a lens group GL. The reflection group GR includes the prism E7, and the lens group GL includes the first lens element E1, the second lens element E2, the third lens element E3, the fourth lens element E4 and the fifth lens element E5. Moreover, the lens group GL includes a movable group GM, and the movable group GM moves along a direction parallel to an optical axis in a zooming process. In this embodiment, the movable group GM has a single lens element which is the fifth lens element E5, and the movable group GM has positive refractive power. The optical imaging lens assembly includes five lens elements (E1, E2, E3, E4 and E5) with no additional lens element disposed between each of the adjacent five lens elements, and no additional lens element disposed between the movable group GM and the image surface IMG.

The focal length of the optical imaging lens assembly is varied by the movable group GM moving in the direction parallel to the optical axis in the zooming process. As shown in FIG. 1 to FIG. 3, the movable group GM (i.e., the fifth lens element E5) moves along the direction parallel to the optical axis in the zooming process. For example, when the optical imaging lens assembly is changed from focusing to a far distance (e.g., focusing to infinity) to focusing to a near distance (e.g., focusing to a distance of 1 m), the movable group GM moves in the direction parallel to the optical axis towards the object side. In addition, when the optical imaging lens assembly is changed from focusing to a distance of 1 m to focusing to a distance of 0.5 m, the movable group GM further moves in the direction parallel to the optical axis towards the object side.

The prism E7 with positive refractive power has an object-side surface being convex in a paraxial region thereof and an image-side surface being planar. The prism E7 is made of plastic material and has the object-side surface being aspheric. The prism E7 includes a reflection surface RS configured to reflect an imaging light passing through the object-side surface of the prism E7 and send the imaging light to the image-side surface of the prism E7.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has at least one inflection point.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has at least one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has at least one inflection point, and the image-side surface of the third lens element E3 has at least one inflection point.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has at least one inflection point, and the image-side surface of the fourth lens element E4 has at least one inflection point.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has at least one inflection point.

The filter E8 is made of glass material and located between the fifth lens element E5 and the image surface IMG, and will not affect the focal length of the optical imaging lens assembly. The image sensor IS is disposed on or near the image surface IMG of the optical imaging lens assembly.

The equation of the aspheric surface profiles of the aforementioned lens elements of the 1st embodiment is expressed as follows:

$$X(Y) = (Y^2/R)/(1 + \text{sqrt}(1-(1+k) \times (Y/R)^2)) + \sum_i (Ai) \times (Y^i),$$

where,

X is the displacement in parallel with an optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22 and 24.

In the optical imaging lens assembly of the image capturing unit according to the 1st embodiment, a focal length of the optical imaging lens assembly is f, an f-number of the optical imaging lens assembly is Fno, half of a maximum field of view of the optical imaging lens assembly is HFOV, an axial distance between an imaged object and the aperture stop ST is D0, an axial distance between the fourth lens element E4 and the fifth lens element E5 is D12, and an axial distance between the fifth lens element E5 and the filter E8 is D14. With different focusing conditions, the aforementioned parameters may have different values. In this embodiment, three of various focusing states of the optical imaging lens assembly according to different focusing conditions are provided (i.e., different object distances). A first focusing state of the optical imaging lens assembly is a state where the optical imaging lens assembly focuses on an imaged object located at infinity, a second focusing state of the optical imaging lens assembly is a state where the optical imaging lens assembly focuses on an imaged object located at a distance of 1 m, and a third focusing state of the optical imaging lens assembly is a state where the optical imaging lens assembly focuses on an imaged object located at a distance of 0.5 m.

In the first focusing state, the aforementioned parameters have the following values: f=14.87 millimeters (mm), Fno=2.86, HFOV=9.1 degrees (deg.), D0=∞ (infinity), D12=1.739 mm, and D14=0.213 mm.

In the second focusing state, the aforementioned parameters have the following values: f=14.48 mm, Fno=2.82, HFOV=9.2 degrees, D0=1000.000 mm, D12=1.345 mm, and D14=0.607 mm.

In the third focusing state, the aforementioned parameters have the following values: f=14.15 mm, Fno=2.80, HFOV=9.3 degrees, D0=500.000 mm, D12=0.993 mm, and D14=0.959 mm.

According to the above data of the three focusing states and as shown in FIG. 1 and FIG. 2, and taking the focusing condition changing from the first focusing state to the second focusing state as an example, the axial distance between the fifth lens element E5 and the filter E8 increases from 0.213 mm in the first focusing state to 0.607 mm in the second focusing state; that is, in the zooming process, when the object distance decreases, the movable group GM moves along the optical axis towards the object side.

The focusing states of the optical imaging lens assembly focusing on imaged objects located at distances of infinity, 1 m and 0.5 m in this embodiment are only exemplary, and the present disclosure is not limited thereto. The optical imaging lens assembly can be adjusted to focus on an imaged object located at various distances according to actual requirements. Unless otherwise stated, in this embodiment, said "far distance" refers to a distance of infinity, and said "near distance" refers to a distance of 1 m.

When a focal length of the optical imaging lens assembly focusing to the far distance is fi, the following condition is satisfied: fi=14.87 mm.

When a focal length of the optical imaging lens assembly focusing to the near distance is fm, the following condition is satisfied: fm=14.48 mm.

When a focal length of the lens group GL as the optical imaging lens assembly focuses to the far distance is fGL, the following condition is satisfied: fGL=24.89 mm.

When a focal length of the movable group GM as the optical imaging lens assembly focuses to the far distance is fGM, the following condition is satisfied: fGM=10.18 mm.

When a focal length of the reflection group GR as the optical imaging lens assembly focuses to the far distance is fGR, the following condition is satisfied: fGR=30.38 mm.

When half of a maximum field of view of the optical imaging lens assembly focusing to the far distance is HFOVi, the following condition is satisfied: HFOVi=9.1 degrees.

When an axial distance between a most object-side surface of the lens group GL and a most image-side surface of the lens group GL as the optical imaging lens assembly focuses to the far distance is DGL, the following condition is satisfied: DGL=8.321 mm. In this embodiment, said most object-side surface of the lens group GL is the object-side surface of the first lens element E1, and said most image-side surface of the lens group GL is the image-side surface of the fifth lens element E5.

When an axial distance between a most object-side surface of the movable group GM and a most image-side surface of the movable group GM as the optical imaging lens assembly focuses to the far distance is DGM, the following condition is satisfied: DGM=1.048 mm. In this embodiment, said most object-side surface of the movable group GM is the object-side surface of the fifth lens element E5, and said most image-side surface of the movable group GM is the image-side surface of the fifth lens element E5.

When an axial distance between a most object-side surface of the reflection group GR and a most image-side surface of the reflection group GR as the optical imaging lens assembly focuses to the far distance is DGR, the following condition is satisfied: DGR=6.050 mm.

When a result of subtracting an axial distance from the image surface IMG to the movable group GM as the optical imaging lens assembly focuses to the far distance from an axial distance from the image surface IMG to the movable group GM as the optical imaging lens assembly focuses to the near distance is dTGM, the following condition is satisfied: dTGM=0.394 mm.

When a refractive index of the prism E7 is Np, and a refractive index of a most object-side lens element of the lens group GL is Nf1, the following condition is satisfied: |(Np−Nf1)/(Nf1−1.5)|=0.25. In this embodiment, said most object-side lens element of the lens group GL is the first lens element E1.

When a minimum value among Abbe numbers of all lens elements of the lens group GL is Vmin, and a maximum value among refractive indices of all lens elements of the lens group GL is Nmax, the following condition is satisfied: Vmin/Nmax=10.90. In this embodiment, an Abbe number of the fourth lens element E4 and an Abbe number of the fifth lens element E5 are the same and smaller than Abbe numbers of the other lens elements, and Vmin is equal to the Abbe number of the fourth lens element E4 and the Abbe number of the fifth lens element E5. Furthermore, a refractive index of the fourth lens element E4 and a refractive index of the fifth lens element E5 are the same and larger than refractive indices of the other lens elements, and Nmax is equal to the refractive index of the fourth lens element E4 and the refractive index of the fifth lens element E5.

When an Abbe number of the prism E7 is Vp, and the refractive index of the prism E7 is Np, the following condition is satisfied: Vp/Np=36.46.

When an axial distance between the object-side surface of the prism E7 and the image surface IMG as the optical imaging lens assembly focuses to the far distance is TLi, and an axial distance between the object-side surface of the prism E7 and the image surface IMG as the optical imaging lens assembly focuses to the near distance is TLm, the following condition is satisfied: |TLi−TLm|/TLi=0.00E+00.

When the axial distance between the most object-side surface of the lens group GL and the most image-side surface of the lens group GL as the optical imaging lens assembly focuses to the far distance is DGL, and the axial distance between the most object-side surface of the movable group GM and the most image-side surface of the movable group GM as the optical imaging lens assembly focuses to the far distance is DGM, the following condition is satisfied: DGL/DGM=7.94.

When the axial distance between the most object-side surface of the reflection group GR and the most image-side surface of the reflection group GR as the optical imaging lens assembly focuses to the far distance is DGR, and the axial distance between the most object-side surface of the lens group GL and the most image-side surface of the lens group GL as the optical imaging lens assembly focuses to the far distance is DGL, the following condition is satisfied: DGR/DGL=0.73.

When the axial distance between the object-side surface of the prism E7 and the image surface IMG as the optical imaging lens assembly focuses to the far distance is TLi, and the focal length of the optical imaging lens assembly focusing to the far distance is fi, the following condition is satisfied: TLi/fi=1.21.

When the axial distance between the object-side surface of the prism E7 and the image surface IMG as the optical imaging lens assembly focuses to the far distance is TLi, and a maximum image height of the optical imaging lens assembly focusing to the far distance is ImgHi, the following condition is satisfied: TLi/ImgHi=7.50.

When a curvature radius of the object-side surface of the most object-side lens element of the lens group GL in a paraxial region thereof is Rf1f, and a focal length of the most object-side lens element of the lens group GL is ff1, the following condition is satisfied: Rf1f/ff1=0.66.

When a curvature radius of the most object-side surface of the reflection group GR in a paraxial region thereof is RGRf, and the focal length of the reflection group GR as the optical imaging lens assembly focuses to the far distance is fGR, the following condition is satisfied: RGRf/fGR=0.53.

When the focal length of the optical imaging lens assembly focusing to the far distance is fi, and the focal length of the optical imaging lens assembly focusing to the near distance is fm, the following condition is satisfied: (fi−fm)/fi=2.64E-02.

When the focal length of the movable group GM as the optical imaging lens assembly focuses to the far distance is fGM, and the axial distance between the most object-side surface of the movable group GM and the most image-side surface of the movable group GM as the optical imaging lens assembly focuses to the far distance is DGM, the following condition is satisfied: |fGM/DGM|=9.71.

When the focal length of the optical imaging lens assembly focusing to the far distance is fi, and the focal length of the movable group GM as the optical imaging lens assembly focuses to the far distance is fGM, the following condition is satisfied: |fi/fGM|=1.46.

When the focal length of the most object-side lens element of the lens group GL is ff1, and a focal length of a second lens element counting from the object side to the image side in the lens group GL is ff2, the following condition is satisfied: ff2/ff1=−1.21. In this embodiment, the first lens element E1 is the most object-side lens element of the lens group GL, and the second lens element E2 is the second lens element counting from the object side to the image side in the lens group GL.

When the focal length of the movable group GM as the optical imaging lens assembly focuses to the far distance is fGM, the focal length of the reflection group GR as the optical imaging lens assembly focuses to the far distance is fGR, the axial distance between the most object-side surface of the reflection group GR and the most image-side surface of the reflection group GR as the optical imaging lens assembly focuses to the far distance is DGR, and the result of subtracting the axial distance from the image surface IMG to the movable group GM as the optical imaging lens assembly focuses to the far distance from the axial distance from the image surface IMG to the movable group GM as the optical imaging lens assembly focuses to the near distance is dTGM, the following condition is satisfied: fGM×DGR/(fGR×dTGM)=5.14.

When the focal length of the movable group GM as the optical imaging lens assembly focuses to the far distance is fGM, and the result of subtracting the axial distance from the image surface IMG to the movable group GM as the optical imaging lens assembly focuses to the far distance from the axial distance from the image surface IMG to the movable group GM as the optical imaging lens assembly focuses to the near distance is dTGM, the following condition is satisfied: fGM/dTGM=25.83.

When the focal length of the reflection group GR as the optical imaging lens assembly focuses to the far distance is fGR, and the axial distance between the most object-side surface of the reflection group GR and the most image-side surface of the reflection group GR as the optical imaging lens assembly focuses to the far distance is DGR, the following condition is satisfied: fGR/DGR=5.02.

When the focal length of the reflection group GR as the optical imaging lens assembly focuses to the far distance is fGR, and the focal length of the most object-side lens element of the lens group GL is ff1, the following condition is satisfied: fGR/ff1=5.47.

When the focal length of the reflection group GR as the optical imaging lens assembly focuses to the far distance is fGR, and the focal length of the optical imaging lens assembly focusing to the far distance is fi, the following condition is satisfied: fGR/fi=2.04.

When the focal length of the reflection group GR as the optical imaging lens assembly focuses to the far distance is fGR, and a maximum distance between the optical axis and an optically effective area of the most object-side surface of the reflection group GR as the optical imaging lens assembly focuses to the far distance is YGRf, the following condition is satisfied: fGR/YGRf=11.68.

When the focal length of the optical imaging lens assembly focusing to the far distance is fi, the focal length of the reflection group GR as the optical imaging lens assembly focuses to the far distance is fGR, and the focal length of the lens group GL as the optical imaging lens assembly focuses to the far distance is fGL, the following condition is satisfied: fi/fGR+fi/fGL=1.09.

When the focal length of the optical imaging lens assembly focusing to the far distance is fi, and the maximum distance between the optical axis and the optically effective area of the most object-side surface of the reflection group GR as the optical imaging lens assembly focuses to the far distance is YGRf, the following condition is satisfied: fi/YGRf=5.72.

When a maximum distance between the optical axis and an optically effective area of the object-side surface of the most object-side lens element of the lens group GL as the optical imaging lens assembly focuses to the far distance is Yf1f, and a maximum distance between the optical axis and an optically effective area of the image-side surface of a most image-side lens element of the lens group GL as the optical imaging lens assembly focuses to the far distance is Yr1r, the following condition is satisfied: Yf1f/Yr1r=0.94. In this embodiment, said most object-side lens element of the lens group GL is the first lens element E1, and said most image-side lens element of the lens group GL is the fifth lens element E5.

When the maximum distance between the optical axis and the optically effective area of the most object-side surface of the reflection group GR as the optical imaging lens assembly focuses to the far distance is YGRf, and the maximum distance between the optical axis and the optically effective area of the object-side surface of the most object-side lens element of the lens group GL as the optical imaging lens assembly focuses to the far distance is Yf1f, the following condition is satisfied: YGRf/Yf1f=1.15.

The detailed optical data of the 1st embodiment are shown in Table 1 and the aspheric surface data are shown in Table 2 below.

TABLE 1

1st Embodiment

| Surface # | | Curvature Radius | | Thickness | Material | Index | Abbe # | Focal Length |
|---|---|---|---|---|---|---|---|---|
| 0 | Object | Plano | | D0 | | | | |
| 1 | Ape. Stop | Plano | | −0.100 | | | | |
| 2 | Prism | 16.2186 | (ASP) | 6.050 | Plastic | 1.534 | 55.9 | 30.38 |
| 3 | | Plano | | 1.255 | | | | |
| 4 | Stop | Plano | | −0.707 | | | | |
| 5 | Lens 1 | 3.6907 | (ASP) | 1.538 | Plastic | 1.545 | 56.1 | 5.56 |
| 6 | | −14.3685 | (ASP) | 0.050 | | | | |
| 7 | Lens 2 | 5.3864 | (ASP) | 0.320 | Plastic | 1.614 | 25.6 | −6.72 |
| 8 | | 2.2844 | (ASP) | 2.855 | | | | |
| 9 | Lens 3 | 4.4870 | (ASP) | 0.320 | Plastic | 1.587 | 28.3 | −6.88 |
| 10 | | 2.0703 | (ASP) | 0.131 | | | | |
| 11 | Lens 4 | 4.1231 | (ASP) | 0.320 | Plastic | 1.686 | 18.4 | 525.27 |
| 12 | | 4.0391 | (ASP) | D12 | | | | |
| 13 | Lens 5 | 86.6193 | (ASP) | 1.048 | Plastic | 1.686 | 18.4 | 10.18 |
| 14 | | −7.5565 | (ASP) | D14 | | | | |
| 15 | Filter | Plano | | 0.210 | Glass | 1.517 | 64.2 | — |
| 16 | | Plano | | 2.665 | | | | |
| 17 | Image | Plano | | — | | | | |

Note:
Reference wavelength is 587.6 nm (d-line).
An effective radius of the stop S1 (Surface 4) is 2.250 mm.
D0, D12 and D14 vary with different focusing conditions.

TABLE 2

Aspheric Coefficients

| Surface # | 2 | 5 | 6 | 7 | 8 | 9 |
|---|---|---|---|---|---|---|
| k = | 0.00000E+00 | −3.90782E−01 | −2.81155E+00 | −1.66303E+00 | −7.24197E+00 | 3.87689E+00 |
| A4 = | −2.78784E−04 | 3.10232E−03 | 2.46743E−02 | −4.68491E−02 | −1.29337E−02 | −1.06893E−01 |
| A6 = | 1.55322E−05 | 1.09616E−03 | −1.97673E−02 | 1.42085E−02 | 6.46011E−03 | 2.22514E−02 |
| A8 = | −1.32222E−06 | −1.64998E−03 | 9.16388E−03 | −2.38627E−03 | 2.43400E−03 | −5.60034E−03 |
| A10 = | 6.67618E−08 | 1.00836E−03 | −2.55545E−03 | 6.71364E−04 | −2.59435E−03 | −2.40596E−03 |
| A12 = | — | −3.69558E−04 | 3.90772E−04 | −2.33430E−04 | 1.06795E−03 | 2.35546E−03 |
| A14 = | — | 7.95577E−05 | −3.04908E−05 | 3.17094E−05 | −2.31734E−04 | −1.02284E−03 |
| A16 = | — | −9.49769E−06 | 9.70523E−07 | 7.66261E−07 | 2.13658E−05 | 1.73185E−04 |
| A18 = | — | 4.74625E−07 | — | −2.85404E−07 | — | — |

| Surface # | 10 | 11 | 12 | 13 | 14 | — |
|---|---|---|---|---|---|---|
| k = | −4.92008E−01 | 1.51965E+00 | 9.20507E−01 | −9.90000E+01 | −2.70315E+01 | — |
| A4 = | −1.54050E−01 | −1.21009E−01 | −8.88197E−02 | −6.87129E−03 | −1.36949E−02 | — |
| A6 = | 1.53617E−01 | 1.97447E−01 | 1.15944E−01 | 5.55157E−03 | 2.89673E−03 | — |
| A8 = | −1.83618E−01 | −2.91492E−01 | −1.83798E−01 | −5.77426E−03 | −8.27906E−04 | — |
| A10 = | 1.43051E−01 | 2.60294E−01 | 1.89780E−01 | 4.49524E−03 | 1.86337E−04 | — |
| A12 = | −7.08063E−02 | −1.45993E−01 | −1.27549E−01 | −2.61070E−03 | −4.86566E−05 | — |
| A14 = | 2.12180E−02 | 5.29262E−02 | 5.76961E−02 | 1.09082E−03 | 1.84089E−05 | — |
| A16 = | −3.50697E−03 | −1.21268E−02 | −1.73386E−02 | −3.19573E−04 | −6.17493E−06 | — |
| A18 = | 2.45320E−04 | 1.59923E−03 | 3.29555E−03 | 6.31741E−05 | 1.22462E−06 | — |
| A20 = | — | −9.28197E−05 | −3.57547E−04 | −7.94500E−06 | −1.25703E−07 | — |
| A22 = | — | — | 1.68681E−05 | 5.68876E−07 | 5.17756E−09 | — |
| A24 = | — | — | — | −1.75150E−08 | — | — |

In Table 1, the curvature radius, the thickness and the focal length are shown in millimeters (mm). Surface numbers 0-17 represent the surfaces sequentially arranged from the object side to the image side along the optical axis. In Table 2, k represents the conic coefficient of the equation of the aspheric surface profiles. A4-A24 represent the aspheric coefficients ranging from the 4th order to the 24th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 7:
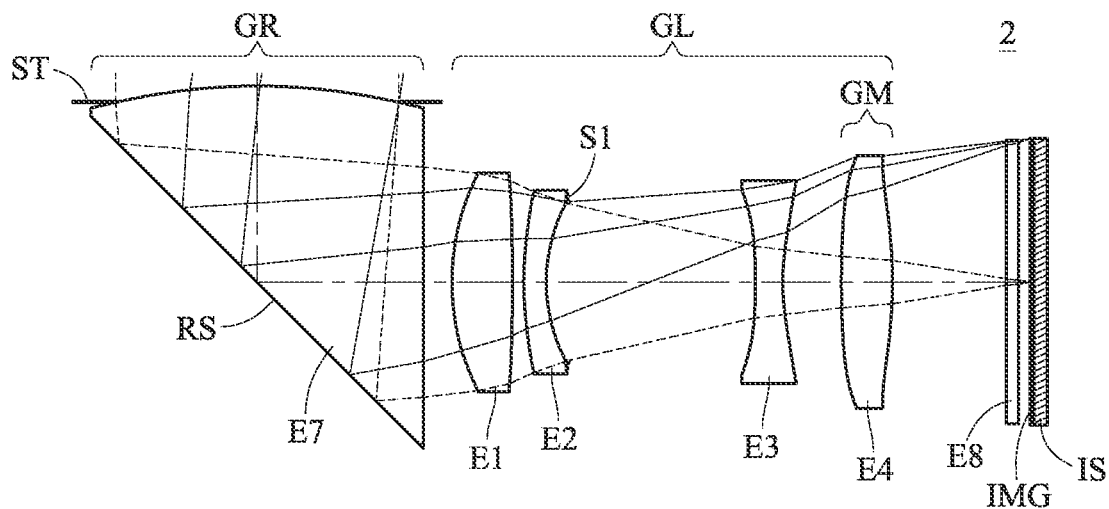
FIG. 7 is a schematic view of an image capturing unit focusing to a far distance according to the 2nd embodiment of the present disclosure.
Figure 8:
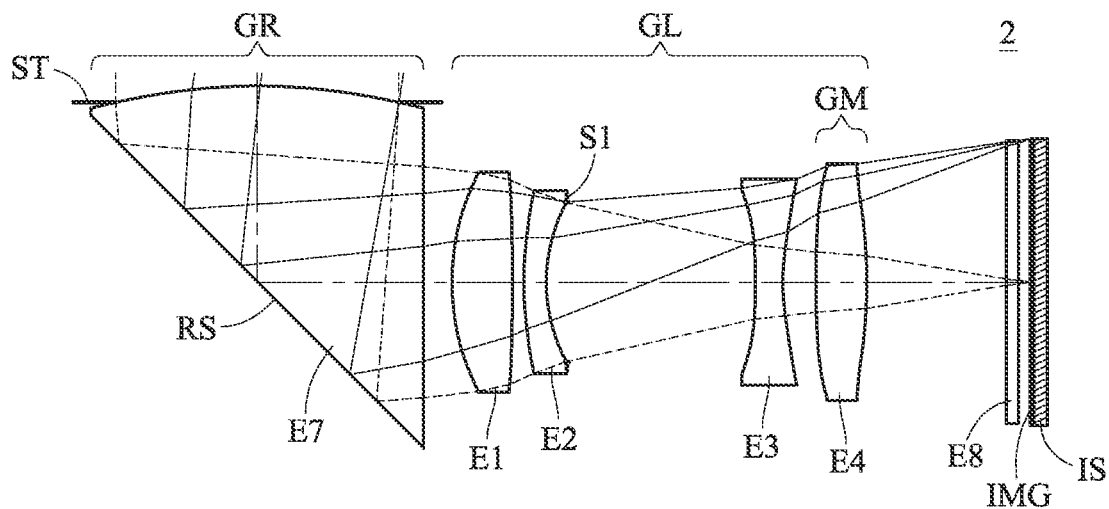
FIG. 8 is a schematic view of the image capturing unit focusing to a distance of 1 m according to the 2nd embodiment of the present disclosure.
Figure 9:
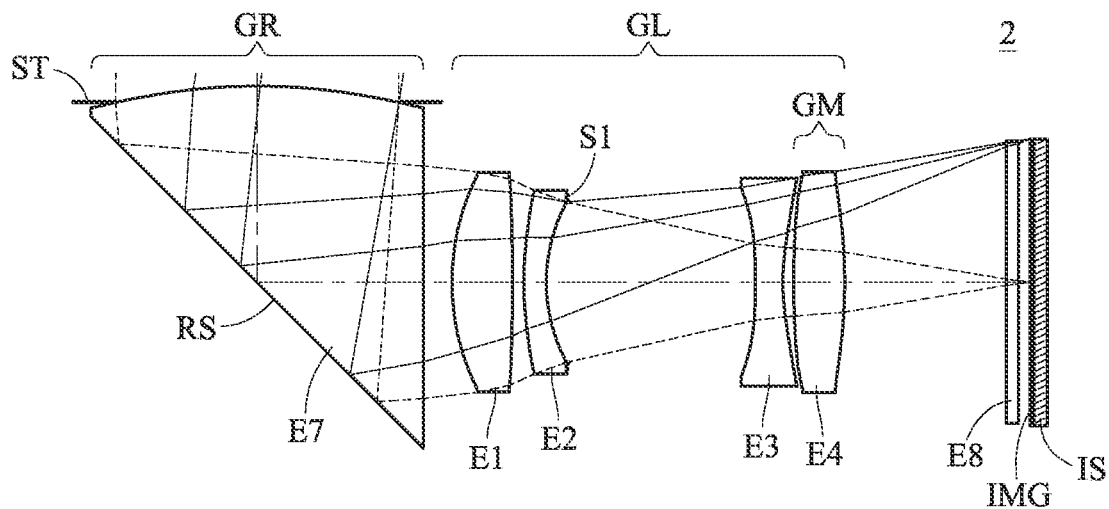
FIG. 9 is a schematic view of the image capturing unit focusing to a distance of 0.5 m according to the 2nd embodiment of the present disclosure.
Figure 10:
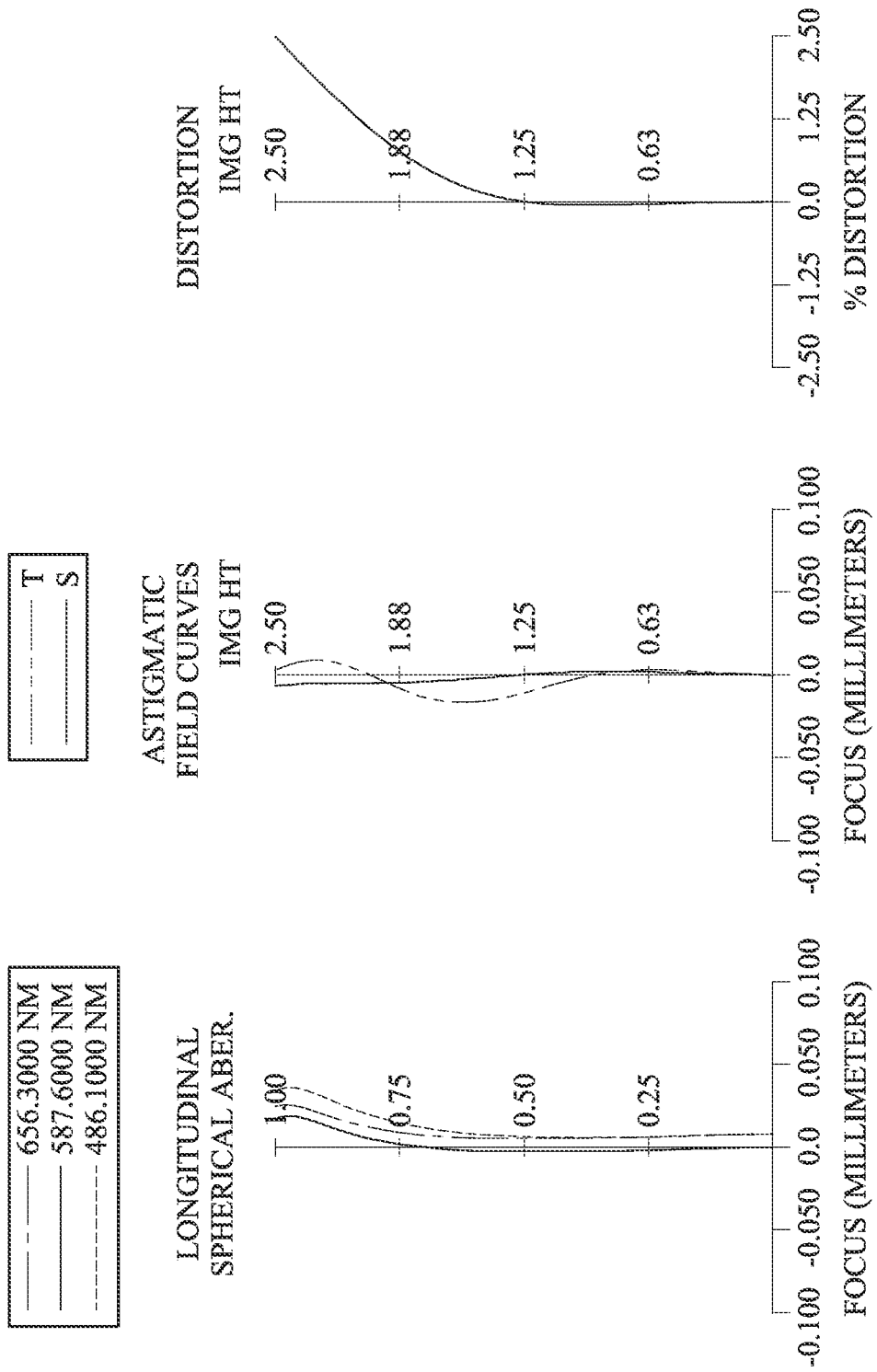
FIG. 10 shows spherical aberration curves, astigmatic field curves and a distortion curve of the image capturing unit focusing to the far distance according to the 2nd embodiment.
Figure 11:
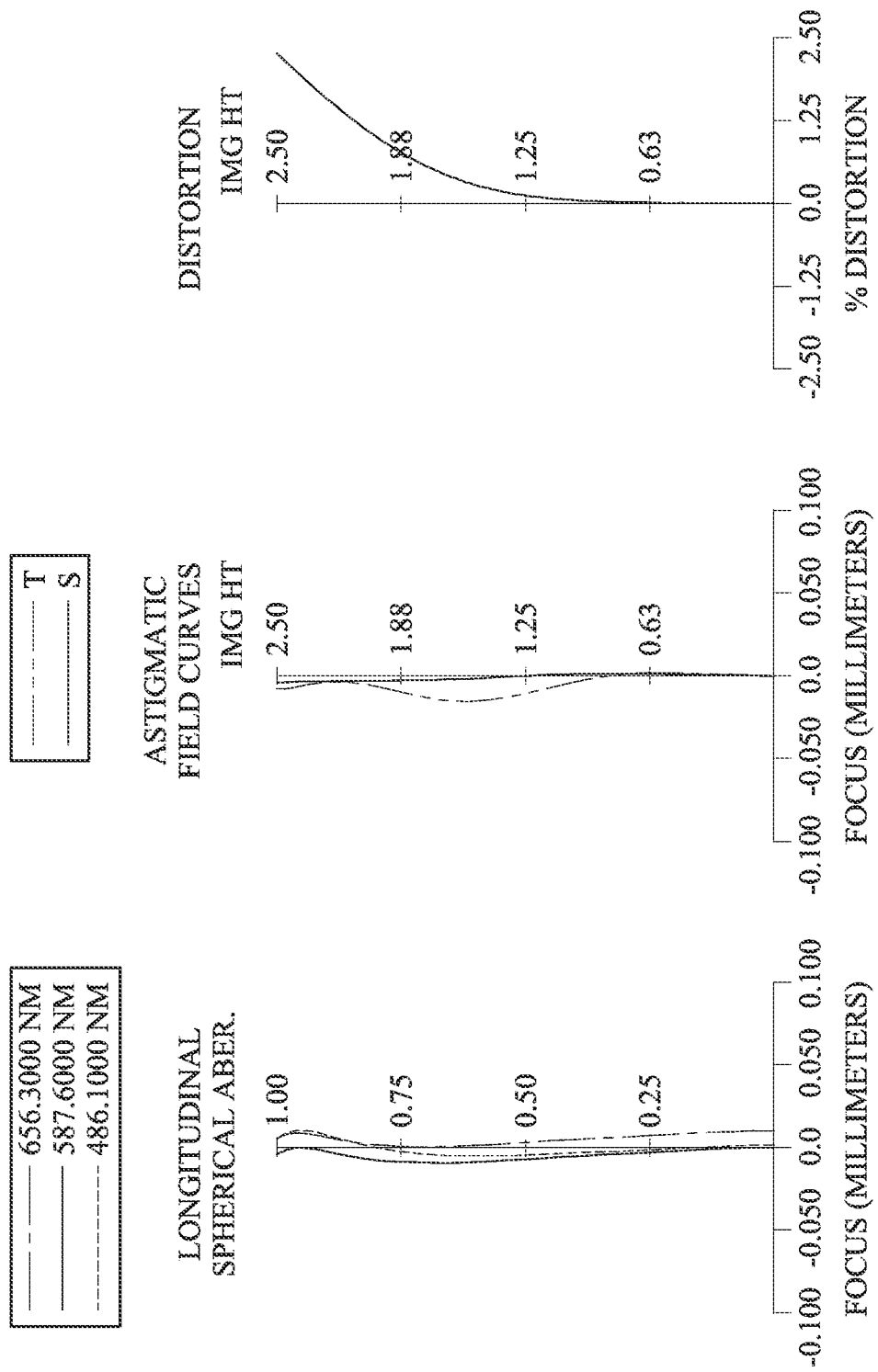
FIG. 11 shows spherical aberration curves, astigmatic field curves and a distortion curve of the image capturing unit focusing to the distance of 1 m according to the 2nd embodiment.
Figure 12:
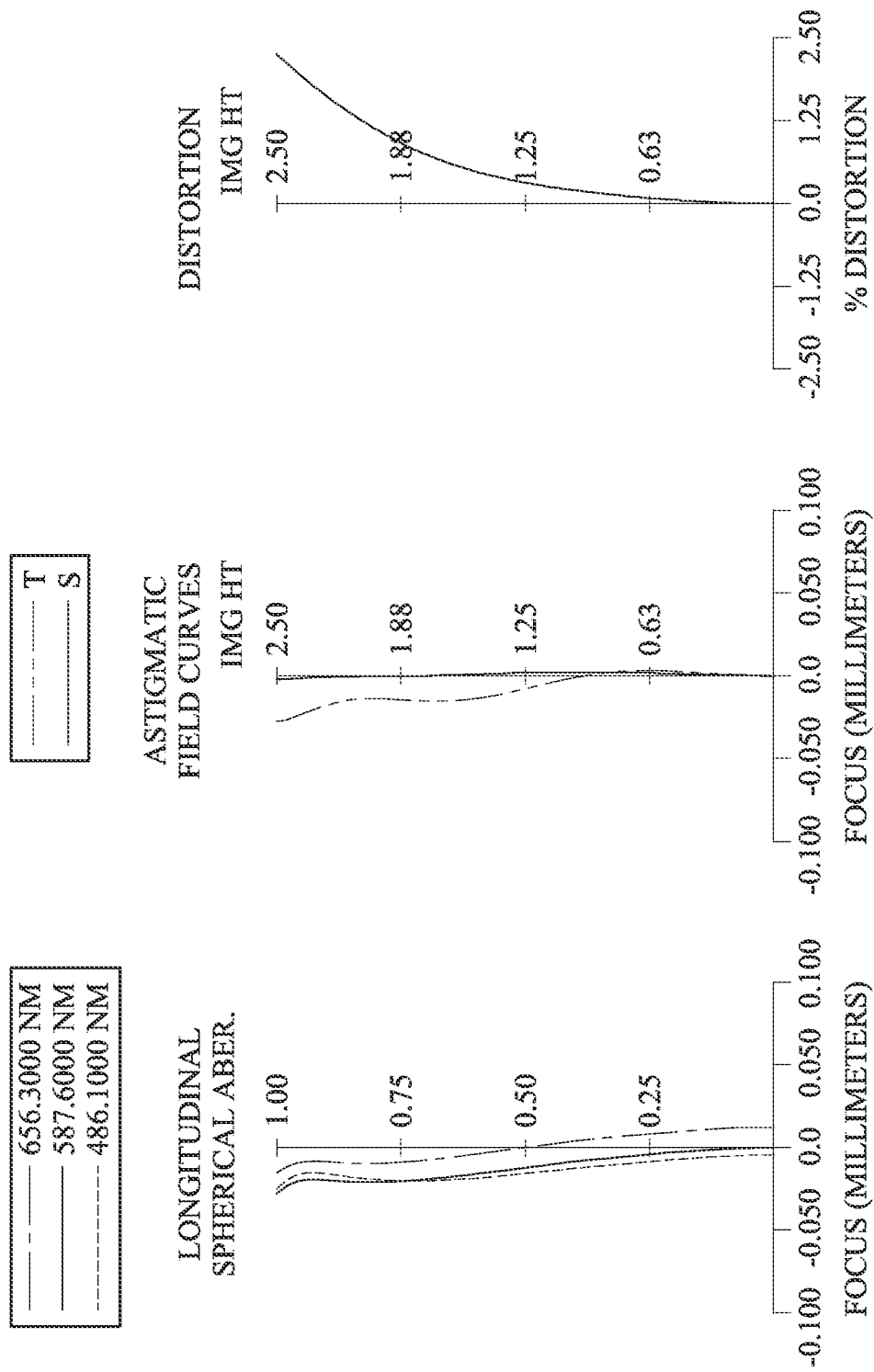
FIG. 12 shows spherical aberration curves, astigmatic field curves and a distortion curve of the image capturing unit focusing to the distance of 0.5 m according to the 2nd embodiment.

FIG. 7 is a schematic view of an image capturing unit focusing to a far distance according to the 2nd embodiment of the present disclosure. FIG. 8 is a schematic view of the image capturing unit focusing to a distance of 1 m according to the 2nd embodiment of the present disclosure. FIG. 9 is a schematic view of the image capturing unit focusing to a distance of 0.5 m according to the 2nd embodiment of the present disclosure. FIG. 10 shows, in order from left to right, spherical aberration curves, astigmatic field curves and a distortion curve of the image capturing unit focusing to the far distance according to the 2nd embodiment. FIG. 11 shows, in order from left to right, spherical aberration curves, astigmatic field curves and a distortion curve of the image capturing unit focusing to the distance of 1 m according to the 2nd embodiment. FIG. 12 shows, in order from left to right, spherical aberration curves, astigmatic field curves and a distortion curve of the image capturing unit focusing to the distance of 0.5 m according to the 2nd embodiment. In FIG. 7 to FIG. 9, the image capturing unit 2 includes the optical imaging lens assembly (its reference numeral is omitted) of the present disclosure and an image sensor IS. The optical imaging lens assembly includes, in order from an object side to an image side along an optical path, an aperture stop ST, a prism E7, a first lens element E1, a second lens element E2, a stop S1, a third lens element E3, a fourth lens element E4, a filter E8 and an image surface IMG. The optical imaging lens assembly includes a reflection group GR and a lens group GL. The reflection group GR includes the prism E7, and the lens group GL includes the first lens element E1, the second lens element E2, the third lens element E3 and the fourth lens element E4. Moreover, the lens group GL includes a movable group GM, and the movable group GM moves along a direction parallel to an optical axis in a zooming process. In this embodiment, the movable group GM has a single lens element which is the fourth lens element E4, and the movable group GM has positive refractive power. The optical imaging lens assembly includes four lens elements (E1, E2, E3 and E4) with no additional lens element disposed between each of the adjacent four lens elements, and no additional lens element disposed between the movable group GM and the image surface IMG.

The focal length of the optical imaging lens assembly is varied by the movable group GM moving in the direction parallel to the optical axis in the zooming process. As shown in FIG. 7 to FIG. 9, the movable group GM (i.e., the fourth lens element E4) moves along the direction parallel to the optical axis in the zooming process. For example, when the optical imaging lens assembly is changed from focusing to a far distance (e.g., focusing to infinity) to focusing to a near distance (e.g., focusing to a distance of 1 m), the movable group GM moves in the direction parallel to the optical axis towards the object side. In addition, when the optical imaging lens assembly is changed from focusing to a distance of 1 m to focusing to a distance of 0.5 m, the movable group GM further moves in the direction parallel to the optical axis towards the object side.

The prism E7 with positive refractive power has an object-side surface being convex in a paraxial region thereof and an image-side surface being planar. The prism E7 is made of plastic material and has the object-side surface being aspheric. The prism E7 includes a reflection surface RS configured to reflect an imaging light passing through the object-side surface of the prism E7 and send the imaging light to the image-side surface of the prism E7.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The object-side surface of the first lens element E1 has at least one inflection point.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with negative refractive power has an object-side surface being concave in a paraxial region thereof and an image-side surface being concave in a paraxial region thereof. The third lens element E3 is made of plastic material and has the object-side surface and the image-side surface being both aspheric. The object-side surface of the third lens element E3 has at least one inflection point.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The image-side surface of the fourth lens element E4 has at least one inflection point.

The filter E8 is made of glass material and located between the fourth lens element E4 and the image surface IMG, and will not affect the focal length of the optical imaging lens assembly. The image sensor IS is disposed on or near the image surface IMG of the optical imaging lens assembly.

In this embodiment, the first lens element E1 is a most object-side lens element of the lens group GL, the second lens element E2 is a second lens element counting from the object side to the image side in the lens group GL, and the fourth lens element E4 is a most image-side lens element of the lens group GL.

The detailed optical data of the 2nd embodiment are shown in Table 3 and the aspheric surface data are shown in Table 4 below. In this embodiment, three of various focusing states of the optical imaging lens assembly according to different focusing conditions are provided. A first focusing state of the optical imaging lens assembly is a state where the optical imaging lens assembly focuses on an imaged object located at infinity, a second focusing state of the optical imaging lens assembly is a state where the optical imaging lens assembly focuses on an imaged object located at a distance of 1 m, and a third focusing state of the optical imaging lens assembly is a state where the optical imaging lens assembly focuses on an imaged object located at a distance of 0.5 m. The focusing states of the optical imaging lens assembly focusing on imaged objects located at distances of infinity, 1 m and 0.5 m in this embodiment are only exemplary, and the present disclosure is not limited thereto. The optical imaging lens assembly can be adjusted to focus on an imaged object located at various distances according to actual requirements. Furthermore, in this embodiment, an axial distance between the third lens element E3 and the fourth lens element E4 is D10, and an axial distance between the fourth lens element E4 and the filter E8 is D12.

| 2nd Embodiment | | | |
|---|---|---|---|
| | 1st focusing state | 2nd focusing state | 3rd focusing state |
| f [mm] | 15.38 | 14.86 | 14.44 |
| Fno | 3.11 | 3.07 | 3.05 |
| HFOV [deg.] | 9.0 | 9.2 | 9.2 |
| D0 [mm] | ∞ | 1000.000 | 500.000 |
| D10 [mm] | 1.021 | 0.574 | 0.190 |
| D12 [mm] | 1.995 | 2.441 | 2.825 |

According to the above table and as shown in FIG. 7 and FIG. 8, and taking the focusing condition changing from the first focusing state to the second focusing state as an example, the axial distance between the fourth lens element E4 and the filter E8 increases from 1.995 mm in the first focusing state to 2.441 mm in the second focusing state; that is, in the zooming process, when the object distance decreases, the movable group GM moves along the optical axis towards the object side.

TABLE 3

| 2nd Embodiment | | | | | | | |
|---|---|---|---|---|---|---|---|
| Surface # | | Curvature Radius | Thickness | Material | Index | Abbe # | Focal Length |
| 0 | Object | Plano | D0 | | | | |
| 1 | Ape. Stop | Plano | −0.280 | | | | |
| 2 | Prism | 10.1475 (ASP) | 6.326 | Plastic | 1.535 | 56.4 | 18.96 |
| 3 | | Plano | 0.500 | | | | |
| 4 | Lens 1 | 4.5463 (ASP) | 1.052 | Plastic | 1.545 | 56.0 | 7.17 |
| 5 | | −25.4841 (ASP) | 0.198 | | | | |
| 6 | Lens 2 | 5.5494 (ASP) | 0.390 | Plastic | 1.671 | 19.5 | −7.94 |
| 7 | | 2.6420 (ASP) | 0.361 | | | | |
| 8 | Stop | Plano | 3.287 | | | | |
| 9 | Lens 3 | −18.5860 (ASP) | 0.481 | Plastic | 1.545 | 56.0 | −5.75 |
| 10 | | 3.7976 (ASP) | D10 | | | | |
| 11 | Lens 4 | 17.7438 (ASP) | 0.889 | Plastic | 1.671 | 19.5 | 9.32 |
| 12 | | −9.4720 (ASP) | D12 | | | | |
| 13 | Filter | Plano | 0.210 | Glass | 1.517 | 64.2 | — |
| 14 | | Plano | 0.193 | | | | |
| 15 | Image | Plano | — | | | | |

Note:
Reference wavelength is 587.6 nm (d-line).
An effective radius of the stop S1 (Surface 8) is 1.400 mm.
D0, D10 and D12 vary with different focusing conditions.

TABLE 4

Aspheric Coefficients

| Surface # | 2 | 4 | 5 | 6 | 7 |
|---|---|---|---|---|---|
| k = | 0.00000E+00 | 0.00000E+00 | 0.00000E+00 | 0.00000E+00 | 0.00000E+00 |
| A4 = | −5.10336E−04 | 4.96952E−03 | 6.96106E−03 | −2.08846E−02 | −2.80123E−02 |
| A6 = | 1.31446E−07 | −3.25426E−04 | −2.34753E−03 | 6.99973E−03 | 1.15153E−02 |
| A8 = | −8.33779E−07 | 2.59701E−05 | 5.13966E−04 | −9.61573E−04 | −2.21425E−03 |
| A10 = | 1.26361E−07 | −3.54569E−05 | −1.47389E−04 | 3.49028E−05 | 6.01848E−04 |
| A12 = | −5.84423E−09 | 7.43090E−06 | 1.18246E−05 | 8.47955E−07 | −1.40503E−04 |
| A14 = | — | −1.91989E−06 | −1.99593E−07 | 2.38157E−06 | 2.85205E−05 |

| Surface # | 9 | 10 | 11 | 12 | |
|---|---|---|---|---|---|
| k = | 0.00000E+00 | 0.00000E+00 | 0.00000E+00 | 0.00000E+00 | — |
| A4 = | −4.36643E−02 | −3.90863E−02 | 2.69134E−05 | −4.42241E−03 | — |
| A6 = | 8.56777E−03 | 8.82724E−03 | 1.63681E−03 | 1.81700E−03 | — |
| A8 = | −4.95687E−04 | −1.21063E−03 | 1.49301E−05 | 1.29545E−04 | — |
| A10 = | 4.46371E−05 | 9.15778E−05 | −6.89363E−05 | −2.92176E−05 | — |
| A12 = | — | — | 1.14038E−05 | −4.14489E−06 | — |
| A14 = | — | — | −4.56733E−07 | 8.94904E−07 | — |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| fi [mm] | 15.38 | TLi/ImgHi | 6.76 |
| fm [mm] | 14.86 | Rf1f/ff1 | 0.63 |
| fGL [mm] | 460.63 | RGRf/fGR | 0.54 |
| fGM [mm] | 9.32 | (fi − fm)/fi | 3.39E−02 |
| fGR [mm] | 18.96 | |fGM/DGM| | 10.48 |
| HFOVi [deg.] | 9.0 | |fi/fGM| | 1.65 |
| DGL [mm] | 7.679 | ff2/ff1 | −1.11 |
| DGM [mm] | 0.889 | fGM × DGR/ | 6.97 |
| | | (fGR × dTGM) | |
| DGR [mm] | 6.326 | fGM/dTGM | 20.90 |
| dTGM [mm] | 0.446 | fGR/DGR | 3.00 |
| |(Np − Nf1)/ | 0.21 | fGR/ff1 | 2.64 |
| (Nf1 − 1.5)| | | | |
| Vmin/Nmax | 11.65 | fGR/fi | 1.23 |
| Vp/Np | 36.71 | fGR/YGRf | 7.68 |
| |TLi − TLm|/TLi | 5.92E−05 | fi/fGR + fi/fGL | 0.84 |
| DGL/DGM | 8.64 | fi/YGRf | 6.23 |
| DGR/DGL | 0.82 | Yf1f/Yr1r | 0.87 |
| TLi/fi | 1.10 | YGRf/Yf1f | 1.29 |

3rd Embodiment

Figure 13:
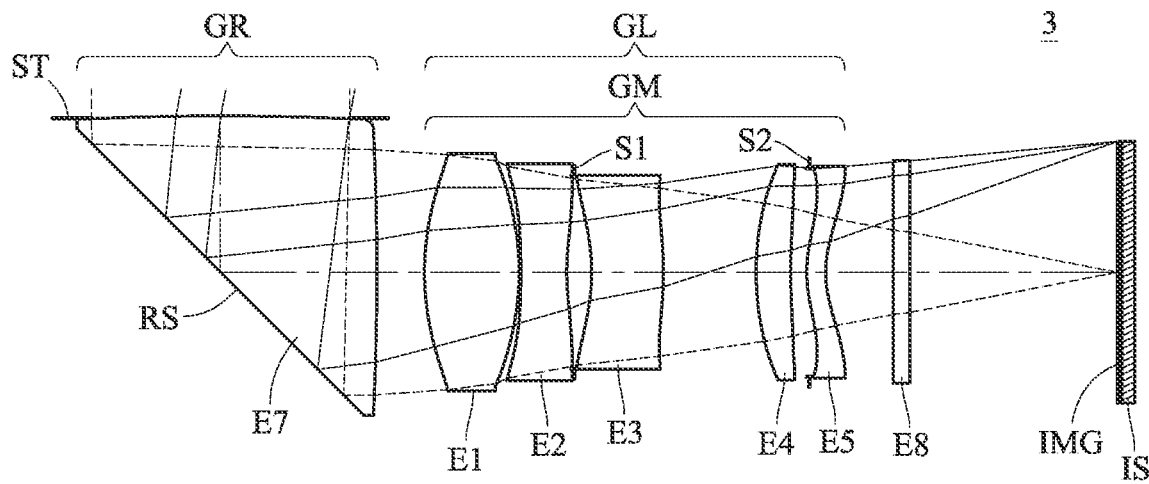
FIG. 13 is a schematic view of an image capturing unit focusing to a far distance according to the 3rd embodiment of the present disclosure.
Figure 14:
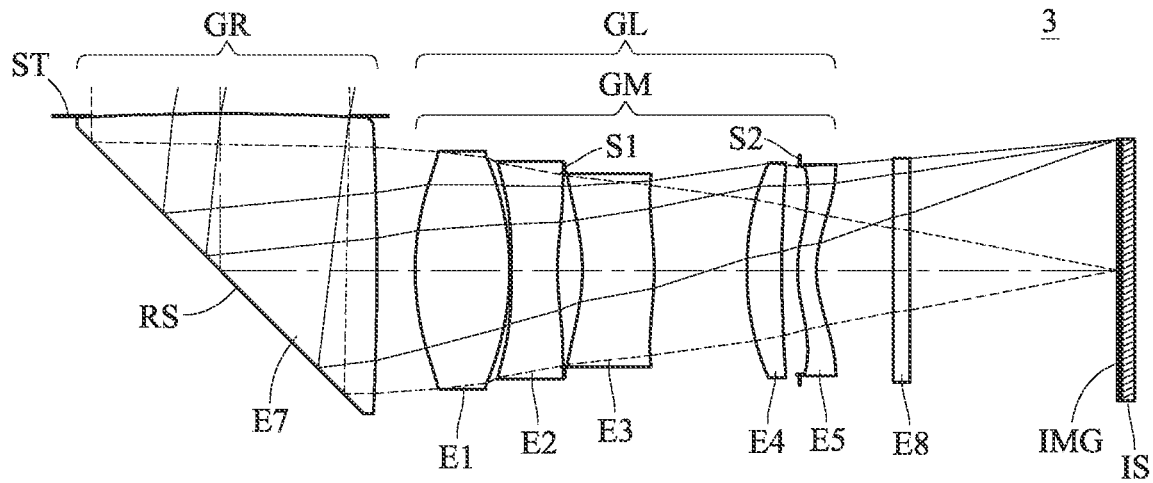
FIG. 14 is a schematic view of the image capturing unit focusing to a distance of 1 m according to the 3rd embodiment of the present disclosure.
Figure 15:
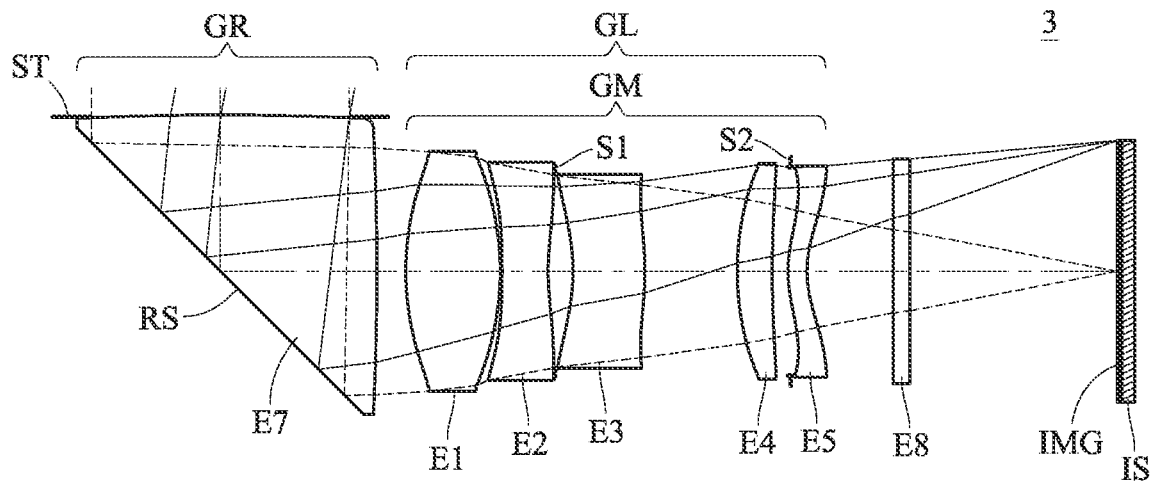
FIG. 15 is a schematic view of the image capturing unit focusing to a distance of 0.5 m according to the 3rd embodiment of the present disclosure.
Figure 16:
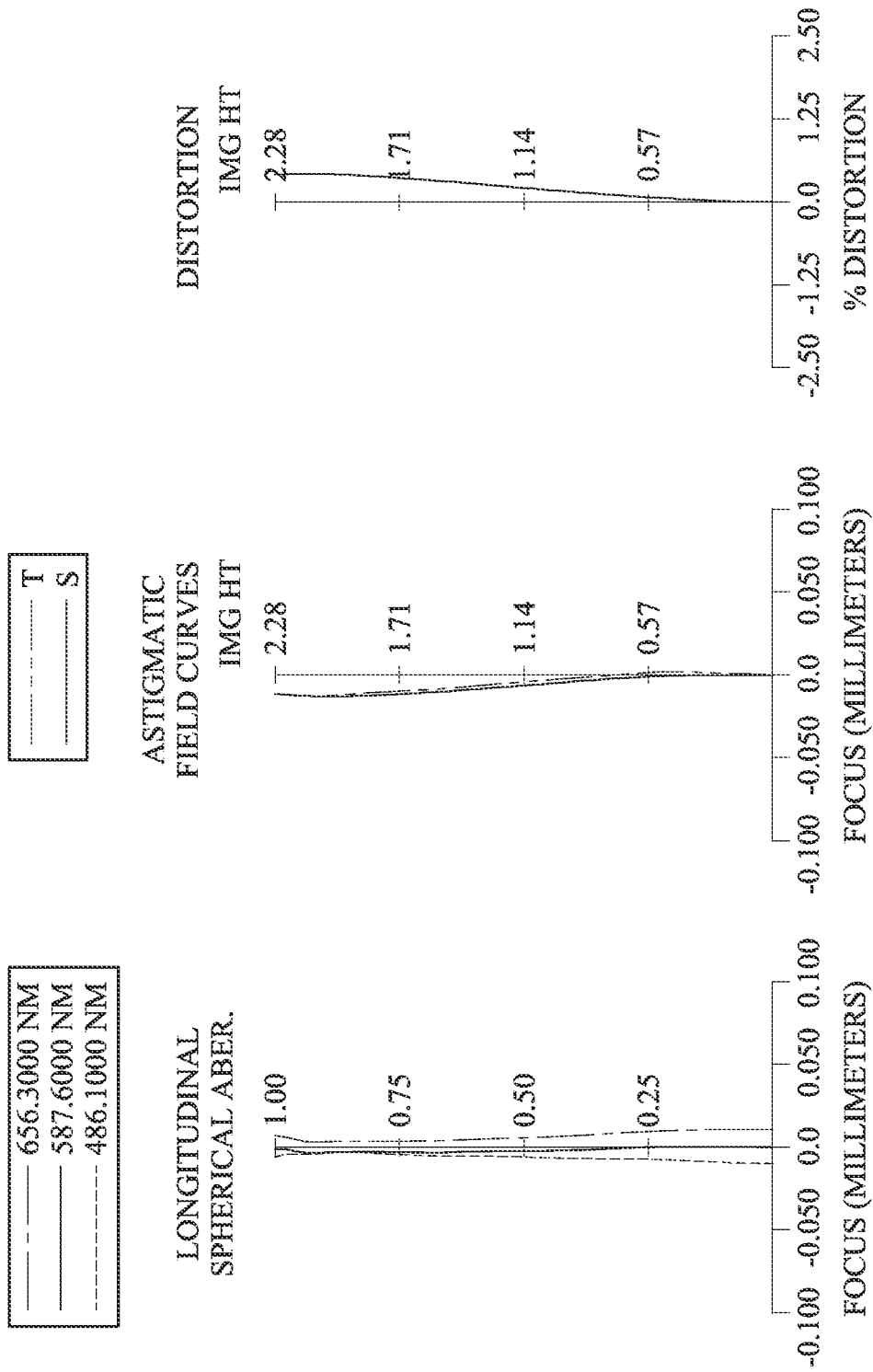
FIG. 16 shows spherical aberration curves, astigmatic field curves and a distortion curve of the image capturing unit focusing to the far distance according to the 3rd embodiment.
Figure 17:
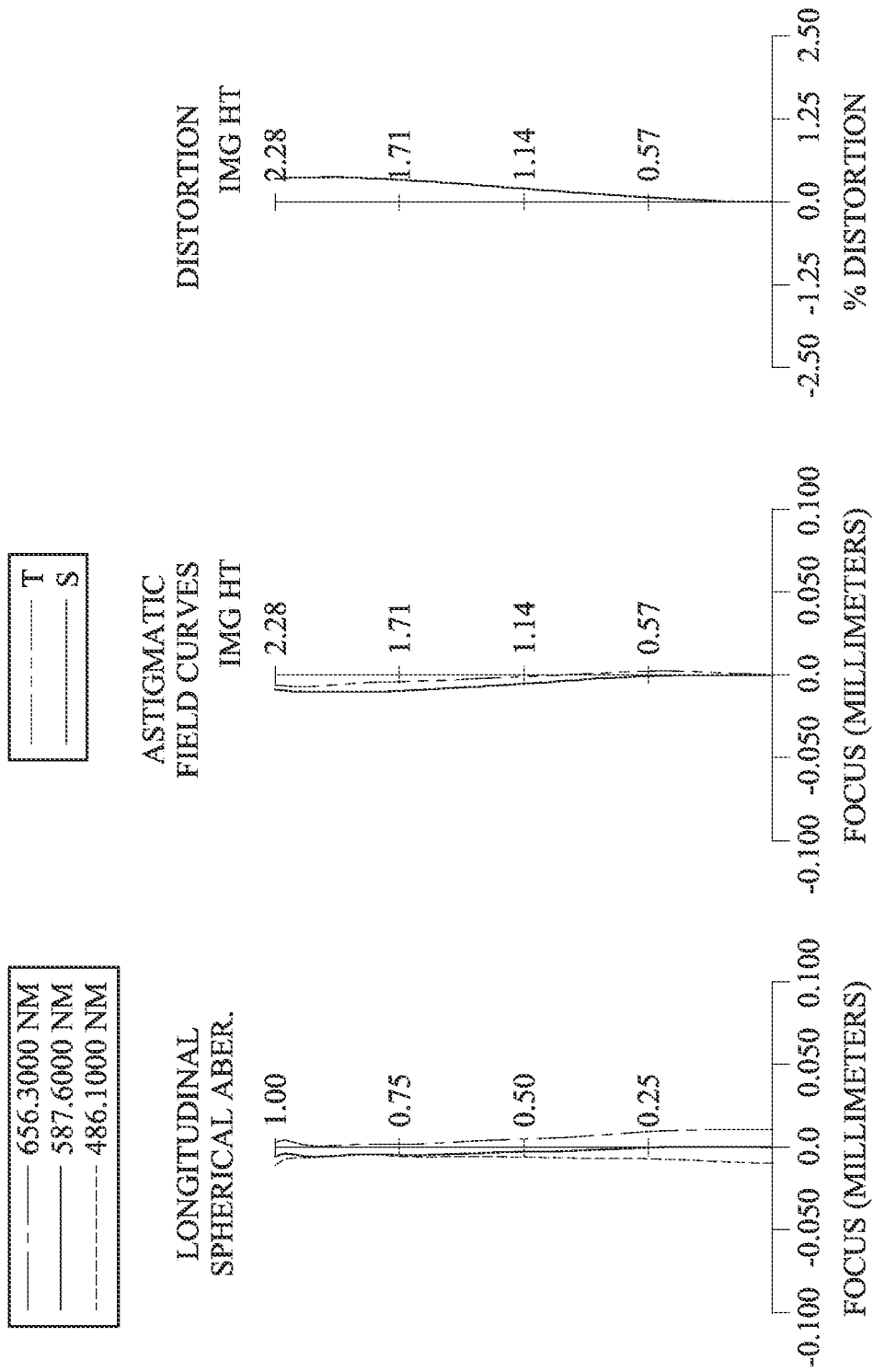
FIG. 17 shows spherical aberration curves, astigmatic field curves and a distortion curve of the image capturing unit focusing to the distance of 1 m according to the 3rd embodiment.
Figure 18:
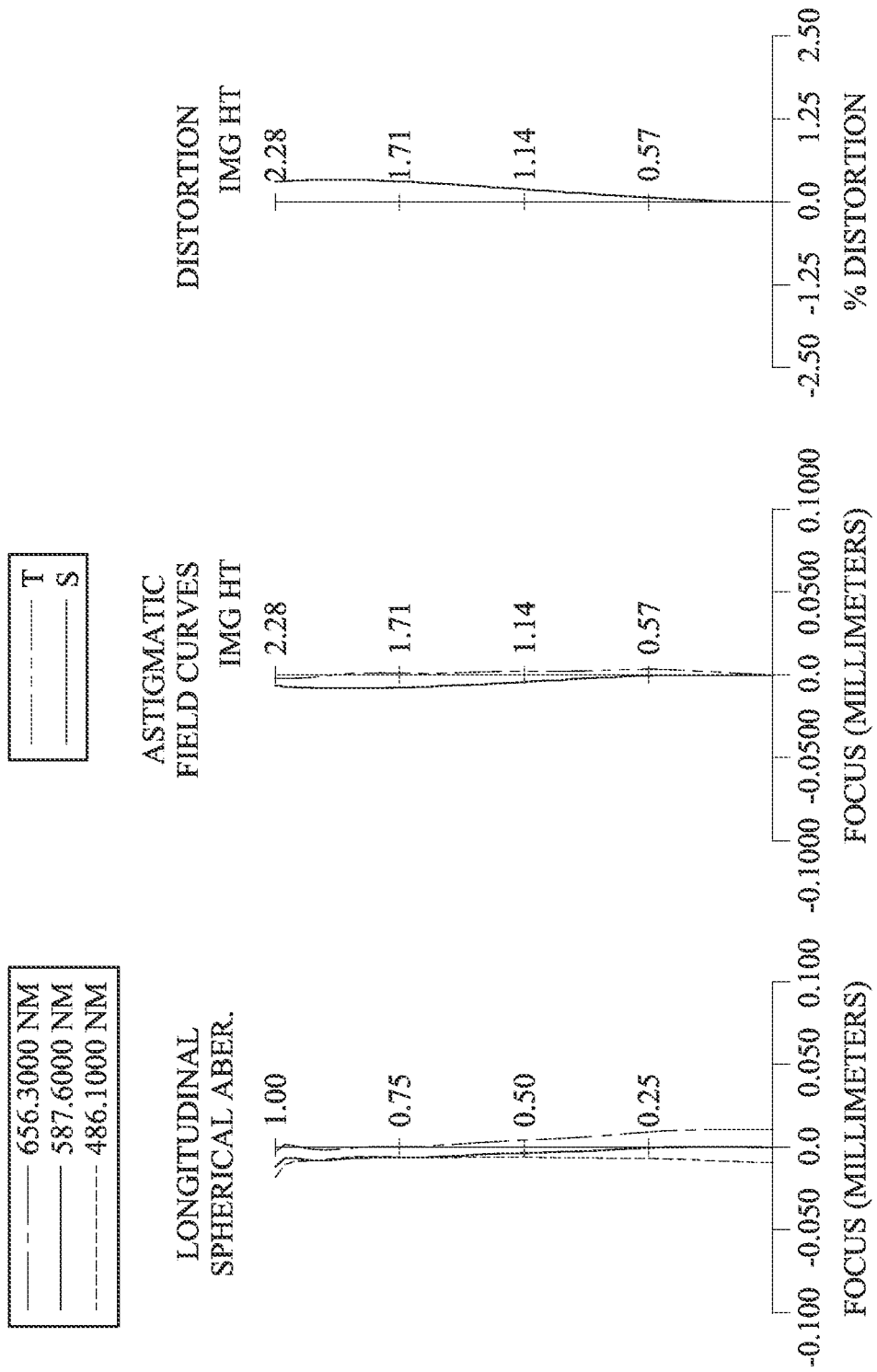
FIG. 18 shows spherical aberration curves, astigmatic field curves and a distortion curve of the image capturing unit focusing to the distance of 0.5 m according to the 3rd embodiment.

FIG. 13 is a schematic view of an image capturing unit focusing to a far distance according to the 3rd embodiment of the present disclosure. FIG. 14 is a schematic view of the image capturing unit focusing to a distance of 1 m according to the 3rd embodiment of the present disclosure. FIG. 15 is a schematic view of the image capturing unit focusing to a distance of 0.5 m according to the 3rd embodiment of the present disclosure. FIG. 16 shows, in order from left to right, spherical aberration curves, astigmatic field curves and a distortion curve of the image capturing unit focusing to the far distance according to the 3rd embodiment. FIG. 17 shows, in order from left to right, spherical aberration curves, astigmatic field curves and a distortion curve of the image capturing unit focusing to the distance of 1 m according to the 3rd embodiment. FIG. 18 shows, in order from left to right, spherical aberration curves, astigmatic field curves and a distortion curve of the image capturing unit focusing to the distance of 0.5 m according to the 3rd embodiment. In FIG. 13 to FIG. 15, the image capturing unit 3 includes the optical imaging lens assembly (its reference numeral is omitted) of the present disclosure and an image sensor IS. The optical imaging lens assembly includes, in order from an object side to an image side along an optical path, an aperture stop ST, a prism E7, a first lens element E1, a second lens element E2, a stop S1, a third lens element E3, a fourth lens element E4, a stop S2, a fifth lens element E5, a filter E8 and an image surface IMG. The optical imaging lens assembly includes a reflection group GR and a lens group GL. The reflection group GR includes the prism E7, and the lens group GL includes the first lens element E1, the second lens element E2, the third lens element E3, the fourth lens element E4 and the fifth lens element E5. Moreover, the lens group GL includes a movable group GM, and the movable group GM moves along a direction parallel to an optical axis in a zooming process. In this embodiment, the movable group GM has a total of five lens elements which are the first lens element E1, the second lens element E2, the third lens element E3, the fourth lens element E4 and the fifth lens element E5, and the movable group GM has positive refractive power. The optical imaging lens assembly includes five lens elements (E1, E2, E3, E4 and E5) with no additional lens element disposed between each of the adjacent five lens elements, and no additional lens element disposed between the movable group GM and the image surface IMG.

The focal length of the optical imaging lens assembly is varied by the movable group GM moving in the direction parallel to the optical axis in the zooming process. As shown in FIG. 13 to FIG. 15, the movable group GM (including the first lens element E1, the second lens element E2, the third lens element E3, the fourth lens element E4 and the fifth lens element E5) moves along the direction parallel to the optical axis in the zooming process. For example, when the optical imaging lens assembly is changed from focusing to a far distance (e.g., focusing to infinity) to focusing to a near distance (e.g., focusing to a distance of 1 m), the movable group GM moves in the direction parallel to the optical axis towards the object side. In addition, when the optical imaging lens assembly is changed from focusing to a distance of 1 m to focusing to a distance of 0.5 m, the movable group GM further moves in the direction parallel to the optical axis towards the object side. It is noted that there is no relative motion between lens elements of the movable group GM in the zooming process.

The prism E7 with positive refractive power has an object-side surface being convex in a paraxial region thereof and an image-side surface being convex in a paraxial region thereof. The prism E7 is made of glass material and has the object-side surface and the image-side surface being both spherical. The prism E7 includes a reflection surface RS configured to reflect an imaging light passing through the object-side surface of the prism E7 and send the imaging light to the image-side surface of the prism E7.

The first lens element E1 with positive refractive power has an object-side surface being convex in a paraxial region thereof and an image-side surface being convex in a paraxial region thereof. The first lens element E1 is made of glass material and has the object-side surface and the image-side surface being both aspheric. The object-side surface of the first lens element E1 has at least one inflection point.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has at least one inflection point, and the image-side surface of the second lens element E2 has at least one inflection point.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has at least one inflection point, and the image-side surface of the third lens element E3 has at least one inflection point.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has at least one inflection point, and the image-side surface of the fourth lens element E4 has at least one inflection point.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has at least one inflection point, and the image-side surface of the fifth lens element E5 has at least one inflection point.

The filter E8 is made of glass material and located between the fifth lens element E5 and the image surface IMG, and will not affect the focal length of the optical imaging lens assembly. The image sensor IS is disposed on or near the image surface IMG of the optical imaging lens assembly.

In this embodiment, the first lens element E1 is a most object-side lens element of the lens group GL, the second lens element E2 is a second lens element counting from the object side to the image side in the lens group GL, and the fifth lens element E5 is a most image-side lens element of the lens group GL.

The detailed optical data of the 3rd embodiment are shown in Table 5 and the aspheric surface data are shown in Table 6 below. In this embodiment, three of various focusing states of the optical imaging lens assembly according to different focusing conditions are provided. A first focusing state of the optical imaging lens assembly is a state where the optical imaging lens assembly focuses on an imaged object located at infinity, a second focusing state of the optical imaging lens assembly is a state where the optical imaging lens assembly focuses on an imaged object located at a distance of 1 m, and a third focusing state of the optical imaging lens assembly is a state where the optical imaging lens assembly focuses on an imaged object located at a distance of 0.5 m. The focusing states of the optical imaging lens assembly focusing on imaged objects located at distances of infinity, 1 m and 0.5 m in this embodiment are only exemplary, and the present disclosure is not limited thereto. The optical imaging lens assembly can be adjusted to focus on an imaged object located at various distances according to actual requirements. Furthermore, in this embodiment, an axial distance between the prism E7 and the first lens element E1 is D3, and an axial distance between the fifth lens element E5 and the filter E8 is D15.

| 3rd Embodiment | | | |
|---|---|---|---|
| | 1st focusing state | 2nd focusing state | 3rd focusing state |
| f [mm] | 11.82 | 11.79 | 11.75 |
| Fno | 2.63 | 2.65 | 2.66 |
| HFOV [deg.] | 10.9 | 10.8 | 10.8 |
| D0 [mm] | ∞ | 1000.000 | 500.000 |
| D3 [mm] | 0.827 | 0.664 | 0.500 |
| D15 [mm] | 1.174 | 1.337 | 1.501 |

According to the above table and as shown in FIG. 13 and FIG. 14, and taking the focusing condition changing from the first focusing state to the second focusing state as an example, the axial distance between the fifth lens element E5 and the filter E8 increases from 1.174 mm in the first focusing state to 1.337 mm in the second focusing state; that is, in the zooming process, when the object distance decreases, the movable group GM moves along the optical axis towards the object side.

TABLE 5

| 3rd Embodiment | | | | | | | |
|---|---|---|---|---|---|---|---|
| Surface # | | Curvature Radius | Thickness | Material | Index | Abbe # | Focal Length |
| 0 | Object | Plano | D0 | | | | |
| 1 | Ape. Stop | Plano | −0.041 | | | | |
| 2 | Prism | 50.0000 (SPH) | 5.468 | Glass | 1.804 | 46.6 | 31.87 |
| 3 | | −50.0000 (SPH) | D3 | | | | |

TABLE 5-continued

3rd Embodiment

| Surface # | | Curvature Radius | | Thickness | Material | Index | Abbe # | Focal Length |
|---|---|---|---|---|---|---|---|---|
| 4 | Lens 1 | 4.8150 | (ASP) | 1.650 | Glass | 1.497 | 81.3 | 5.06 |
| 5 | | −4.6621 | (ASP) | 0.030 | | | | |
| 6 | Lens 2 | −24.0039 | (ASP) | 0.802 | Plastic | 1.566 | 37.4 | −6.35 |
| 7 | | 4.2747 | (ASP) | 0.125 | | | | |
| 8 | Stop | Plano | | 0.311 | | | | |
| 9 | Lens 3 | −3.3707 | (ASP) | 1.251 | Plastic | 1.544 | 56.0 | −18.83 |
| 10 | | −5.6808 | (ASP) | 1.616 | | | | |
| 11 | Lens 4 | 5.1513 | (ASP) | 0.605 | Plastic | 1.562 | 44.6 | 15.18 |
| 12 | | 12.4600 | (ASP) | 0.321 | | | | |
| 13 | Stop | Plano | | −0.042 | | | | |
| 14 | Lens 5 | 2.3073 | (ASP) | 0.330 | Plastic | 1.534 | 56.0 | −25.40 |
| 15 | | 1.8738 | (ASP) | D15 | | | | |
| 16 | Filter | Plano | | 0.300 | Glass | 1.517 | 64.2 | — |
| 17 | | Plano | | 3.613 | | | | |
| 18 | Image | Plano | | — | | | | |

Note:
Reference wavelength is 587.6 nm (d-line).
An effective radius of the stop S1 (Surface 8) is 1.690 mm.
An effective radius of the stop S2 (Surface 13) is 1.820 mm.
D0, D3 and D15 vary with different focusing conditions.

TABLE 6

Aspheric Coefficients

| Surface # | 4 | 5 | 6 | 7 | 9 |
|---|---|---|---|---|---|
| k = | −2.09833E−01 | 0.00000E+00 | 8.89374E+01 | −1.00608E+00 | 0.00000E+00 |
| A4 = | 2.36096E−04 | 1.29491E−03 | −3.41253E−02 | −5.51527E−02 | 2.16237E−02 |
| A6 = | −4.52159E−04 | 3.25056E−03 | 1.15193E−02 | 1.43519E−02 | 4.60755E−03 |
| A8 = | 5.83123E−05 | −1.87784E−03 | −2.98299E−03 | −3.78488E−03 | −3.98578E−03 |
| A10 = | −3.04029E−05 | 4.07863E−04 | 5.35570E−04 | 1.22055E−03 | 1.56590E−03 |
| A12 = | — | −3.22391E−05 | −2.41243E−05 | −2.64044E−04 | −3.45624E−04 |
| A14 = | — | — | −2.33163E−06 | 2.85578E−05 | 3.58936E−05 |

| Surface # | 10 | 11 | 12 | 14 | 15 |
|---|---|---|---|---|---|
| k = | −1.98430E+01 | 3.79676E+00 | 0.00000E+00 | 9.85692E−02 | −1.36551E+00 |
| A4 = | 1.11852E−02 | 1.02178E−04 | −1.03788E−02 | −8.39392E−02 | −6.39505E−02 |
| A6 = | 7.12370E−03 | −9.76379E−04 | 3.81193E−04 | −7.12451E−03 | −6.57789E−03 |
| A8 = | −2.92234E−03 | −9.81618E−04 | −5.63980E−04 | 7.17191E−03 | 1.31228E−02 |
| A10 = | 5.97785E−04 | 7.18906E−04 | 1.04464E−03 | 7.33141E−05 | −4.95197E−03 |
| A12 = | −9.51405E−05 | −1.77896E−04 | −3.23901E−04 | −9.90739E−04 | 8.26218E−04 |
| A14 = | 8.15108E−06 | 1.68317E−05 | 2.66378E−05 | 2.50712E−04 | −5.31958E−05 |
| A16 = | — | −8.81145E−07 | — | −2.07642E−05 | — |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| fi [mm] | 11.82 | TLi/ImgHi | 8.05 |
| fm [mm] | 11.79 | Rf1f/ff1 | 0.95 |
| fGL [mm] | 18.45 | RGRf/fGR | 1.57 |
| fGM [mm] | 18.45 | (fi − fm)/fi | 3.27E−03 |
| fGR [mm] | 31.87 | |fGM/DGM| | 2.64 |
| HFOVi [deg.] | 10.9 | |fi/fGM| | 0.64 |
| DGL [mm] | 6.999 | ff2/ff1 | −1.25 |
| DGM [mm] | 6.999 | fGM × DGR/(fGR × dTGM) | 19.42 |
| DGR [mm] | 5.468 | fGM/dTGM | 113.20 |
| dTGM [mm] | 0.163 | fGR/DGR | 5.83 |
| |(Np − Nf1)/(Nf1 − 1.5)| | 102.25 | fGR/ff1 | 6.30 |
| Vmin/Nmax | 23.91 | fGR/fi | 2.70 |
| Vp/Np | 25.81 | fGR/YGRf | 14.16 |
| |TLi − TLm|/TLi | 0.00E+00 | fi/fGR + fi/fGL | 1.01 |
| DGL/DGM | 1.00 | fi/YGRf | 5.26 |
| DGR/DGL | 0.78 | Yf1f/Yr1r | 1.12 |
| TLi/fi | 1.55 | YGRf/Yf1f | 1.08 |

4th Embodiment

Figure 19:
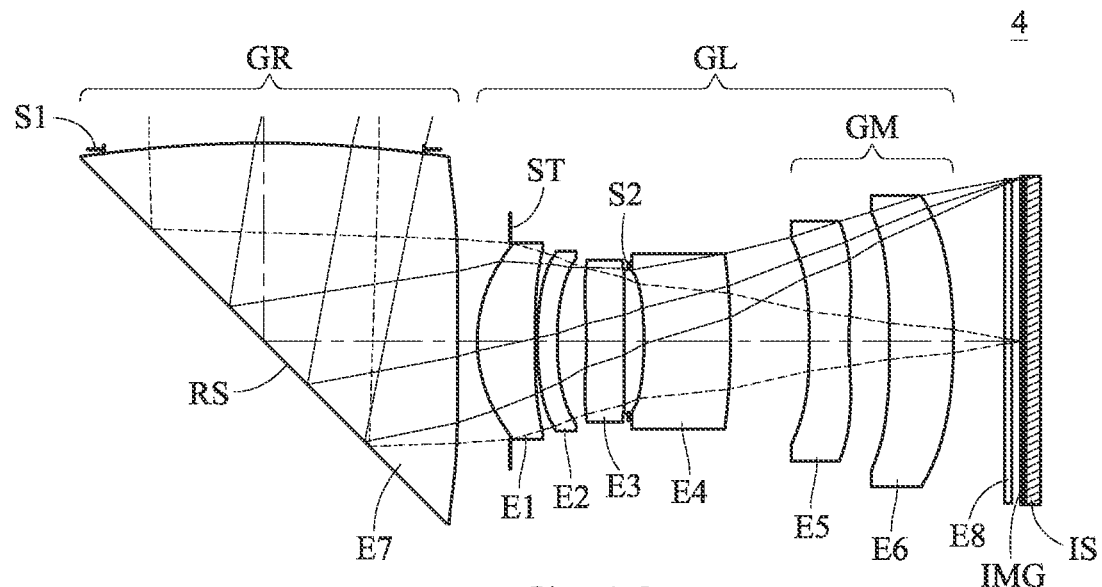
FIG. 19 is a schematic view of an image capturing unit focusing to a far distance according to the 4th embodiment of the present disclosure.
Figure 20:
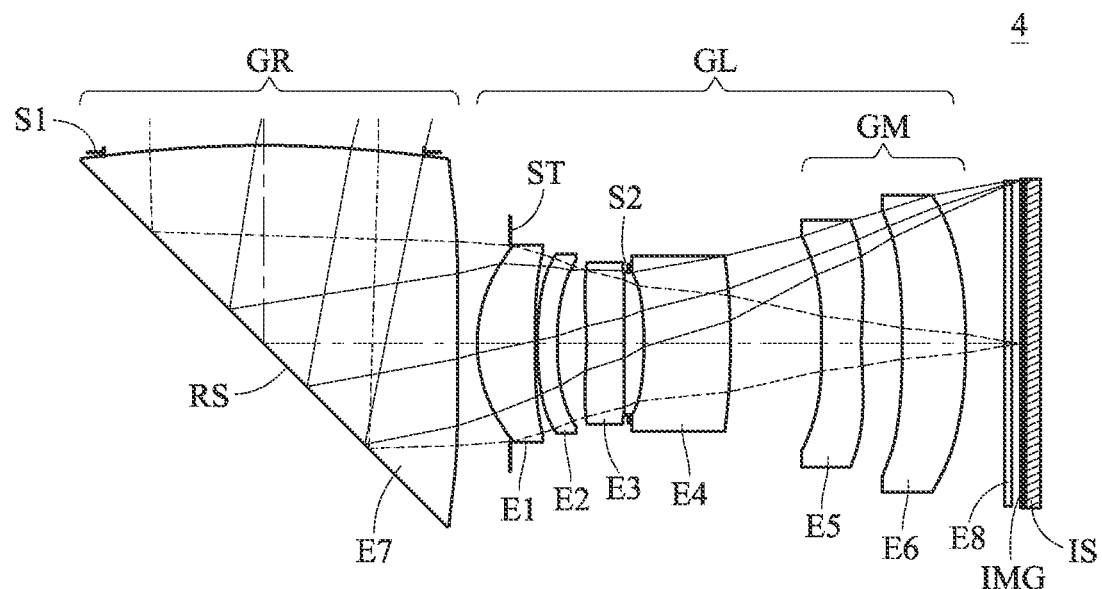
FIG. 20 is a schematic view of the image capturing unit focusing to a distance of 1 m according to the 4th embodiment of the present disclosure.
Figure 21:
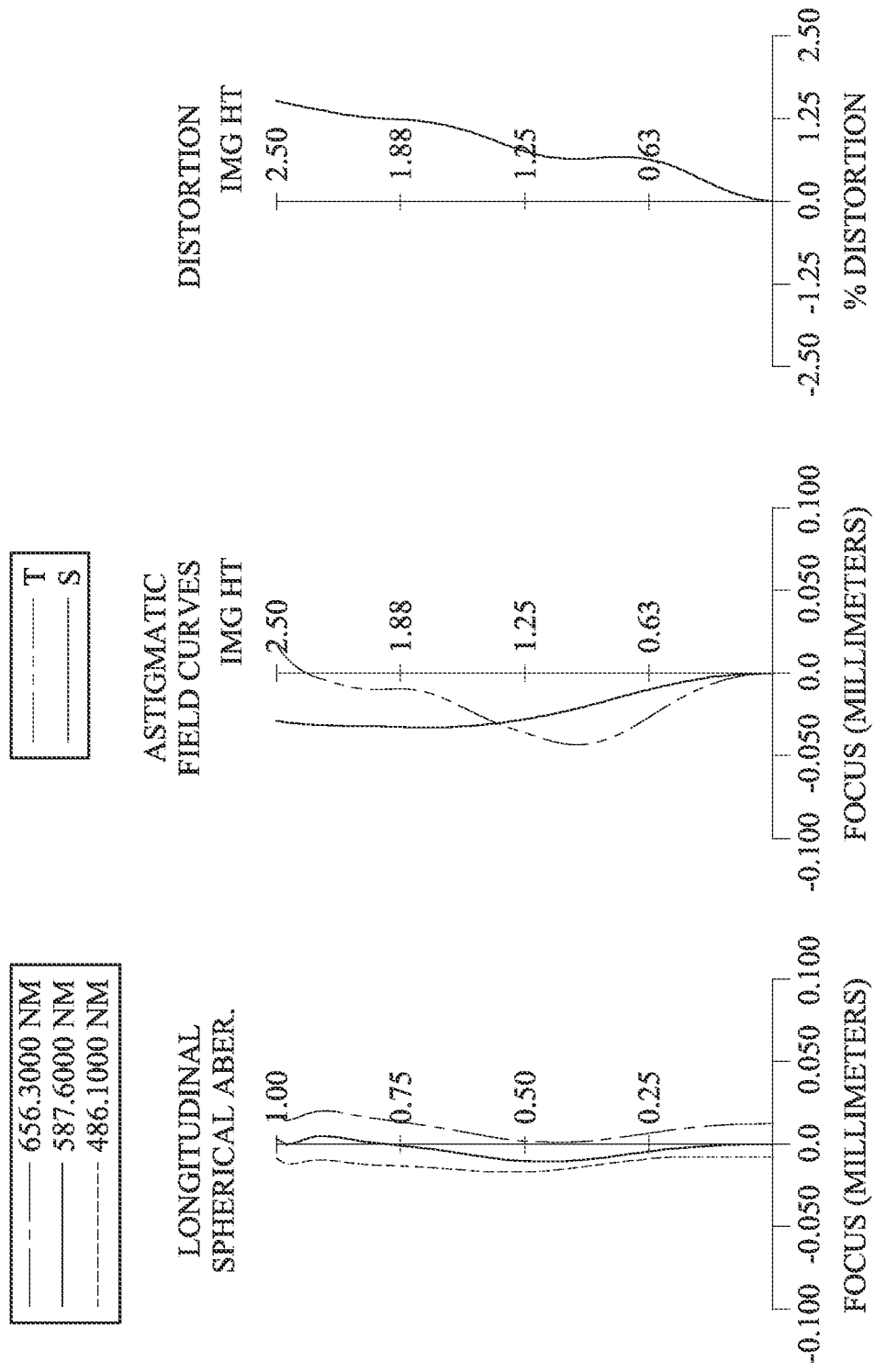
FIG. 21 shows spherical aberration curves, astigmatic field curves and a distortion curve of the image capturing unit focusing to the far distance according to the 4th embodiment.
Figure 22:
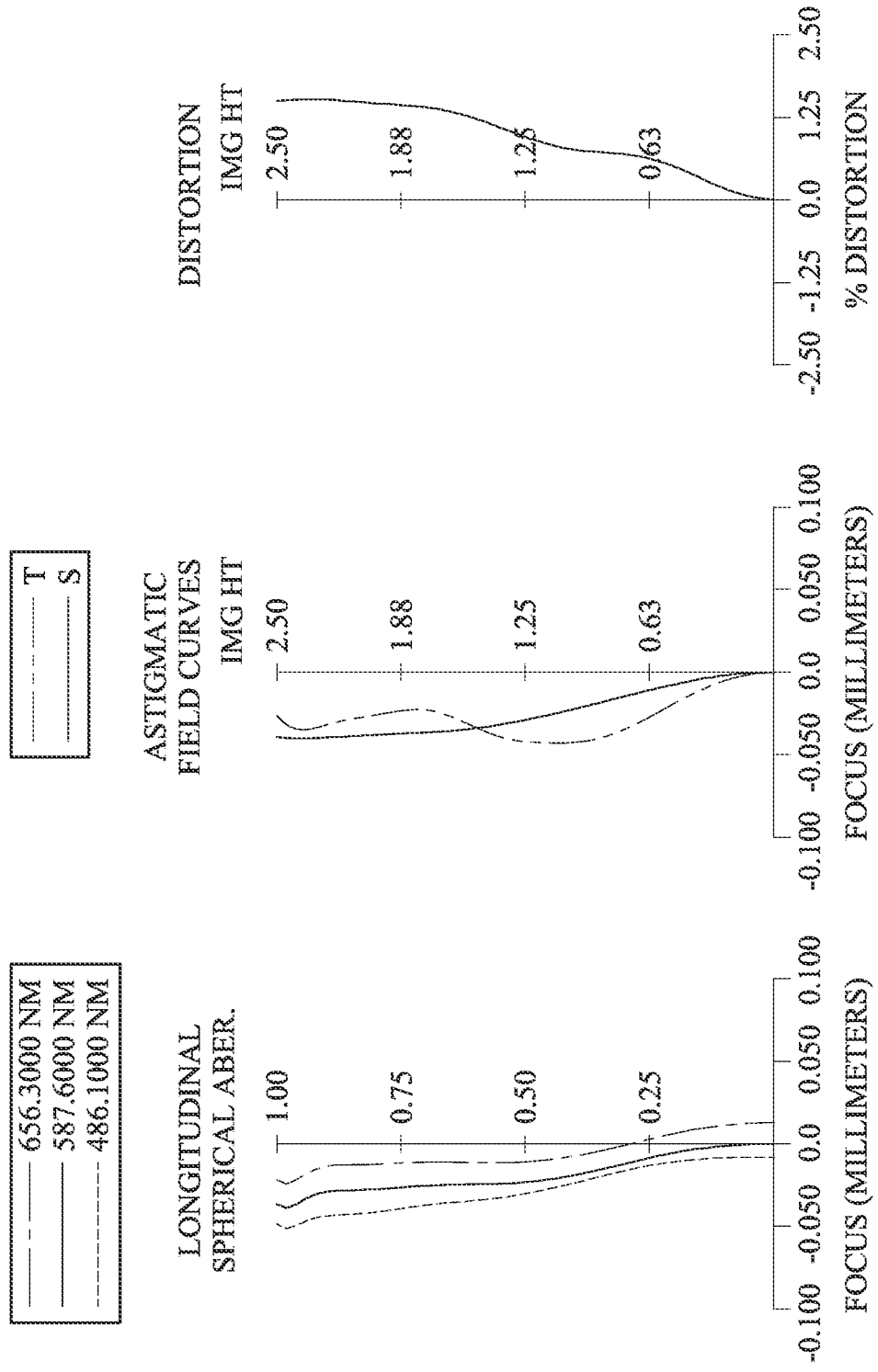
FIG. 22 shows spherical aberration curves, astigmatic field curves and a distortion curve of the image capturing unit focusing to the distance of 1 m according to the 4th embodiment.

FIG. 19 is a schematic view of an image capturing unit focusing to a far distance according to the 4th embodiment of the present disclosure. FIG. 20 is a schematic view of the image capturing unit focusing to a distance of 1 m according to the 4th embodiment of the present disclosure. FIG. 21 shows, in order from left to right, spherical aberration curves, astigmatic field curves and a distortion curve of the image capturing unit focusing to the far distance according to the 4th embodiment. FIG. 22 shows, in order from left to right, spherical aberration curves, astigmatic field curves and a distortion curve of the image capturing unit focusing to the distance of 1 m according to the 4th embodiment. In FIG. 19 and FIG. 20, the image capturing unit 4 includes the optical imaging lens assembly (its reference numeral is omitted) of the present disclosure and an image sensor IS. The optical imaging lens assembly includes, in order from an object side to an image side along an optical path, a stop S1, a prism E7, an aperture stop ST, a first lens element E1, a second lens element E2, a third lens element E3, a stop S2, a fourth lens element E4, a fifth lens element E5, a sixth lens element E6, a filter E8 and an image surface IMG. The optical imaging lens assembly includes a reflection group GR and a lens group GL. The reflection group GR includes the prism E7, and the lens group GL includes the first lens element E1, the second lens element E2, the third lens element E3, the fourth lens element E4, the fifth lens element E5 and the sixth lens element E6. Moreover, the lens group GL includes a movable group GM, and the movable group GM moves along a direction parallel to an optical axis in a zooming process. In this embodiment, the movable group GM has a total of two lens elements which are the fifth lens element E5 and the sixth lens element E6, and the movable group GM has negative refractive power. The optical imaging lens assembly includes six lens elements (E1, E2, E3, E4, E5 and E6) with no additional lens element disposed between each of the adjacent six lens elements, and no additional lens element disposed between the movable group GM and the image surface IMG.

The focal length of the optical imaging lens assembly is varied by the movable group GM moving in the direction parallel to the optical axis in the zooming process. As shown in FIG. 19 and FIG. 20, the movable group GM (including the fifth lens element E5 and the sixth lens element E6) moves along the direction parallel to the optical axis in the zooming process. For example, when the optical imaging lens assembly is changed from focusing to a far distance (e.g., focusing to infinity) to focusing to a near distance (e.g., focusing to a distance of 1 m), the movable group GM moves in the direction parallel to the optical axis towards the image side. It is noted that there is no relative motion between lens elements of the movable group GM in the zooming process.

The prism E7 with positive refractive power has an object-side surface being convex in a paraxial region thereof and an image-side surface being concave in a paraxial region thereof. The prism E7 is made of plastic material and has the object-side surface and the image-side surface being both aspheric. The prism E7 includes a reflection surface RS configured to reflect an imaging light passing through the object-side surface of the prism E7 and send the imaging light to the image-side surface of the prism E7.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has at least one inflection point, and the image-side surface of the third lens element E3 has at least one inflection point.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The image-side surface of the fourth lens element E4 has at least one inflection point.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has at least one inflection point, and the image-side surface of the fifth lens element E5 has at least one inflection point.

The sixth lens element E6 with positive refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has at least one inflection point, and the image-side surface of the sixth lens element E6 has at least one inflection point.

The filter E8 is made of glass material and located between the sixth lens element E6 and the image surface IMG, and will not affect the focal length of the optical imaging lens assembly. The image sensor IS is disposed on or near the image surface IMG of the optical imaging lens assembly.

In this embodiment, the first lens element E1 is a most object-side lens element of the lens group GL, the second lens element E2 is a second lens element counting from the object side to the image side in the lens group GL, and the sixth lens element E6 is a most image-side lens element of the lens group GL.

The detailed optical data of the 4th embodiment are shown in Table 7 and the aspheric surface data are shown in Table 8 below. In this embodiment, two of various focusing states of the optical imaging lens assembly according to different focusing conditions are provided. A first focusing state of the optical imaging lens assembly is a state where the optical imaging lens assembly focuses on an imaged object located at infinity, and a second focusing state of the optical imaging lens assembly is a state where the optical imaging lens assembly focuses on an imaged object located at a distance of 1 m. The focusing states of the optical imaging lens assembly focusing on imaged objects located at distances of infinity and 1 m in this embodiment are only exemplary, and the present disclosure is not limited thereto. The optical imaging lens assembly can be adjusted to focus on an imaged object located at various distances according to actual requirements. Furthermore, in this embodiment, an axial distance between the fourth lens element E4 and the fifth lens element E5 is D13, and an axial distance between the sixth lens element E6 and the filter E8 is D17.

| 4th Embodiment | | |
|---|---|---|
| | 1st focusing state | 2nd focusing state |
| f [mm] | 9.89 | 9.81 |
| Fno | 2.81 | 2.83 |
| HFOV [deg.] | 14.0 | 13.9 |
| D0 [mm] | ∞ | 1000.000 |
| D13 [mm] | 1.206 | 1.396 |
| D17 [mm] | 0.785 | 0.595 |

According to the above table and as shown in FIG. 19 and FIG. 20, and taking the focusing condition changing from the first focusing state to the second focusing state as an example, the axial distance between the sixth lens element E6 and the filter E8 decreases from 0.785 mm in the first focusing state to 0.595 mm in the second focusing state; that is, in the zooming process, when the object distance decreases, the movable group GM moves along the optical axis towards the image side.

TABLE 7

4th Embodiment

| Surface # | | Curvature Radius | Thickness | Material | Index | Abbe # | Focal Length |
|---|---|---|---|---|---|---|---|
| 0 | Object | Plano | D0 | | | | |
| 1 | Stop | Plano | −0.100 | | | | |
| 2 | Prism | 17.7353 (ASP) | 6.000 | Plastic | 1.544 | 56.0 | 33.65 |
| 3 | | 499.6574 (ASP) | 0.800 | | | | |
| 4 | Ape. Stop | Plano | −0.500 | | | | |
| 5 | Lens 1 | 2.2802 (ASP) | 0.884 | Plastic | 1.528 | 60.1 | 4.68 |
| 6 | | 25.4610 (ASP) | 0.038 | | | | |
| 7 | Lens 2 | 5.2010 (ASP) | 0.299 | Plastic | 1.587 | 28.3 | −38.16 |
| 8 | | 4.1315 (ASP) | 0.451 | | | | |
| 9 | Lens 3 | −4.3571 (ASP) | 0.578 | Plastic | 1.566 | 37.4 | −16.85 |
| 10 | | −8.4060 (ASP) | 0.059 | | | | |
| 11 | Stop | Plano | 0.240 | | | | |
| 12 | Lens 4 | −5.5769 (ASP) | 1.321 | Plastic | 1.680 | 18.2 | −13.16 |
| 13 | | −16.2241 (ASP) | D13 | | | | |
| 14 | Lens 5 | 1020.4082 (ASP) | 0.610 | Plastic | 1.584 | 28.2 | −7.52 |
| 15 | | 4.3710 (ASP) | 0.621 | | | | |
| 16 | Lens 6 | −392.0384 (ASP) | 0.978 | Plastic | 1.713 | 12.4 | 12.23 |
| 17 | | −8.5446 (ASP) | D17 | | | | |
| 18 | Filter | Plano | 0.110 | Glass | 1.517 | 64.2 | — |
| 19 | | Plano | 0.136 | | | | |
| 20 | Image | Plano | — | | | | |

Note:
Reference wavelength is 587.6 nm (d-line).
An effective radius of the stop S1 (Surface 1) is 2.450 mm.
An effective radius of the stop S2 (Surface 11) is 1.100 mm.
D0, D13 and D17 vary with different focusing conditions.

TABLE 8

Aspheric Coefficients

| Surface # | 2 | 3 | 5 | 6 | 7 |
|---|---|---|---|---|---|
| k = | 0.00000E+00 | 0.00000E+00 | −4.77191E−02 | 0.00000E+00 | 0.00000E+00 |
| A4 = | −3.12776E−04 | −2.26317E−03 | −1.45789E−04 | −9.43013E−03 | −2.66396E−02 |
| A6 = | 3.33761E−05 | −3.30417E−04 | 4.81173E−03 | 9.33124E−02 | 9.93701E−02 |
| A8 = | −6.69435E−06 | 2.27321E−05 | −3.87416E−03 | −1.12537E−01 | −1.10231E−01 |
| A10 = | 3.23706E−07 | 2.73785E−06 | 4.75646E−04 | 6.88092E−02 | 7.70789E−02 |
| A12 = | — | −2.83551E−08 | 8.02423E−05 | −2.15398E−02 | −2.73893E−02 |
| A14 = | — | — | −1.46529E−05 | 2.73857E−03 | 3.73116E−03 |

| Surface # | 8 | 9 | 10 | 12 | 13 |
|---|---|---|---|---|---|
| k = | −3.11726E+01 | 3.45092E+00 | 0.00000E+00 | −6.32422E+01 | 9.00000E+01 |
| A4 = | 6.92764E−02 | 1.82874E−01 | 1.72922E−01 | −3.34159E−02 | −2.52561E−02 |
| A6 = | −2.07448E−02 | −1.36248E−01 | −1.47714E−01 | −5.18876E−02 | 3.03643E−02 |
| A8 = | 1.23219E−03 | 9.05381E−02 | 5.26224E−02 | 7.42707E−02 | −3.17731E−02 |

TABLE 8-continued

| Aspheric Coefficients | | | | | |
|---|---|---|---|---|---|
| A10 = | 2.56252E−02 | −4.98577E−02 | −4.33941E−02 | −1.25555E−01 | 2.34784E−02 |
| A12 = | −1.93108E−02 | 1.85449E−02 | 3.42391E−02 | 9.16697E−02 | −8.45842E−03 |
| A14 = | 3.94511E−03 | −2.65618E−03 | −1.04494E−02 | −2.58688E−02 | 1.20556E−03 |
| A16 = | — | −1.36660E−04 | — | — | — |

| Surface # | 14 | 15 | 16 | 17 | — |
|---|---|---|---|---|---|
| k = | 0.00000E+00 | 0.00000E+00 | 0.00000E+00 | 2.61073E+00 | — |
| A4 = | −1.42904E−01 | −1.90133E−01 | −3.66390E−02 | 1.74032E−02 | — |
| A6 = | 1.33348E−01 | 1.67126E−01 | −5.57140E−02 | −7.58245E−02 | — |
| A8 = | −9.80565E−02 | −9.04587E−02 | 1.29280E−01 | 8.40012E−02 | — |
| A10 = | 4.67634E−02 | 1.85249E−02 | −1.11551E−01 | −4.83646E−02 | — |
| A12 = | −1.34476E−02 | 6.03084E−03 | 5.27667E−02 | 1.63959E−02 | — |
| A14 = | 2.20176E−03 | −4.87489E−03 | −1.49725E−02 | −3.41017E−03 | — |
| A16 = | −1.86018E−04 | 1.32495E−03 | 2.55128E−03 | 4.28884E−04 | — |
| A18 = | 6.25417E−06 | −1.72712E−04 | −2.41141E−04 | −2.99534E−05 | — |
| A20 = | — | 9.00760E−06 | 9.72324E−06 | 8.91631E−07 | — |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| fi [mm] | 9.89 | TLi/ImgHi | 5.85 |
| fm [mm] | 9.81 | Rf1f/ff1 | 0.49 |
| fGL [mm] | 13.94 | RGRf/fGR | 0.53 |
| fGM [mm] | −26.14 | (fi − fm)/fi | 8.63E−03 |
| fGR [mm] | 33.65 | |fGM/DGM| | 11.84 |
| HFOVi [deg.] | 14.0 | |fi/fGM| | 0.38 |
| DGL [mm] | 7.285 | ff2/ff1 | −8.15 |
| DGM [mm] | 2.209 | fGM × DGR/ (fGR × dTGM) | 24.53 |
| DGR [mm] | 6.000 | fGM/dTGM | 137.60 |
| dTGM [mm] | −0.190 | fGR/DGR | 5.61 |
| |(Np − Nf1)/ (Nf1 − 1.5)| | 0.57 | fGR/ff1 | 7.19 |
| Vmin/Nmax | 7.21 | fGR/fi | 3.40 |
| Vp/Np | 36.26 | fGR/YGRf | 13.78 |
| |TLi − TLm|/TLi | 0.00E+00 | fi/fGR + fi/fGL | 1.00 |
| DGL/DGM | 3.30 | fi/YGRf | 4.05 |
| DGR/DGL | 0.82 | Yf1f/Yr1r | 0.68 |
| TLi/fi | 1.48 | YGRf/Yf1f | 1.62 |

5th Embodiment

Figure 23:
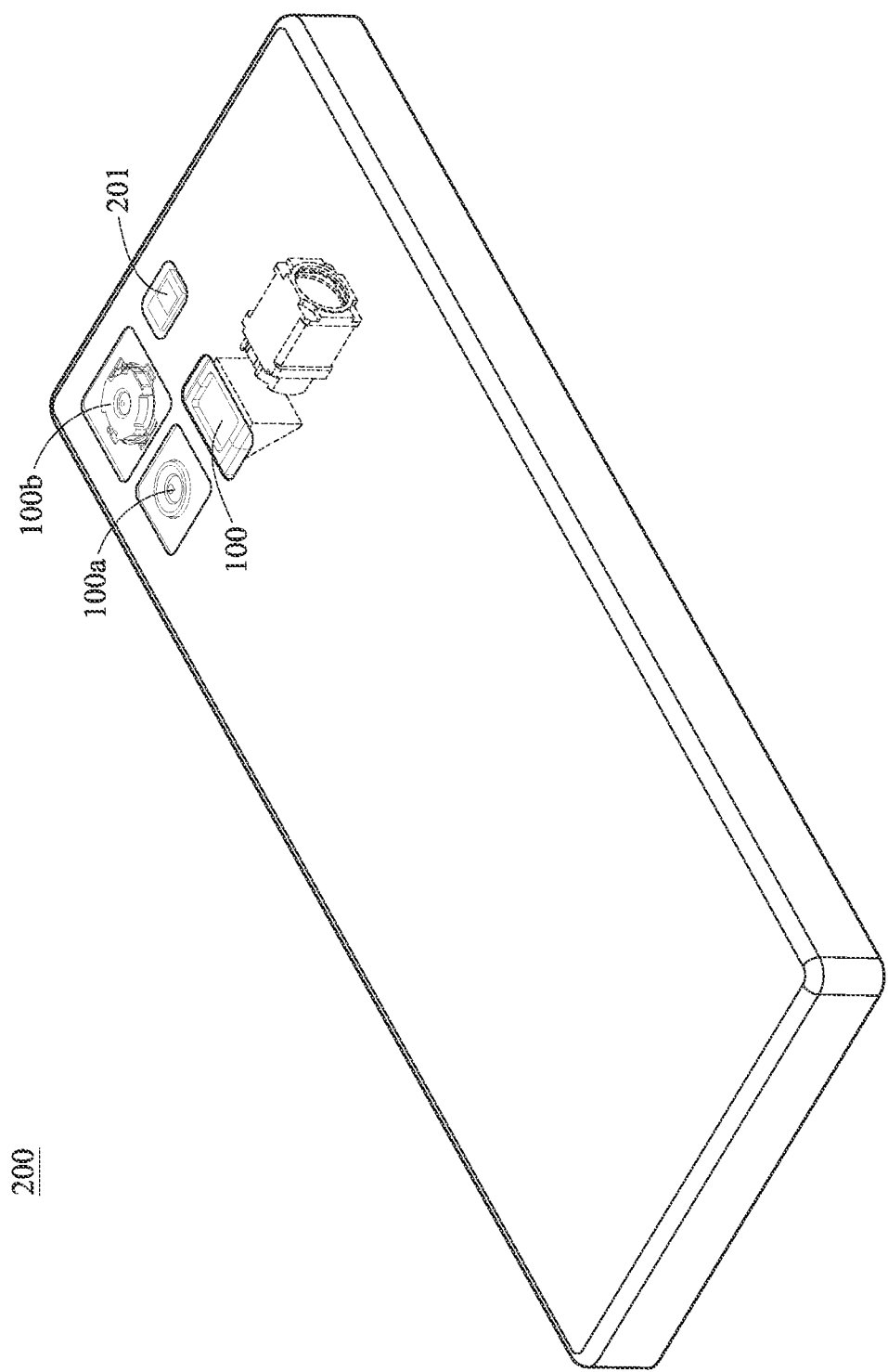
FIG. 23 is one perspective view of an electronic device according to the 5th embodiment of the present disclosure.
Figure 24:
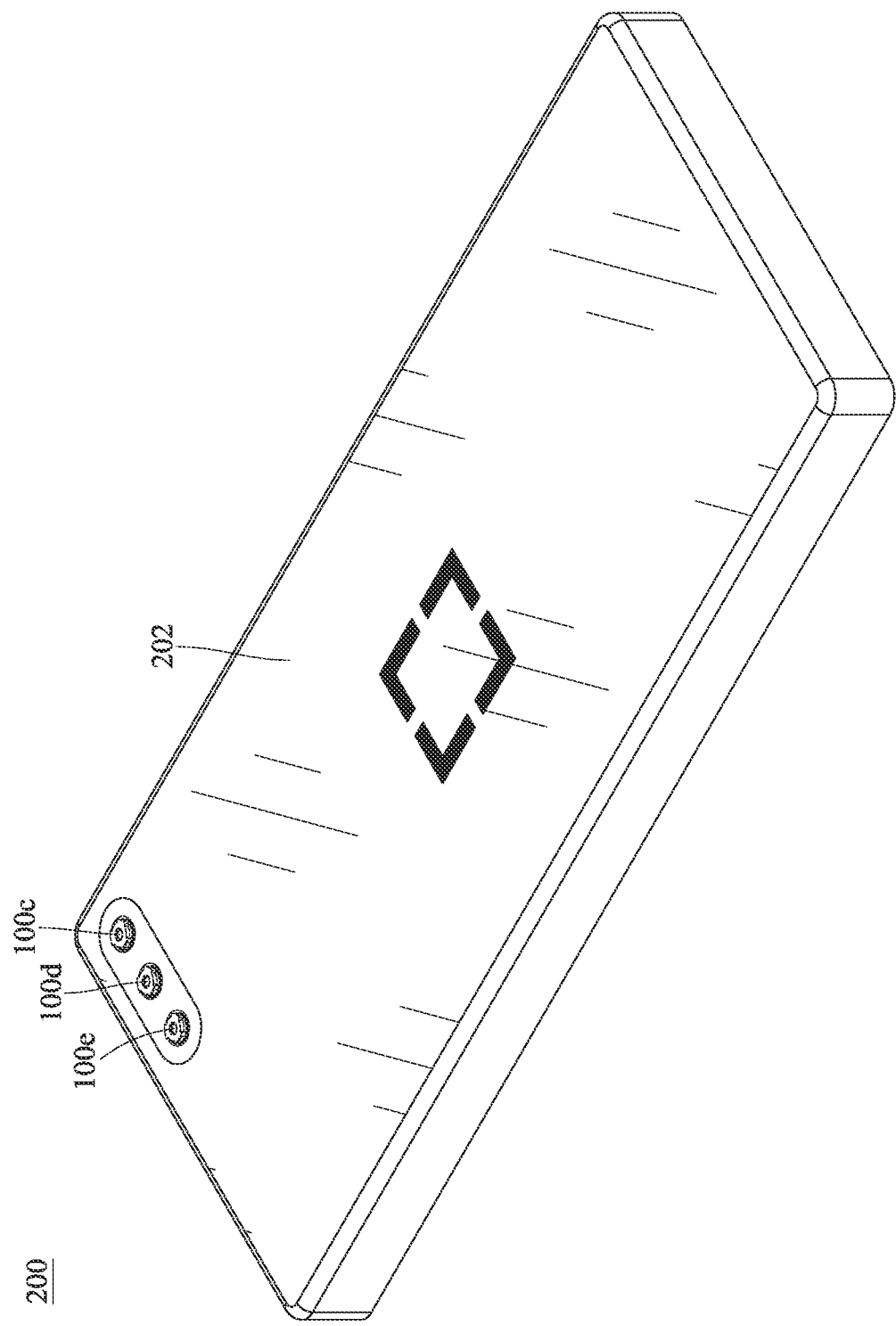
FIG. 24 is another perspective view of the electronic device in FIG. 23.
Figure 25:
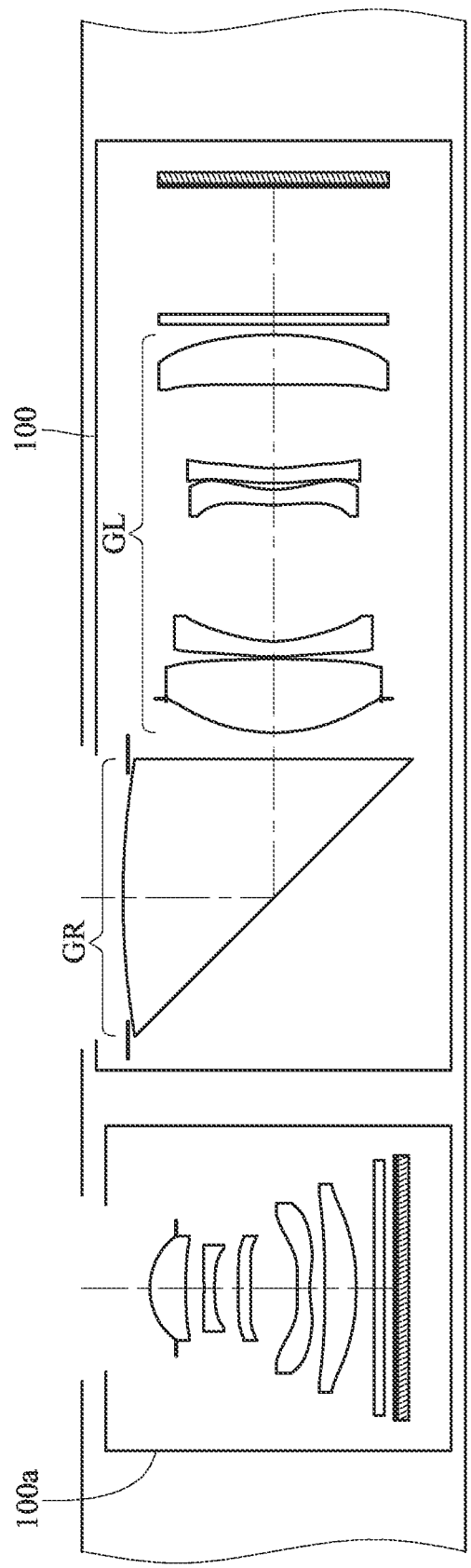
FIG. 25 is a cross-sectional view of two image capturing units of the electronic device in FIG. 23.

FIG. 23 is one perspective view of an electronic device according to the 5th embodiment of the present disclosure. FIG. 24 is another perspective view of the electronic device in FIG. 23. FIG. 25 is a cross-sectional view of two image capturing units of the electronic device in FIG. 23.

In this embodiment, an electronic device 200 is a smartphone including an image capturing unit 100, an image capturing unit 100a, an image capturing unit 100b, an image capturing unit 100c, an image capturing unit 100d, an image capturing unit 100e, a flash module 201, a display unit 202, a focus assist module, an image signal processor and an image software processor.

In this embodiment, the image capturing unit 100 is a camera module including a lens unit, a driving device, an image sensor and an image stabilizer. The lens unit includes the optical imaging lens assembly disclosed in the 1st embodiment, a barrel and a holder member. However, the lens unit may alternatively be provided with the optical imaging lens assembly disclosed in other embodiments, and the present disclosure is not limited thereto. In addition, the image capturing unit 100 is a telephoto image capturing unit configured with the reflection group GR, and the reflection group GR can adjust light travelling direction and fold optical axis. Therefore, the total track length of the image capturing unit 100 and the thickness of the electronic device 200 are not restricted by each other. The imaging light converges in the lens unit of the image capturing unit 100 to generate an image with the driving device utilized for image zooming or focusing on the image sensor, and the generated image is then digitally transmitted to other electronic component for further processing.

The driving device can have zooming functionality or auto focusing functionality, and different driving configurations can be obtained through the usages of screws, voice coil motors (VCM) such as spring type or ball type, micro electro-mechanical systems (MEMS), piezoelectric systems, or shape memory alloy materials. The driving device is favorable for obtaining a better imaging position of the lens unit, so that a clear image of the imaged object can be captured by the lens unit with different object distances. The image sensor (for example, CCD or CMOS), which can feature high photosensitivity and low noise, is disposed on the image surface of the optical imaging lens assembly to provide higher image quality.

The image stabilizer, such as an accelerometer, a gyro sensor and a Hall Effect sensor, is configured to work with the driving device to provide optical image stabilization (OIS). The driving device working with the image stabilizer is favorable for compensating for pan and tilt of the lens unit to reduce blurring associated with motion during exposure. In some cases, the compensation can be provided by electronic image stabilization (EIS) with image processing software, thereby improving image quality while in motion or low-light conditions.

The image capturing units 100, 100a, 100b are disposed on the same side of the electronic device 200, and the image capturing units 100c, 100d, 100e and the display unit 202 are disposed on the opposite side of the electronic device 200. Each of the image capturing units 100a, 100b, 100c, 100d, 100e can have a configuration similar to that of the image capturing unit 100, so the details in this regard will not be provided again. The image capturing unit 100a includes an optical lens assembly and an image sensor (their reference numerals are omitted). As shown in FIG. 25, an optical axis of a lens group GL of the image capturing unit 100 is perpendicular to an optical axis of the image capturing unit 100a. Furthermore, the optical axis of the lens group GL of the image capturing unit 100 is perpendicular to an optical axis of the image capturing unit 100b. Therefore, it is favorable for adjusting space arrangement so as to reduce the thickness of the electronic device.

The image capturing unit 100 is a telephoto image capturing unit configured with a light-folding element (reflection group GR), the image capturing unit 100a is a telephoto image capturing unit, and the image capturing unit 100b is a wide angle image capturing unit. Half of a maximum field of view of the image capturing unit 100a ranges between 15 degrees and 30 degrees, and half of a maximum field of view of the image capturing unit 100b ranges between 30 degrees and 60 degrees. In other configurations, half of the maximum field of view of the image capturing unit 100b can range between 35 degrees and 50 degrees. The image capturing units 100, 100a, 100b have different fields of view, such that the electronic device 200 can have a larger zoom ratio for more applications. The abovementioned electronic device 200 has the three image capturing units 100, 100a, and 100b on the same side, but the present disclosure is not limited thereto. In other configurations, the electronic device may have at least two image capturing units disposed on the same side or have at least three image capturing units disposed on the same side.

The image capturing unit 100c is a wide angle image capturing unit, the image capturing unit 100d is an ultra-wide-angle image capturing unit, and the image capturing unit 100e is a ToF (time of flight) image capturing unit. The image capturing unit 100e can determine depth information of the imaged object. The image capturing units 100c, 100d, 100e and the display unit 202 are disposed on the same side of the electronic device 200, such that the image capturing units 100c, 100d, 100e can be front-facing cameras of the electronic device 200 for taking selfies, but the present disclosure is not limited thereto.

The electronic device 200 includes multiple image capturing units 100, 100a, 100b, 100c, 100d, 100e, but the present disclosure is not limited to the number and arrangement of image capturing units.

When a user captures images of an object, the light rays converge in the image capturing units 100, 100a or 100b to generate an image(s), and the flash module 201 is activated for light supplement. The focus assist module detects the object distance of the imaged object to achieve fast auto focusing. The image signal processor is configured to optimize the captured image to improve image quality. The light beam emitted from the focus assist module can be either conventional infrared or laser. In addition, the light rays may converge in the image capturing units 100c, 100d or 100e to generate an image(s). The display unit 202 can be a touch screen, and the user is able to interact with the display unit 202 and the image software processor having multiple functions to capture images and complete image processing. Alternatively, the user may capture images via a physical button. The image processed by the image software processor can be displayed on the display unit 202.

6th Embodiment

Figure 26:
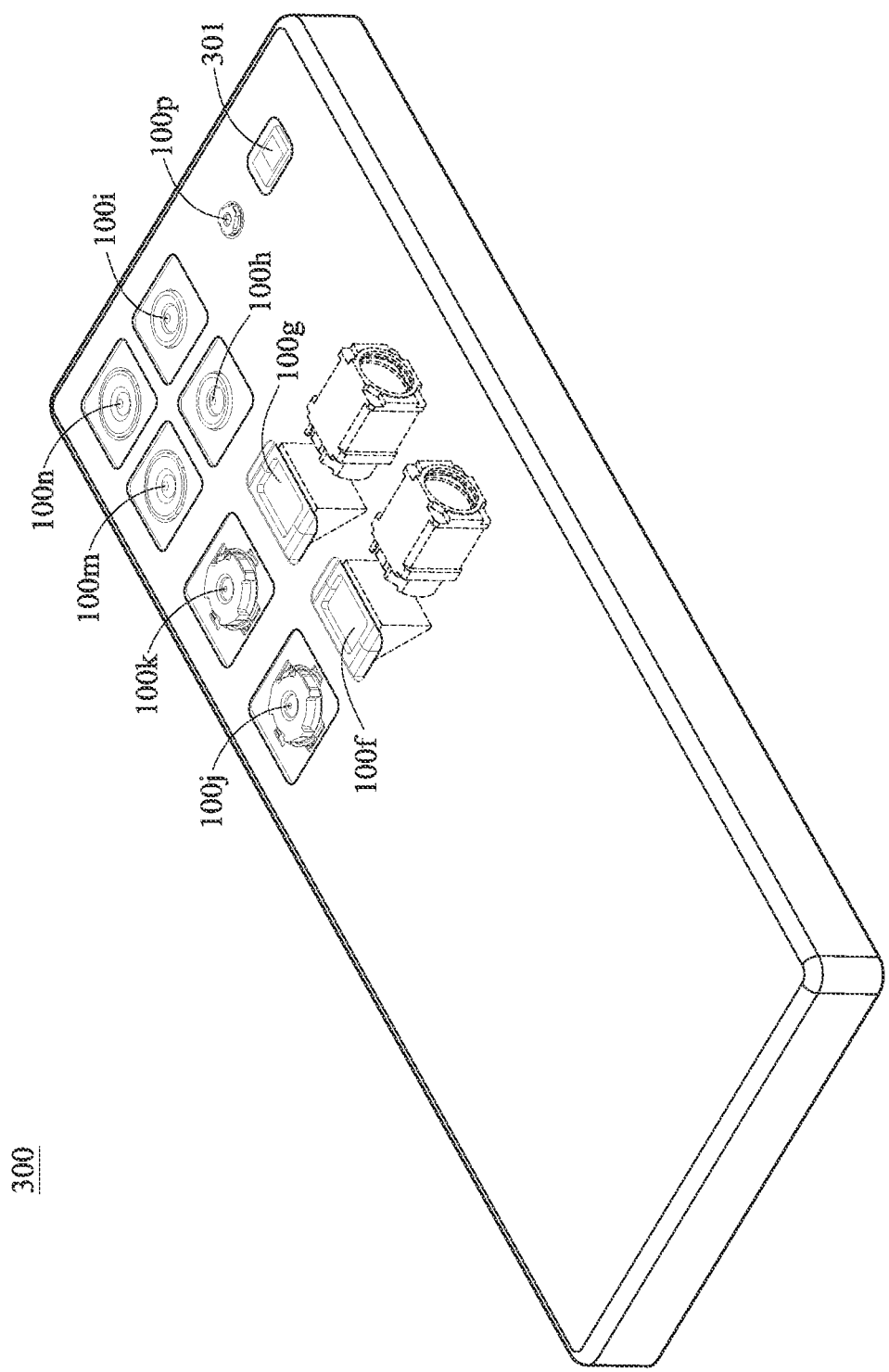
FIG. 26 is one perspective view of an electronic device according to the 6th embodiment of the present disclosure.

FIG. 26 is one perspective view of an electronic device according to the 6th embodiment of the present disclosure.

In this embodiment, an electronic device 300 is a smartphone including an image capturing unit 100f, an image capturing unit 100g, an image capturing unit 100h, an image capturing unit 100i, an image capturing unit 100j, an image capturing unit 100k, an image capturing unit 100m, an image capturing unit 100n, an image capturing unit 100p, a flash module 301, a focus assist module, an image signal processor, a display unit and an image software processor (not shown). The image capturing units 100f, 100g, 100h, 100i, 100j, 100k, 100m, 100n, 100p are disposed on the same side of the electronic device 300, and the display unit is disposed on the opposite side of the electronic device 300. Each of the image capturing units 100f, 100g, 100h, 100i, 100j, 100k, 100m, 100n, 100p can include the optical imaging lens assembly of the present disclosure and can have a configuration similar to that of the image capturing unit 100, so the details in this regard will not be provided again.

The image capturing units 100f, 100g are telephoto image capturing units configured with light-folding element(s), the image capturing units 100h, 100i are telephoto image capturing units, the image capturing units 100j, 100k are wide angle image capturing units, the image capturing units 100m, 100n are ultra-wide-angle image capturing units, and the image capturing unit 100p is a ToF image capturing unit. The image capturing units 100f, 100g with light-folding element(s) may respectively have a configuration, for example, similar to that as shown in FIG. 29, FIG. 30 or FIG. 31, and a description in this regard will not be provided again. In this embodiment, the image capturing units 100f, 100g, 100h, 100i, 100j, 100k, 100m, 100n, 100p have different fields of view, such that the electronic device 300 has various magnification ratios so as to meet the requirement of optical zoom functionality. The electronic device 300 includes multiple image capturing units 100f, 100g, 100h, 100i, 100j, 100k, 100m, 100n, 100p, but the present disclosure is not limited to the number and arrangement of image capturing units.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the optical imaging lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-8 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly, having a zooming function, and the optical imaging lens assembly comprising, in order from an object side to an image side along an optical path:
   a reflection group, comprising a prism, wherein the prism has positive refractive power, the prism has an object-side surface being convex, the prism comprises a reflection surface, and the reflection surface is configured to reflect an imaging light passing through the object-side surface of the prism and send the imaging light to an image-side surface of the prism; and
   a lens group, comprising at least three lens elements arranged along the optical path, wherein each of the at least three lens elements has an object-side surface facing toward the object side and an image-side surface facing toward the image side, the lens group comprises a movable group, and the movable group moves along a direction parallel to an optical axis in a zooming process;
   wherein an axial distance between the object-side surface of the prism and an image surface as the optical imaging lens assembly focuses to a far distance is TLi, an axial distance between the object-side surface of the prism and the image surface as the optical imaging lens assembly focuses to a near distance is TLm, a focal length of the movable group as the optical imaging lens assembly focuses to the far distance is fGM, a focal length of the reflection group as the optical imaging lens assembly focuses to the far distance is fGR, an axial distance between a most object-side surface of the reflection group and a most image-side surface of the reflection group as the optical imaging lens assembly focuses to the far distance is DGR, a result of subtracting an axial distance from the image surface to the movable group as the optical imaging lens assembly focuses to the far distance from an axial distance from the image surface to the movable group as the optical imaging lens assembly focuses to the near distance is dTGM, and the following conditions are satisfied:

$|TLi-TLm|/TLi<3.0E-3$; and $1.0<fGM\times DGR/(fGR\times dTGM)<30$.

2. The optical imaging lens assembly of claim 1, wherein the axial distance between the object-side surface of the prism and the image surface as the optical imaging lens assembly focuses to the far distance is TLi, the axial distance between the object-side surface of the prism and the image surface as the optical imaging lens assembly focuses to the near distance is TLm, a focal length of the optical imaging lens assembly focusing to the far distance is fi, a focal length of the optical imaging lens assembly focusing to the near distance is fm, and the following conditions are satisfied:

$|TLi-TLm|/TLi<1.0E-3$; and $1.0E-3<(fi-fm)/fi<1.0E-1$.

3. The optical imaging lens assembly of claim 1, wherein the focal length of the movable group as the optical imaging lens assembly focuses to the far distance is fGM, the focal length of the reflection group as the optical imaging lens assembly focuses to the far distance is fGR, the axial distance between the most object-side surface of the reflection group and the most image-side surface of the reflection group as the optical imaging lens assembly focuses to the far distance is DGR, the result of subtracting the axial distance from the image surface to the movable group as the optical imaging lens assembly focuses to the far distance from the axial distance from the image surface to the movable group as the optical imaging lens assembly focuses to the near distance is dTGM, and the following condition is satisfied:

$2.0<fGM\times DGR/(fGR\times dTGM)<27$.

4. The optical imaging lens assembly of claim 1, wherein an axial distance between a most object-side surface of the lens group and a most image-side surface of the lens group as the optical imaging lens assembly focuses to the far distance is DGL, an axial distance between a most object-side surface of the movable group and a most image-side surface of the movable group as the optical imaging lens assembly focuses to the far distance is DGM, and the following condition is satisfied:

$1.0 \leq DGL/DGM<20$.

5. The optical imaging lens assembly of claim 1, wherein the axial distance between the object-side surface of the prism and the image surface as the optical imaging lens assembly focuses to the far distance is TLi, a focal length of the optical imaging lens assembly focusing to the far distance is fi, a maximum image height of the optical imaging lens assembly focusing to the far distance is ImgHi, and the following conditions are satisfied:

$0.60<TLi/fi<2.0$; and $4.0<TLi/ImgHi<10$.

6. The optical imaging lens assembly of claim 1, wherein a curvature radius of the most object-side surface of the reflection group in a paraxial region thereof is RGRf, the focal length of the reflection group as the optical imaging lens assembly focuses to the far distance is fGR, a focal length of a most object-side lens element of the lens group is ff1, and the following conditions are satisfied:

$0.35<RGRf/fGR<2.0$; and $1.8<fGR/ff1<10$.

7. The optical imaging lens assembly of claim 1, wherein the lens group comprises at least four lens elements, and the movable group has positive refractive power.

8. An optical imaging lens assembly, having a zooming function, and the optical imaging lens assembly comprising, in order from an object side to an image side along an optical path:
   a reflection group, comprising a prism, wherein the prism has positive refractive power, the prism has an object-side surface being convex, the prism comprises a reflection surface, and the reflection surface is configured to reflect an imaging light passing through the object-side surface of the prism and send the imaging light to an image-side surface of the prism; and
   a lens group, comprising at least three lens elements arranged along the optical path, wherein each of the at least three lens elements has an object-side surface facing toward the object side and an image-side surface facing toward the image side, the lens group comprises a movable group, the movable group moves along a direction parallel to an optical axis in a zooming process, and no additional lens element is disposed between the movable group and an image surface of the optical imaging lens assembly;
   wherein an axial distance between the object-side surface of the prism and the image surface as the optical imaging lens assembly focuses to a far distance is TLi, an axial distance between the object-side surface of the prism and the image surface as the optical imaging lens assembly focuses to a near distance is TLm, a focal length of the reflection group as the optical imaging lens assembly focuses to the far distance is fGR, an axial distance between a most object-side surface of the reflection group and a most image-side surface of the reflection group as the optical imaging lens assembly focuses to the far distance is DGR, and the following conditions are satisfied:

|TLi−TLm|/TLi<3.0E-3; and

0<fGR/DGR<65.0.

9. The optical imaging lens assembly of claim 8, wherein the axial distance between the object-side surface of the prism and the image surface as the optical imaging lens assembly focuses to the far distance is TLi, the axial distance between the object-side surface of the prism and the image surface as the optical imaging lens assembly focuses to the near distance is TLm, the focal length of the reflection group as the optical imaging lens assembly focuses to the far distance is fGR, the axial distance between the most object-side surface of the reflection group and the most image-side surface of the reflection group as the optical imaging lens assembly focuses to the far distance is DGR, and the following conditions are satisfied:

|TLi−TLm|/TLi<1.0E-3; and 1.50<fGR/DGR<18.0.

10. The optical imaging lens assembly of claim 8, wherein a focal length of the optical imaging lens assembly focusing to the far distance is fi, a focal length of the optical imaging lens assembly focusing to the near distance is fm, and the following condition is satisfied:

1.0E-3<(fi−fm)/fi<1.0E-1.

11. The optical imaging lens assembly of claim 8, wherein a refractive index of the prism is Np, a refractive index of a most object-side lens element of the lens group is Nf1, and the following condition is satisfied:

|(Np−Nf1)/(Nf1−1.5)|<1.2.

12. The optical imaging lens assembly of claim 8, wherein a focal length of the movable group as the optical imaging lens assembly focuses to the far distance is fGM, an axial distance between a most object-side surface of the movable group and a most image-side surface of the movable group as the optical imaging lens assembly focuses to the far distance is DGM, and the following condition is satisfied:

1.5<|fGM/DGM|<30.

13. The optical imaging lens assembly of claim 8, wherein a focal length of the optical imaging lens assembly focusing to the far distance is fi, the focal length of the reflection group as the optical imaging lens assembly focuses to the far distance is fGR, a focal length of the lens group as the optical imaging lens assembly focuses to the far distance is fGL, and the following conditions are satisfied:

0.75<fGR/fi<6.5; and 0.50<fi/fGR+fi/fGL<1.4.

14. The optical imaging lens assembly of claim 8, wherein a maximum distance between the optical axis and an optically effective area of the object-side surface of a most object-side lens element of the lens group as the optical imaging lens assembly focuses to the far distance is Yf1f, a maximum distance between the optical axis and an optically effective area of the image-side surface of a most image-side lens element of the lens group as the optical imaging lens assembly focuses to the far distance is Yr1r, a maximum distance between the optical axis and an optically effective area of the most object-side surface of the reflection group as the optical imaging lens assembly focuses to the far distance is YGRf, and the following conditions are satisfied:

0.50<Yf1f/Yr1r<2.0; and 0.70<YGRf/Yf1f<2.0.

15. The optical imaging lens assembly of claim 8, wherein a most object-side lens element of the lens group has positive refractive power, and the object-side surface of the most object-side lens element of the lens group is convex in a paraxial region thereof;

wherein a curvature radius of the object-side surface of the most object-side lens element of the lens group in a paraxial region thereof is Rf1f, a focal length of the most object-side lens element of the lens group is ff1, and the following condition is satisfied:

0.30<Rf1f/ff1<1.2.

16. The optical imaging lens assembly of claim 8, wherein the movable group has a total of one lens element.

17. The optical imaging lens assembly of claim 8, wherein at least one lens element of the lens group is made of plastic material, and at least one of the object-side surface and the image-side surface of at least one lens element of the lens group has at least one inflection point.

18. An optical imaging lens assembly, having a zooming function, and the optical imaging lens assembly comprising, in order from an object side to an image side along an optical path:

a reflection group, comprising a prism, wherein the prism has an object-side surface being convex, an optically effective area of the prism is made of a single material, the prism comprises a reflection surface, and the reflection surface is configured to reflect an imaging light passing through the object-side surface of the prism and send the imaging light to an image-side surface of the prism; and a lens group, comprising at least three lens elements arranged along the optical path, wherein each of the at least three lens elements has an object-side surface facing toward the object side and an image-side surface facing toward the image side, the lens group comprises a movable group, and the movable group moves along a direction parallel to an optical axis in a zooming process;

wherein an axial distance between the object-side surface of the prism and an image surface as the optical imaging lens assembly focuses to a far distance is TLi, an axial distance between the object-side surface of the prism and the image surface as the optical imaging lens assembly focuses to a near distance is TLm, a focal length of the movable group as the optical imaging lens assembly focuses to the far distance is fGM, a result of subtracting an axial distance from the image surface to the movable group as the optical imaging lens assembly focuses to the far distance from an axial distance from the image surface to the movable group as the optical imaging lens assembly focuses to the near distance is dTGM, and the following conditions are satisfied:

|TLi−TLm|/TLi<3.0E-3; and 1.00<fGM/dTGM.

19. The optical imaging lens assembly of claim 18, wherein an axial distance between the object-side surface of the prism and the image surface as the optical imaging lens assembly focuses to the far distance is TLi, the axial distance between the object-side surface of the prism and the image surface as the optical imaging lens assembly focuses to the near distance is TLm, a focal length of the optical imaging lens assembly focusing to the far distance is fi, a focal length of the optical imaging lens assembly focusing to the near distance is fm, and the following conditions are satisfied:

|TLi−TLm|/TLi<1.0E-3; and 1.0E-3<(fi−fm)/fi<1.0E-1.

20. The optical imaging lens assembly of claim 18, wherein the focal length of the movable group as the optical imaging lens assembly focuses to the far distance is fGM, the result of subtracting the axial distance from the image surface to the movable group as the optical imaging lens assembly focuses to the far distance from the axial distance from the image surface to the movable group as the optical imaging lens assembly focuses to the near distance is dTGM, and the following condition is satisfied:

10.0<fGM/dTGM<250.

21. The optical imaging lens assembly of claim 18, wherein half of a maximum field of view of the optical imaging lens assembly focusing to the far distance is HFOVi, a focal length of the optical imaging lens assembly focusing to the far distance is fi, a maximum distance between the optical axis and an optically effective area of a most object-side surface of the reflection group as the optical imaging lens assembly focuses to the far distance is YGRf, and the following conditions are satisfied:

3.0 degrees<HFOVi<20.0 degrees; and 3.0<fi/YGRf<8.0.

22. The optical imaging lens assembly of claim 18, wherein a minimum value among Abbe numbers of all lens elements of the lens group is Vmin, a maximum value among refractive indices of all lens elements of the lens group is Nmax, and the following condition is satisfied:

5.50<Vmin/Nmax<12.0.

23. The optical imaging lens assembly of claim 18, wherein an axial distance between a most object-side surface of the reflection group and a most image-side surface of the reflection group as the optical imaging lens assembly focuses to the far distance is DGR, an axial distance between a most object-side surface of the lens group and a most image-side surface of the lens group as the optical imaging lens assembly focuses to the far distance is DGL, and the following condition is satisfied:

0.30<DGR/DGL<2.0.

24. The optical imaging lens assembly of claim 18, wherein a focal length of the optical imaging lens assembly focusing to the far distance is fi, the focal length of the movable group as the optical imaging lens assembly focuses to the far distance is fGM, and the following condition is satisfied:

0.20<|fi/fGM|<3.5.

25. The optical imaging lens assembly of claim 18, wherein a focal length of the reflection group as the optical imaging lens assembly focuses to the far distance is fGR, a maximum distance between the optical axis and an optically effective area of a most object-side surface of the reflection group as the optical imaging lens assembly focuses to the far distance is YGRf, and the following condition is satisfied:

4.0<fGR/YGRf<30.

26. The optical imaging lens assembly of claim 18, wherein a most object-side lens element of the lens group has positive refractive power, and a second lens element counting from the object side to the image side in the lens group has negative refractive power;
wherein a focal length of the most object-side lens element of the lens group is ff1, a focal length of the second lens element counting from the object side to the image side in the lens group is ff2, and the following condition is satisfied:

−10<ff2/ff1<−0.70.

27. The optical imaging lens assembly of claim 18, wherein the prism is made of plastic material;
wherein an Abbe number of the prism is Vp, a refractive index of the prism is Np, and the following condition is satisfied:

30.0<Vp/Np<40.0.

28. An image capturing unit, comprising:
the optical imaging lens assembly of claim 18; and
an image sensor disposed on the image surface of the optical imaging lens assembly.

29. An electronic device, comprising at least two image capturing units located on a same side of the electronic device, and the at least two image capturing units comprising:
a first image capturing unit, comprising the optical imaging lens assembly of claim 18 and an image sensor disposed on the image surface of the optical imaging lens assembly; and
a second image capturing unit, comprising an optical lens assembly and an image sensor disposed on an image surface of the optical lens assembly;
wherein half of a maximum field of view of the second image capturing unit ranges between 30 degrees and 60 degrees.

* * * * *